United States Patent
Park et al.

(10) Patent No.: US 11,533,690 B2
(45) Date of Patent: *Dec. 20, 2022

(54) SENDING THIRD POWER VALUE FOR UPLINK TRANSMISSION FOR ADDING AS BASE STATION DISTRIBUTED UNIT

(71) Applicant: Ofinno, LLC, Reston, VA (US)

(72) Inventors: Kyungmin Park, Vienna, VA (US); Esmael Dinan, McLean, VA (US); Hyoungsuk Jeon, Centreville, VA (US); Alireza Babaei, Fairfax, VA (US); Hua Zhou, Herndon, VA (US)

(73) Assignee: Ofinno, LLC, Reston, VA (US)

(*) Notice: Subject to any disclaimer, the term of this patent is extended or adjusted under 35 U.S.C. 154(b) by 63 days.

This patent is subject to a terminal disclaimer.

(21) Appl. No.: 17/128,583

(22) Filed: Dec. 21, 2020

(65) Prior Publication Data
US 2021/0112504 A1 Apr. 15, 2021

Related U.S. Application Data

(63) Continuation of application No. 16/231,430, filed on Dec. 22, 2018, now Pat. No. 10,873,916.
(Continued)

(51) Int. Cl.
*H04W 72/04* (2009.01)
*H04W 76/27* (2018.01)
(Continued)

(52) U.S. Cl.
CPC ......... *H04W 52/367* (2013.01); *H04W 24/10* (2013.01); *H04W 72/0413* (2013.01);
(Continued)

(58) Field of Classification Search
CPC ............. H04W 52/367; H04W 52/146; H04W 52/346; H04W 52/365; H04W 72/0413;
(Continued)

(56) References Cited

U.S. PATENT DOCUMENTS

2012/0115537 A1* 5/2012 Gaal .................. H04W 52/365
455/522
2014/0329551 A1* 11/2014 Ryoo .................. H04W 52/365
455/522
(Continued)

FOREIGN PATENT DOCUMENTS

WO 2018017840 1/2018
WO 2018140277 2/2018

OTHER PUBLICATIONS

3GPP TS 38.401 V1.0.0 (Dec. 2017); Technical Specification; 3rd Generation Partnership Project; Technical Specification Group Radio Access Network; NG-RAN; Architecture description (Release 15).
(Continued)

*Primary Examiner* — Hassan Kizou
*Assistant Examiner* — Hector Reyes
(74) *Attorney, Agent, or Firm* — Sachin Kandhari; Kavon Nasabzadeh; Philip R. Smith

(57) ABSTRACT

A base station central unit transmits to a first base station distributed unit (BS-DU), a first power value for uplink transmission of a wireless device to the first BS-DU. A second request to add the second BS-DU for the wireless device is transmitted to a second BS-DU. The second request comprises a second power value for uplink transmission of the wireless device to the second BS-DU. A third power value for uplink transmission of the wireless device to the first BS-DU is transmitted to the first BS-DU. The third power value is based on the second power value.

20 Claims, 28 Drawing Sheets

Related U.S. Application Data

(60) Provisional application No. 62/612,126, filed on Dec. 29, 2017.

(51) Int. Cl.

| | |
|---|---|
| *H04W 52/36* | (2009.01) |
| *H04W 24/10* | (2009.01) |
| *H04W 52/14* | (2009.01) |
| *H04L 5/00* | (2006.01) |
| *H04W 80/02* | (2009.01) |
| *H04W 52/34* | (2009.01) |

(52) U.S. Cl.
CPC ... *H04W 72/0446* (2013.01); *H04W 72/0453* (2013.01); *H04W 76/27* (2018.02); *H04L 5/001* (2013.01); *H04W 52/146* (2013.01); *H04W 52/346* (2013.01); *H04W 52/365* (2013.01); *H04W 80/02* (2013.01)

(58) Field of Classification Search
CPC ......... H04W 72/0446; H04W 72/0453; H04W 24/10; H04W 24/08; H04W 76/27; H04W 80/02; H04W 36/0072; H04W 88/085; H04L 5/001; H04L 5/0053
See application file for complete search history.

(56) References Cited

U.S. PATENT DOCUMENTS

| | | | | |
|---|---|---|---|---|
| 2015/0282100 | A1* | 10/2015 | Lee ..................... | H04W 52/283 370/329 |
| 2016/0112966 | A1* | 4/2016 | Jung ..................... | H04W 52/34 370/311 |
| 2017/0019864 | A1* | 1/2017 | Hwang ................ | H04W 52/34 |
| 2017/0026915 | A1* | 1/2017 | Madan ................ | H04W 52/244 |
| 2019/0132096 | A1* | 5/2019 | Abedini ............. | H04W 52/346 |
| 2019/0313244 | A1 | 10/2019 | Wang et al. | |
| 2020/0120553 | A1* | 4/2020 | Wang ................... | H04W 76/27 |

OTHER PUBLICATIONS

3GPP TS 38.473 V1.0.0 (Dec. 2017); Technical Specification; 3rd Generation Partnership Project; Technical Specification Group Radio Access Network; NG-RAN; F1 application protocol (F1AP) (Release 15).
3GPP TS 38.331 V1.0.0 (Dec. 2017); Technical Specification; 3rd Generation Partnership Project; Technical Specification Group Radio Access Network; NR; Radio Resource Control (RRC); Protocol specification (Release 15).
R3-174360; 3GPP TSG-RAN WG3 Meeting #98; Reno, NV, USA, Nov. 27-Dec. 1, 2017; Agenda item: 10.10.1.6 Source: Nokia, Nokia Shanghai Bell, KT; Title: FFS resolution in intra-gNB-CU mobility; Document for: Discussion and Decision.
R3-174361; 3GPP TSG-RAN WG3 Meeting #98; Reno, NV, USA, Nov. 27-Dec. 1, 2017; Agenda item: 10.10.1.6 Source: Nokia, Nokia Shanghai Bell, KT; Title: TP of UE Context Modification and UE Attached Indication (TS 38.470) Document for: Discussion and Decision.
R3-174362; 3GPP TSG-RAN WG3 Meeting #98; Reno, NV, USA, Nov. 27-Dec. 1, 2017; Agenda item: 10.10.1.6 Source: Nokia, Nokia Shanghai Bell, KT; Title: TP of UE Context Modification and UE Attached Indication (TS 38.473) Document for: Discussion and Decision.
R3-174364; 3GPP TSG-RAN WG3 Meeting #98; Reno, NV, USA, Nov. 27-Dec. 1, 2017; Agenda item: 10.10.1.9 Source: Nokia, Nokia Shanghai Bell; Title: FFS resolution in Centralized Retransmission; Document for: Discussion and Decision.
R3-174367; 3GPP TSG-RAN WG3 Meeting #98; Reno, NV, USA, Nov. 27-Dec. 1, 2017; Agenda item: 10.10.2.2 Source: Nokia, Nokia Shanghai Bell; Title: RRC Container exchange in UE Context Management Document for: Discussion and Decision.
R3-174368; 3GPP TSG-RAN WG3 Meeting #98; Reno, NV, USA, Nov. 27-Dec. 1, 2017; Agenda item: 10.10.2.2 Source: Nokia, Nokia Shanghai Bell; Title: TP of RRC Container exchange in UE Context management (TS 38.473) Document for: Discussion and Decision.
R3-174394; 3GPP TSG RAN WG3 NR#98; Reno, USA, Nov. 27-Dec. 1, 2017; Agenda item: 10.10.2.2 Source: ZTE, China Unicom, China Telecom; Title: QoS information transfer for TS38. 473; Document for: pCR.
R3-174395; 3GPP TSG RAN WG3 NR#98; Reno, USA, Nov.27-Dec. 1, 2017; Agenda item: 10.10.2.2 Source: ZTE; Title: Update on QoS information transfer for TS38.473; Document for: pCR.
R3-174402; 3GPP TSG RAN WG3 Meeting #98; Reno, Nevada, USA, Nov. 27-Dec. 1, 2017; Agenda item: 10.10.1.4; Source: ZTE, China Unicom; Title: Discussion on the On demand SI delivery; Document for: Discussion and Approval.
R3-174405; 3GPP TSG RAN WG3 NR#98; Reno, USA, Nov. 27-Dec. 1, 2017; Agenda item: 10.10.1.6 Source: ZTE, China Unicom; Title: Remaining Issues of Mobility Aspects; Document for: Discussion and Decision.
R3-174409; 3GPP TSG-RAN WG3 #98; Reno, NV, USA, Nov. 27-Dec. 1, 2017; Agenda item: 10.10.1.9 Source: ZTE, China Telecom; Title: Remaining Issues of Centralized Retransmissions; Document for: Discussion and Decision.
R3-174410; 3GPP TSG-RAN WG3 #98; Reno, NV, USA, Nov. 27-Dec. 1, 2017; Agenda item: 10.10.1.9 Source: ZTE; Title: TP for Centralized Retransmissions kept in TS38.475; Document for: Discussion and Decision.
R3-174411; 3GPP TSG-RAN WG3 #98; Reno, NV, USA, Nov. 27-Dec. 1, 2017; Agenda item: 10.10.1.9 Source: ZTE; Title: TP for Centralized Retransmissions Added in TS38.425; Document for: Discussion and Decision.
R3-174469; 3GPP TSG RAN WG3 meeting #98; Reno, Nevada, US, Nov. 27-Dec. 1, 2017; Agenda Item: 10.10.2 Source: Huawei; Title: Further stage 3 details of UE context management; Document for: Discussion and Decision.
R3-174470; 3GPP TSG RAN WG3 meeting #98; Reno, Nevada, US, Nov. 27-Dec. 1, 2017; Agenda Item: 10.10.2.5 Source: Huawei; Title: Necessary parameters for setup UE context; Document for: Discussion and Decision.
R3-174474; 3GPP TSG RAN WG3 meeting #98; Reno, Nevada, US Nov. 27-Dec. 1, 2017; Agenda Item: 10.10.2.2 Source: Huawei; Title: pCR on QoS information transfer over F1 to 38.470; Document for: Discussion and Decision.
R3-174475; 3GPP TSG RAN WG3 meeting #98; Reno, Nevada, US Nov. 27-Dec. 1, 2017; Agenda Item: 10.10.2.2 Source: Huawei; Title: pCR on QoS information transfer over F1 to 38.473; Document for: Discussion and Decision.
R3-174481; 3GPP TSG-RAN3 Meeting # 98; Reno, Nevada, US Nov. 27-Dec. 1, 2017; Title: Further discussions on system information delivery over F1; Source: Huawei; Agenda item: 10.10.1.4; Document for: pCR.
R3-174482; 3GPP TSG-RAN3 Meeting # 98; Reno, Nevada, US, Nov. 27-Dec. 11, 2017; Title: Further discussions on radio link outage indication; Source: Huawei; Agenda item: 10.10.1.4; Document for: pCR.
R3-174539; 3GPP TSG RAN WG3 #98; Reno, NV, USA, Nov. 27-Dec. 1, 2017; Source: CATT; Title: Discussion on UE Context Management and RRC Message Transfer; Agenda Item: 10.10.2.2 Document for: Discussion and Decision.
R3-174540; 3GPP TSG-RAN WG3 #98; Reno, NV, USA, Nov. 27-Dec. 1, 2017; Source: CATT; Title: Stage 3 TP on UE Context Setup and RRC Message Transfer; Agenda Item: 10.10.2.2 Document for: Discussion and Decision.
R3-174541; 3GPP TSG-RAN WG3 #98; Reno, NV, USA, Nov. 27-Dec. 1, 2017; Source: CATT; Title: Discussion on UE Context Modification; Agenda Item: 10.10.2.2; Document for: Discussion and Decision.
R3-174542; 3GPP TSG-RAN WG3 Meeting #98; Reno, Nevada, USA, Nov. 27-Dec. 1, 2017; Source: CATT; Title: Discussion on inter-DU mobility without MN involved; Agenda Item: 10.10.1.6; Document for: Discussion and Decision.

(56) References Cited

OTHER PUBLICATIONS

R3-174543; 3GPP TSG-RAN WG3#98; Reno, NV, USA, Nov. 27-Dec. 1, 2017; Source: CATT Title: Stage 3 TP on inter-DU mobility without MN involved; Agenda Item: 10.10.1.5; Document for: Approval.

R3-174545; 3GPP TSG-RAN WG3 Meeting #98; Reno, Nevada, USA, Nov. 27-Dec. 1, 2017; Source: CATT Title: Discussion on the Intra-cell HO and SCG change procedure; Agenda Item: 10.10.1.6; Document for: Discussion and Decision.

R3-174546; 3GPP TSG-RAN WG3 Meeting #98; Reno, Nevada, USA, Nov. 27-Dec. 1, 2017; Source: CATT Title: TP for 38.473 on Intra-cell HO and SCG change procedure; Agenda Item: 10.10.1.6; Document for: Approval.

R3-174605; 3GPP TSG-RAN WG3 Meeting #98; Reno, USA, Nov. 27-Dec. 1, 2017; Agenda item: 10.10.1.4; Source: Samsung, KT; Title: Left issues for system information transmission; Document for: Discussion & Decision.

R3-174611; 3GPP TSG-RAN WG3 Meeting #98; Reno, USA, Nov. 27-Dec. 1, 2017; Agenda item: 10.10.1.6; Source: Samsung, KT; Title: Mobility procedures with high layer split; Document for: Discussion & Decision.

R3-174612; 3GPP TSG-RAN WG3 Meeting #98; Reno, USA, Nov. 27-Dec. 1, 2017; Agenda item: 10.10.1.6; Source: Samsung, KT; Title: Stage 2 TP for TS38.470 on mobility related procedures; Document for: Discussion & Decision.

R3-174613; 3GPP TSG-RAN WG3 Meeting #98; Reno, USA, Nov. 27-Dec. 1, 2017; Agenda item: 10.10.1.6; Source: Samsung, KT; Title: Stage 3 TP for TS38.473 on mobility related procedures; Document for: Discussion & Decision.

R3-174615; Reno, USA, Nov. 27-Dec. 1, 2017; Agenda item: 10.10.2.2; Source: Samsung, KT Title: Solving FFS for UE context setup procedure; Document for: Discussion & Decision.

R3-174616; 3GPP TSG-RAN WG3 Meeting #97bis; Prague, Czech, Oct. 9-13, 2017; Agenda item: 10.10.2.2 Source: Samsung, KT; Title: Discussions on CU-initiated UE context modification; procedure over F1; Document for: Discussion & Decision.

R3-174617; 3GPP TSG-RAN WG3 Meeting #98; Reno, USA, Nov. 27-Dec. 1, 2017; Agenda item: 10.10.2.2; Source: Samsung, KT; Title: Discussions on DU-initiated UE context modification procedure for serving cell release; Document for: Discussion & Decision.

R3-174666; 3GPP TSG-RAN WG3 #98; Reno, Nevada, US, Nov. 27-Dec. 1, 2017; Agenda item: 10.10.2.2 Source: CMCC; Title: QoS management over F1; Document for: Discussion and Decision.

R3-174676; 3GPP TSG-RAN3#98; Reno, USA, Nov. 27-Dec. 1, 2017; Agenda Item: 10.10.2.2. Source: NEC; Title: UE Dedicated L1/L2 resource configuration Information in F1AP; Document for: Discussion and Decision.

Tdoc R3-174771; 3GPP TSG RAN WG3 Meeting #98; Reno, Nevada, USA, Nov. 27-Dec. 1, 2017; Agenda Item: 10.10.1.10; Source: Ericsson; Title: Resolution of open issues in TS 38.470; Document for: pCR TR 38.470.

Tdoc R3-174776; 3GPP TSG RAN WG3 Meeting #98; Reno, Nevada, USA, Nov. 27-Dec. 1, 2017; Agenda Item: 10.10.1.4; Source: Ericsson; Title: System information exchange over F1; Document for: pCR TS 38.473.

Tdoc R3-174781; 3GPP TSG-RAN WG3 #98; Reno, Nevada, USA, Nov. 27-Dec. 1, 2017; Agenda Item: 10.10.1.6; Source: Ericsson; Title: Mobility procedures; Document for: pCR TS 38.401.

Tdoc R3-174782; 3GPP TSG-RAN WG3 #98; Reno, Nevada, USA, Nov. 27-Dec. 1, 2017; Agenda Item: 10.10.1.6; Source: Ericsson; Title: Content for UE mobility command messages; Document for: pCR TS 38.473.

Tdoc R3-174785; 3GPP TSG RAN WG3 Meeting #98; Reno, Nevada, USA, Nov. 27-Dec. 1, 2017; Agenda Item: 10.10.2.2; Source: Ericsson; Title: Transfer of L1-L2 configuration; Document for: pCR TS 38.473.

Tdoc R3-174786; 3GPP TSG RAN WG3 Meeting #98; Reno, Nevada, USA, Nov. 27-Dec. 1, 2017; Agenda Item: 10.10.2.2; Source: Ericsson; Title: Transfer of L1-L2 configuration for EN-DC; Document for: Discussion, Decision.

R3-174787; 3GPP TSG RAN WG3 Meeting #98; Reno, Nevada, USA, Nov. 27-Dec. 1, 2017; Agenda Item: 10.10.2.2; Source: Ericsson; Title: UE context Setup over the F1; Document for: Discussions & Approval.

R3-174819; 3GPP TSG-RAN WG3 Meeting #98; Reno, Nevada, USA, Nov. 27-Dec. 1, 2017; Source: CATT Title: Discussion on the serving cell management; Agenda Item: 10.10.1.10; Document for: Discussion and Decision.

Tdoc R3-174836; 3GPP TSG RAN WG3 Meeting #98; Reno, Nevada, USA, Nov. 27-Dec. 1, 2017; Agenda Item: 10.10.1.10; Source: Ericsson; Title: Resolution of open issues in TS 38.473; Document for: pCR TR 38.473.

R3-174846; 3GPP TSG-RAN WG3 #98; Reno, NV, USA, Nov. 27-Dec. 1, 2017; Agenda item: 10.10.1.9 Source: NTT Docomo, Inc.; Title: How to acquire status of re-transmitted packets; Document for: Discussion and Decision.

R3-174907; 3GPP TSG-RAN WG3 Meeting #98; Reno, NV, USA, Nov. 27-Dec. 1, 2017; Agenda item: 10.10.1.6; Source: Nokia, Nokia Shanghai Bell; Title: FFS resolution in inter-cell mobility; Document for: Approval.

R3-17xxxx; 3GPP TSG-RAN WG3 #98; Reno, NV, USA, Nov. 27-Dec. 1, 2017; Agenda Item: 2 Source: Chairman; Title: Agenda; Document for: Approval.

* cited by examiner gNB connected to NGC eLTE eNB connected to NGC

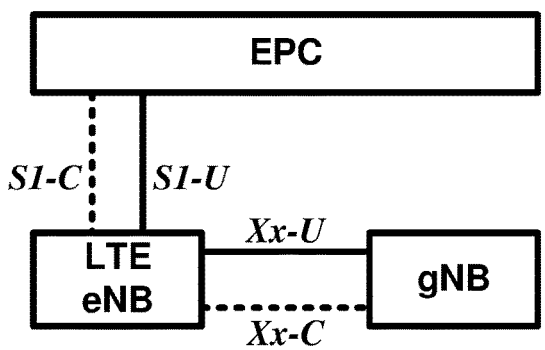

LTE eNB connected to EPC with non-standalone gNB.
gNB user plane connected to EPC via LTE eNB.

FIG. 11A

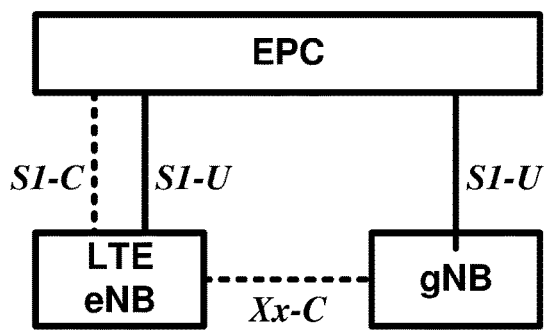

LTE eNB connected to EPC with non-standalone gNB.
gNB user plane connected to EPC directly.

FIG. 11B

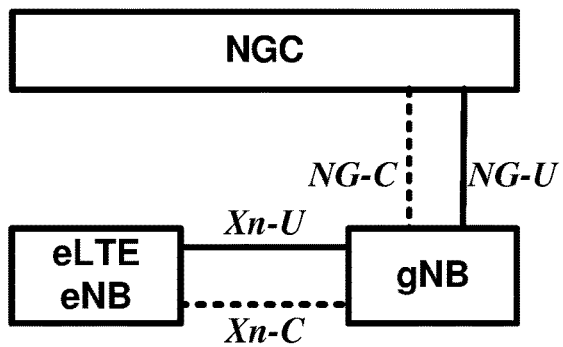

gNB connected to NGC with non-standalone eLTE eNB.
eLTE eNB user plane connected to NGC via gNB.

FIG. 11C

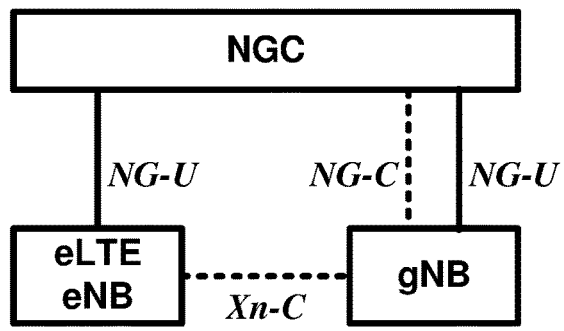

gNB connected to NGC with non-standalone eLTE eNB.
eLTE eNB user plane connected to NGC directly.

FIG. 11D

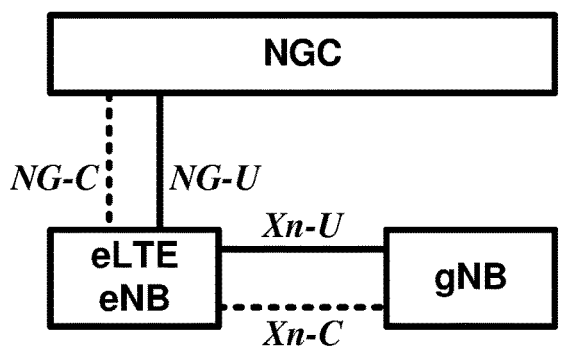

eLTE eNB connected to NGC with non-standalone gNB.
gNB user plane connected to NGC via eLTE eNB.

FIG. 11E

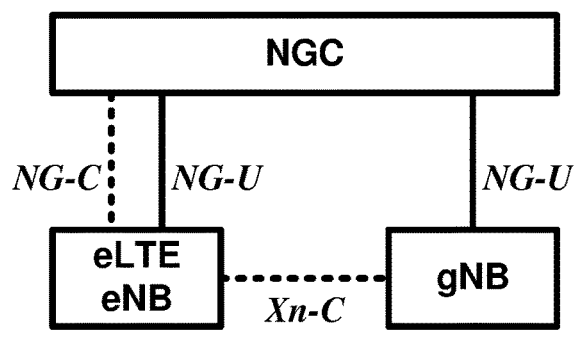

eLTE eNB connected to NGC with non-standalone gNB.
gNB user plane connected to NGC directly.

FIG. 11F

Radio protocol architecture for split bearer and SCG bearer. LTE eNB connected to EPC with non-standalone gNB.

Radio protocol architecture for split bearer and SCG bearer. gNB connected to NGC with non-standalone eLTE eNB.

Radio protocol architecture for split bearer and SCG bearer. eLTE eNB connected to NGC with non-standalone gNB.

Non-centralized deployment

Centralized deployment

Transmit, by a base station central unit to a 1st base station distributed unit, a 1st message requesting a 1st context setup for a wireless device
2510

Transmit, by the base station central unit to a 2nd base station distributed unit, a 2nd message requesting 2nd context setup to add the 2nd base station distributed unit for the wireless device, where the 2nd message comprises a 2nd power value for uplink transmission of the wireless device to the 2nd base station distributed unit
2520

Receive, by the base station central unit from the 2nd base station distributed unit, a response message indicating the 2nd context setup for the wireless device
2530

Transmit, by the base station central unit to the 1st base station distributed unit, a 2rd message requesting context modification for the wireless device, where the 3rd message comprises a 1st power value for uplink transmission of the wireless device to the 1st base station distributed unit, the 1st power value determined based on the 2nd power value
2540

FIG. 25

```
┌─────────────────────────────────────────────────────────┐
│ Receive, by a base station central unit from a wireless │
│ device via a 1st base station distributed unit, a       │
│ measurement report comprising measurement result(s) of  │
│ cell(s) of a 2nd base station distributed unit          │
│                        2610                             │
└─────────────────────────────────────────────────────────┘
                            │
                            ▼
┌─────────────────────────────────────────────────────────┐
│ Send, by the base station central unit to the 1st base  │
│ station distributed unit and based on the measurement   │
│ report, a 1st message indicating a base station         │
│ distributed unit addition to establish multiple         │
│ distributed unit connections for the wireless device    │
│                        2620                             │
└─────────────────────────────────────────────────────────┘
                            │
                            ▼
┌─────────────────────────────────────────────────────────┐
│ Receive, by the base station central unit from the 1st  │
│ base station distributed unit, a 2nd message comprising │
│ 1st power coordination parameters for the multiple      │
│ distributed unit connections, where the 1st power       │
│ coordination parameters comprise at least one of: a 1st │
│ power control mode comprising a mode 1 or a mode 2; a   │
│ 1st guaranteed power 1 for the 1st base station         │
│ distributed unit; or a 1st guaranteed power 2 for the   │
│ 2nd base station distributed unit                       │
│                        2630                             │
└─────────────────────────────────────────────────────────┘
                            │
                            ▼
┌─────────────────────────────────────────────────────────┐
│ Send, by the base station central unit to the 2nd base  │
│ station distributed unit, a 3rd message indicating a    │
│ request of the base station distributed unit addition   │
│ for the wireless device, where the 3rd message          │
│ comprises 2nd power coordination parameters for the     │
│ multiple distributed unit connections, the 2nd power    │
│ coordination parameters indicating at least one of: a   │
│ 2nd power control mode comprising the mode 1 or the     │
│ mode 2; a 2nd guaranteed power 1 for the 1st base       │
│ station distributed unit; or a 2nd guaranteed power 2   │
│ for the 2nd base station distributed unit               │
│                        2640                             │
└─────────────────────────────────────────────────────────┘
```

FIG. 26

```
┌─────────────────────────────────────────────────────────┐
│ Receive, by a base station central unit from a wireless │
│ device via a first base station distributed unit, a     │
│ measurement report comprising one or more measurement   │
│ results of at least one cell of a second base station   │
│ distributed unit                                        │
│ 2710                                                    │
└─────────────────────────────────────────────────────────┘
                            │
                            ▼
┌─────────────────────────────────────────────────────────┐
│ Transmit, by the base station central unit to the 2nd   │
│ base station distributed unit and based on the          │
│ measurement report, a 1st message requesting context    │
│ setup to add the 2nd base station distributed unit for  │
│ the wireless device, where the 1st message comprises a  │
│ 1st power value for uplink transmission of the wireless │
│ device to the 2nd base station distributed unit         │
│ 2720                                                    │
└─────────────────────────────────────────────────────────┘
                            │
                            ▼
┌─────────────────────────────────────────────────────────┐
│ Receive, by the base station central unit from the 2nd  │
│ base station distributed unit, a response message       │
│ indicating the context setup for the wireless device    │
│ 2730                                                    │
└─────────────────────────────────────────────────────────┘
                            │
                            ▼
┌─────────────────────────────────────────────────────────┐
│ Transmit, by the base station central unit to the 1st   │
│ base station distributed unit, a 2nd message requesting │
│ context modification for the wireless device, where the │
│ 2nd message comprises a 2nd power value for uplink      │
│ transmission of the wireless device to the 1st base     │
│ station distributed unit, the 2nd power value           │
│ determined based on the 1st power value                 │
│ 2740                                                    │
└─────────────────────────────────────────────────────────┘
```

FIG. 27

Transmit, by a base station central unit to a wireless device, packets via a 1st base station distributed unit
2810

Transmit, by the base station central unit to the 2nd base station distributed unit, a 1st message requesting context setup to add the 2nd base station distributed unit for the wireless device, wherein the 1st message comprises a 1st power value for uplink transmission of the wireless device to the 2nd base station distributed unit
2820

Receive, by the base station central unit from the 2nd base station distributed unit, a response message indicating the context setup for the wireless device
2830

Transmit, by the base station central unit to the 1st base station distributed unit, a 2nd message requesting context modification for the wireless device, where the 2nd message comprises a 2nd power value for uplink transmission of the wireless device to the 1st base station distributed unit, the 2nd power value determined based on the 1st power value
2840

FIG. 28

SENDING THIRD POWER VALUE FOR UPLINK TRANSMISSION FOR ADDING AS BASE STATION DISTRIBUTED UNIT

CROSS-REFERENCE TO RELATED APPLICATIONS

This application is a continuation of U.S. patent Ser. No. 16/231,430, filed Dec. 22, 2018, claims the benefit of U.S. Provisional Application No. 62/612,126, filed Dec. 29, 2017, which is hereby incorporated by reference in its entirety.

BRIEF DESCRIPTION OF THE SEVERAL VIEWS OF THE DRAWINGS

Examples of several of the various embodiments of the present invention are described herein with reference to the drawings.

FIG. 11A, FIG. 11B, FIG. 11C, FIG. 11D, FIG. 11E, and FIG. 11F are example diagrams for architectures of tight interworking between 5G RAN (e.g. gNB) and LTE RAN (e.g. (e)LTE eNB) as per an aspect of an embodiment of the present disclosure.

FIG. 25 is a flow diagram of an aspect of an embodiment of the present disclosure.

FIG. 26 is a flow diagram of an aspect of an embodiment of the present disclosure.

FIG. 27 is a flow diagram of an aspect of an embodiment of the present disclosure.

FIG. 28 is a flow diagram of an aspect of an embodiment of the present disclosure.

DETAILED DESCRIPTION OF EMBODIMENTS

Figure 1:
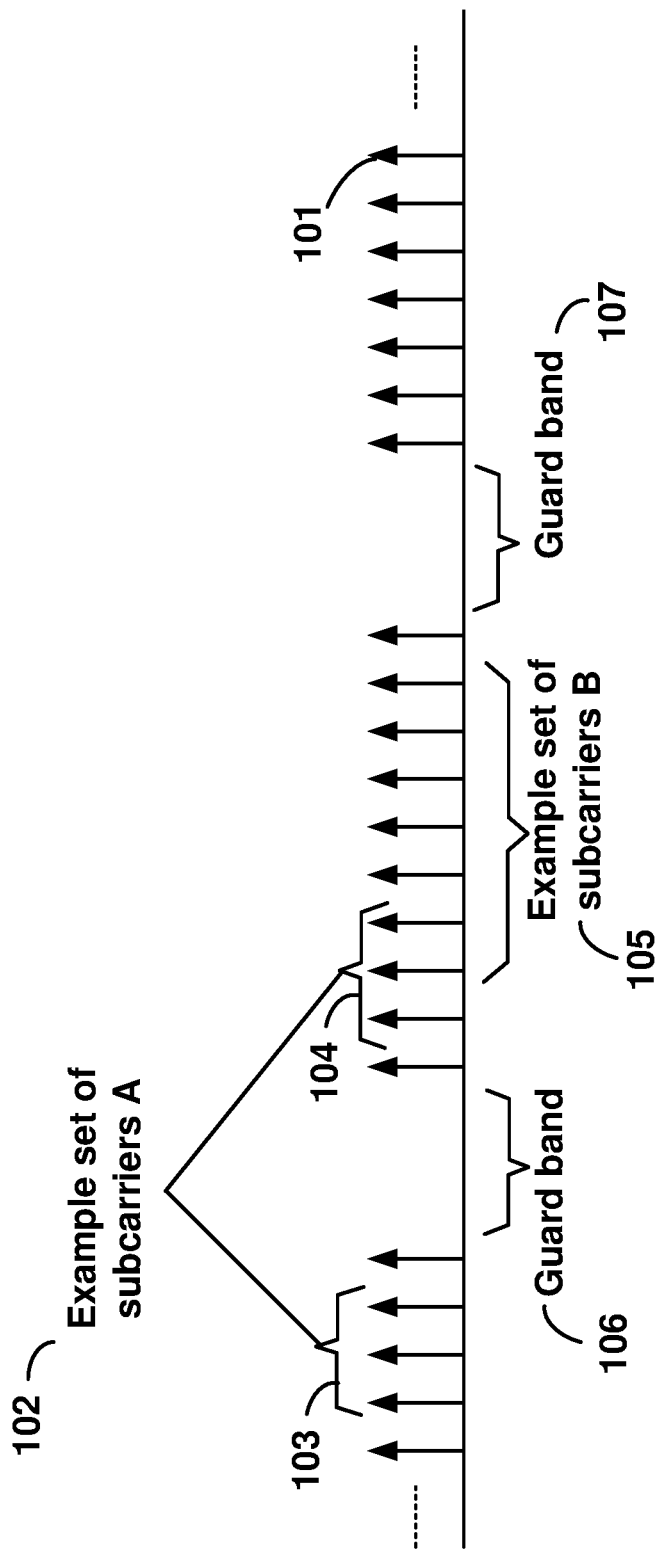
FIG. 1 is a diagram depicting example sets of OFDM subcarriers as per an aspect of an embodiment of the present disclosure.

Example embodiments of the present invention enable operation of carrier aggregation. Embodiments of the technology disclosed herein may be employed in the technical field of multicarrier communication systems. More particularly, the embodiments of the technology disclosed herein may relate to signal timing in a multicarrier communication systems.

The following Acronyms are used throughout the present disclosure:

ASIC application-specific integrated circuit
    BPSK binary phase shift keying
    CA carrier aggregation
    CSI channel state information
    CDMA code division multiple access
    CSS common search space
    CPLD complex programmable logic devices
    CC component carrier
    CP cyclic prefix
    DL downlink
    DCI downlink control information
    DC dual connectivity
    eMBB enhanced mobile broadband
    EPC evolved packet core
    E-UTRAN evolved-universal terrestrial radio access network
    FPGA field programmable gate arrays
    FDD frequency division multiplexing
    HDL hardware description languages
    HARQ hybrid automatic repeat request
    IE information element
    LTE long term evolution
    MCG master cell group
    MeNB master evolved node B
    MIB master information block
    MAC media access control
    MAC media access control
    MME mobility management entity
    mMTC massive machine type communications
    NAS non-access stratum
    NR new radio OFDM orthogonal frequency division multiplexing
PDCP packet data convergence protocol
PDU packet data unit
PHY physical
PDCCH physical downlink control channel
PHICH physical HARQ indicator channel
PUCCH physical uplink control channel
PUSCH physical uplink shared channel
PCell primary cell
PCell primary cell
PCC primary component carrier
PSCell primary secondary cell
pTAG primary timing advance group
QAM quadrature amplitude modulation
QPSK quadrature phase shift keying
RBG resource block groups
RLC radio link control
RRC radio resource control
RA random access
RB resource blocks
SCC secondary component carrier
SCell secondary cell
Scell secondary cells
SCG secondary cell group
SeNB secondary evolved node B
sTAGs secondary timing advance group
SDU service data unit
S-GW serving gateway
SRB signaling radio bearer
SC-OFDM single carrier-OFDM
SFN system frame number
SIB system information block
TAI tracking area identifier
TAT time alignment timer
TDD time division duplexing
TDMA time division multiple access
TA timing advance
TAG timing advance group
TTI transmission time intervalTB transport block
UL uplink
UE user equipment
URLLC ultra-reliable low-latency communications
VHDL VHSIC hardware description language
CU central unit
DU distributed unit
Fs-C Fs-control plane
Fs-U Fs-user plane
gNB next generation node B
NGC next generation core
NG CP next generation control plane core
NG-C NG-control plane
NG-U NG-user plane
NR new radio
NR MAC new radio MAC
NR PHY new radio physical
NR PDCP new radio PDCP
NR RLC new radio RLC
NR RRC new radio RRC
NSSAI network slice selection assistance information
PLMN public land mobile network
UPGW user plane gateway
Xn-C Xn-control plane
Xn-U Xn-user plane
Xx-C Xx-control plane
Xx-U Xx-user plane
Example embodiments of the invention may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is a diagram depicting example sets of OFDM subcarriers as per an aspect of an embodiment of the present invention. As illustrated in this example, arrow(s) in the diagram may depict a subcarrier in a multicarrier OFDM system. The OFDM system may use technology such as OFDM technology, DFTS-OFDM, SC-OFDM technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
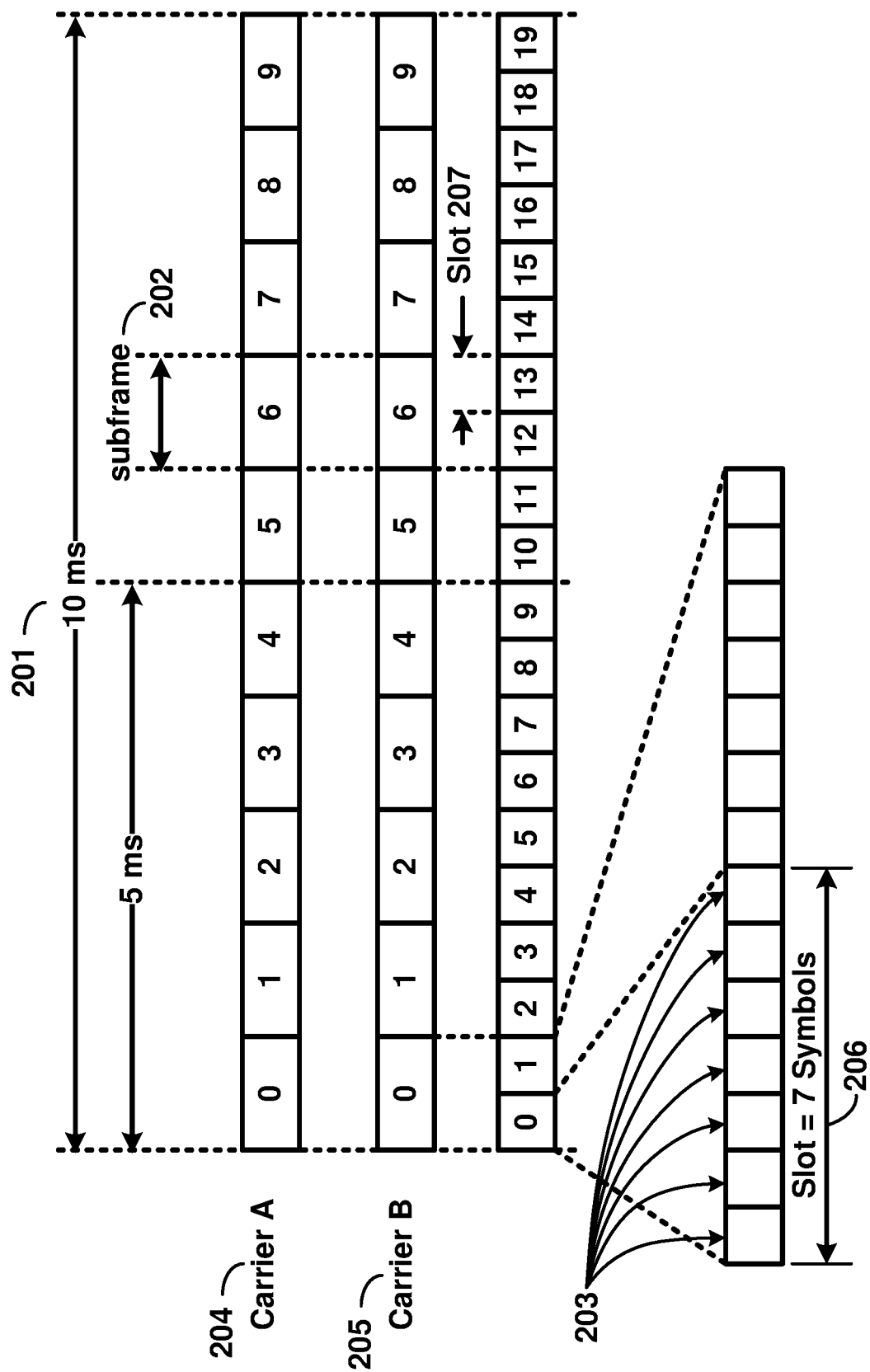
FIG. 2 is a diagram depicting an example transmission time and reception time for two carriers in a carrier group as per an aspect of an embodiment of the present disclosure.

FIG. 2 is a diagram depicting an example transmission time and reception time for two carriers as per an aspect of an embodiment of the present invention. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, radio frame duration is 10 msec. Other frame durations, for example, in the range of 1 to 100 msec may also be supported. In this example, each 10 ms radio frame 201 may be divided into ten equally sized subframes 202. Other subframe durations such as including 0.5 msec, 1 msec, 2 msec, and 5 msec may also be supported. Subframe(s) may consist of two or more slots (e.g. slots 206 and 207). For the example of FDD, 10 subframes may be available for downlink transmission and 10 subframes may be available for uplink transmissions in each 10 ms interval. Uplink and downlink transmissions may be separated in the frequency domain. A slot may be 7 or 14 OFDM symbols for the same subcarrier spacing of up to 60 kHz with normal CP. A slot may be 14 OFDM symbols for the same subcarrier spacing higher than 60 kHz with normal CP. A slot may contain all downlink, all uplink, or a downlink part and an uplink part and/or alike. Slot aggregation may be supported, e.g., data transmission may be scheduled to span one or multiple slots. In an example, a mini-slot may start at an OFDM symbol in a subframe. A mini-slot may have a duration of one or more OFDM symbols. Slot(s) may include a plurality of OFDM symbols 203. The number of OFDM symbols 203 in a slot 206 may depend on the cyclic prefix length and subcarrier spacing.

Figure 3:
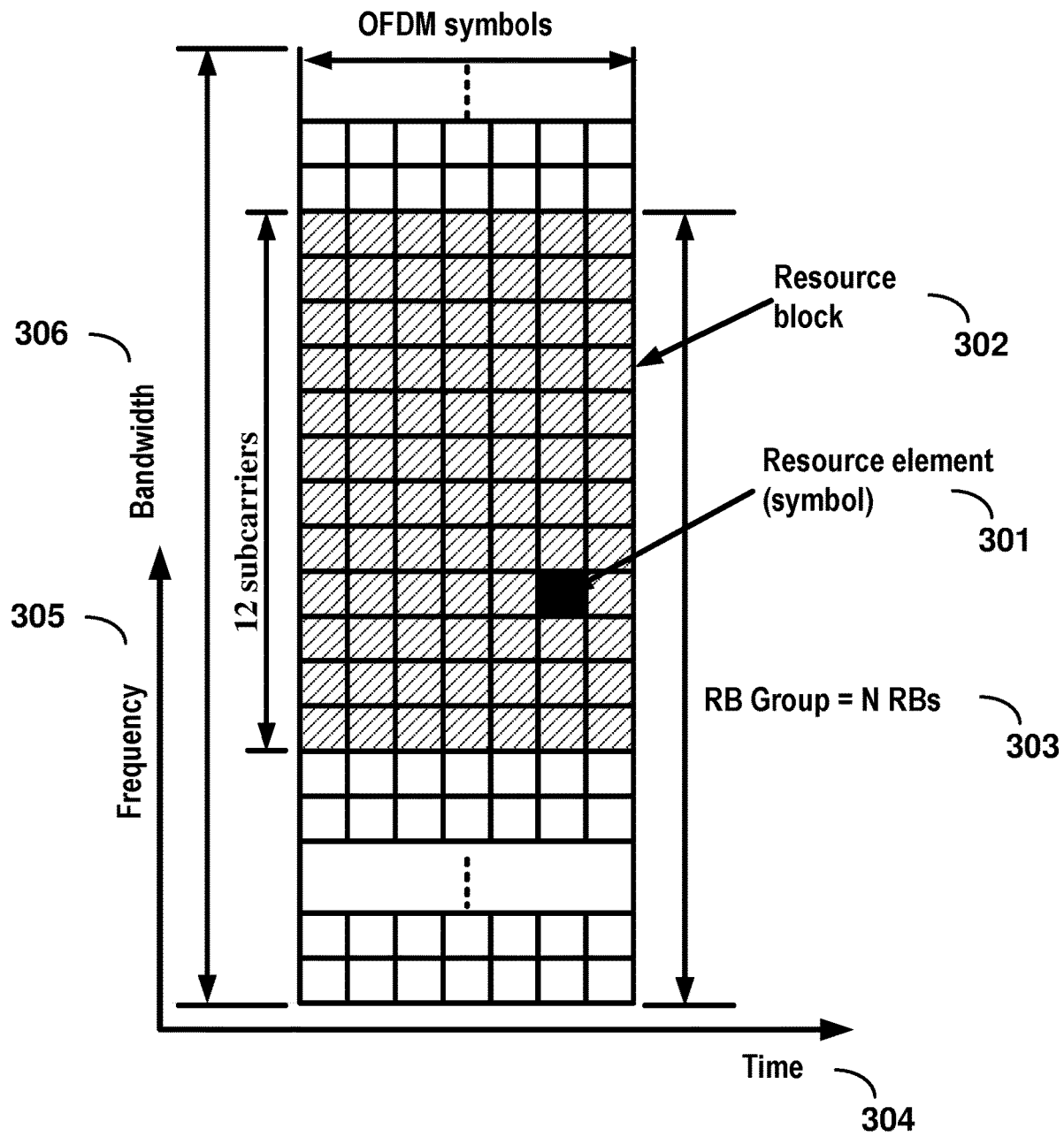
FIG. 3 is a diagram depicting OFDM radio resources as per an aspect of an embodiment of the present disclosure.

FIG. 3 is a diagram depicting OFDM radio resources as per an aspect of an embodiment of the present invention. The resource grid structure in time 304 and frequency 305 is illustrated in FIG. 3. The quantity of downlink subcarriers or RBs may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. In an illustrative example, a resource block may correspond to one slot in the time domain and 180 kHz in the frequency domain (for 15 KHz subcarrier bandwidth and 12 subcarriers).

In an example embodiment, multiple numerologies may be supported. In an example, a numerology may be derived by scaling a basic subcarrier spacing by an integer N. In an example, scalable numerology may allow at least from 15 kHz to 480 kHz subcarrier spacing. The numerology with 15 kHz and scaled numerology with different subcarrier spacing with the same CP overhead may align at a symbol boundary every 1 ms in a NR carrier.

Figure 5A:
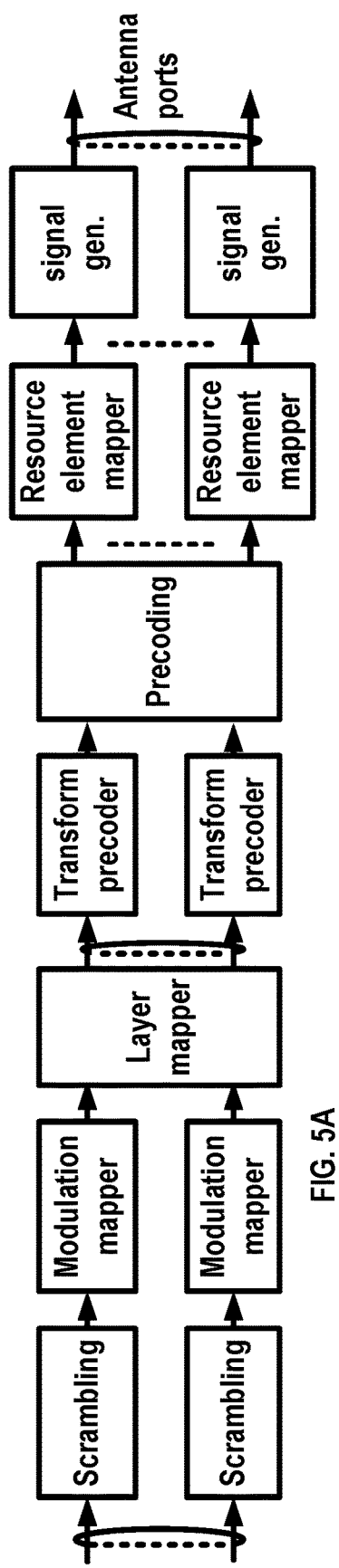
FIG. 5A, FIG. 5B, FIG. 5C and FIG. 5D are example diagrams for uplink and downlink signal transmission as per an aspect of an embodiment of the present disclosure.

FIG. 5A, FIG. 5B, FIG. 5C and FIG. 5D are example diagrams for uplink and downlink signal transmission as per an aspect of an embodiment of the present invention. FIG. 5A shows an example uplink physical channel. The baseband signal representing the physical uplink shared channel may perform the following processes. These functions are illustrated as examples and it is anticipated that other mechanisms may be implemented in various embodiments. The functions may comprise scrambling, modulation of scrambled bits to generate complex-valued symbols, mapping of the complex-valued modulation symbols onto one or several transmission layers, transform precoding to generate complex-valued symbols, precoding of the complex-valued symbols, mapping of precoded complex-valued symbols to resource elements, generation of complex-valued time-domain DFTS-OFDM/SC-FDMA signal for each antenna port, and/or the like.

Figure 5B:
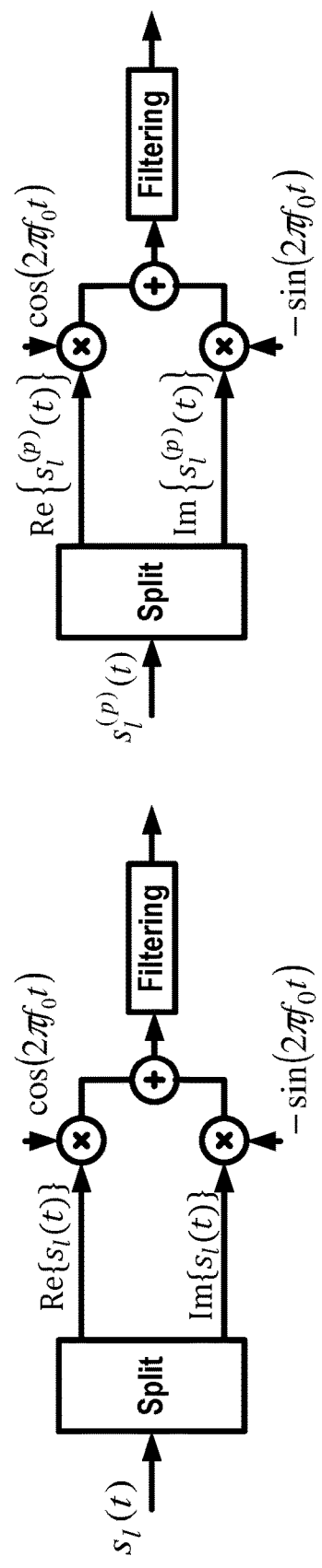

Example modulation and up-conversion to the carrier frequency of the complex-valued DFTS-OFDM/SC-FDMA baseband signal for each antenna port and/or the complex-valued PRACH baseband signal is shown in FIG. 5B. Filtering may be employed prior to transmission.

Figure 5D:
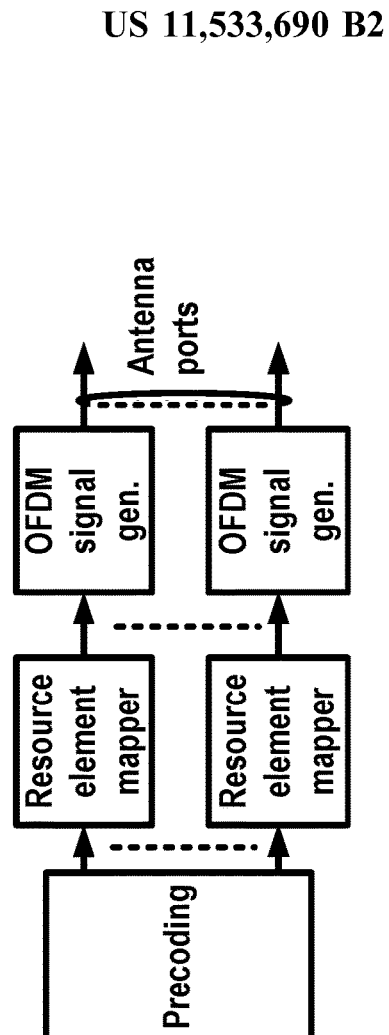
Figure 5C:
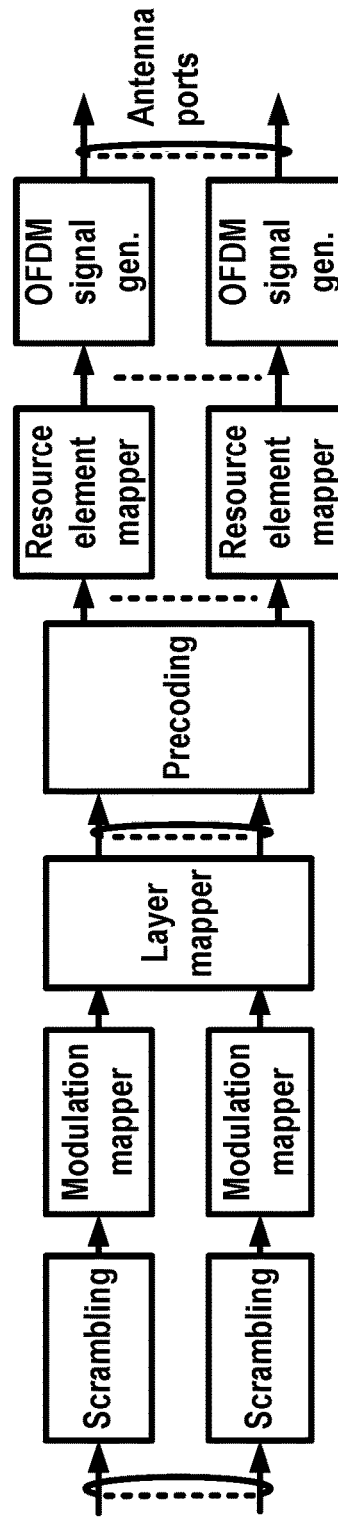

An example structure for Downlink Transmissions is shown in FIG. 5C. The baseband signal representing a downlink physical channel may perform the following processes. These functions are illustrated as examples and it is anticipated that other mechanisms may be implemented in various embodiments. The functions include scrambling of coded bits in each of the codewords to be transmitted on a physical channel; modulation of scrambled bits to generate complex-valued modulation symbols; mapping of the complex-valued modulation symbols onto one or several transmission layers; precoding of the complex-valued modulation symbols on each layer for transmission on the antenna ports; mapping of complex-valued modulation symbols for each antenna port to resource elements; generation of complex-valued time-domain OFDM signal for each antenna port, and/or the like.

Example modulation and up-conversion to the carrier frequency of the complex-valued OFDM baseband signal for each antenna port is shown in FIG. 5D. Filtering may be employed prior to transmission.

Figure 4:
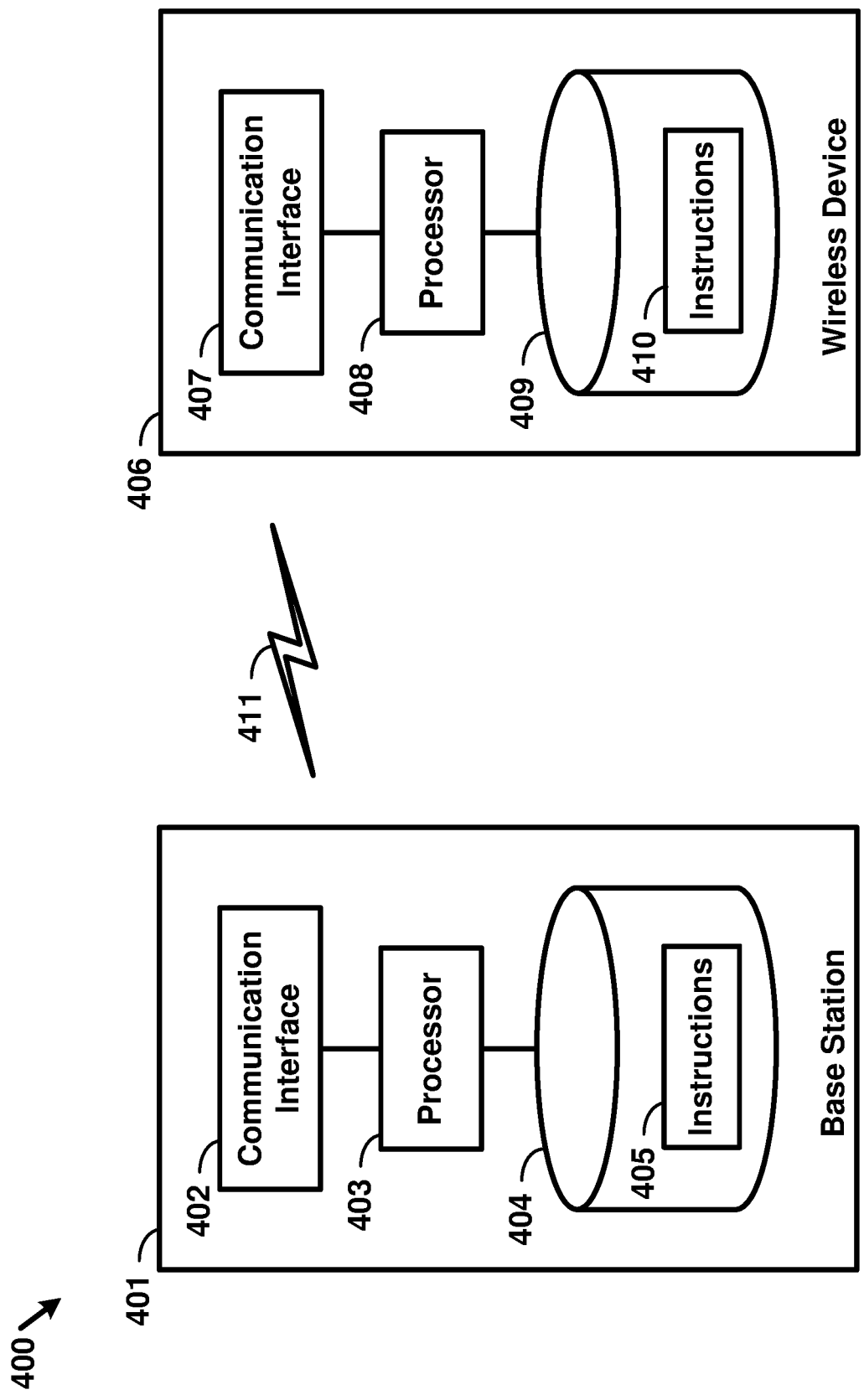
FIG. 4 is a block diagram of a base station and a wireless device as per an aspect of an embodiment of the present disclosure.

FIG. 4 is an example block diagram of a base station 401 and a wireless device 406, as per an aspect of an embodiment of the present invention. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to some of the various aspects of embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, FIG. 3, FIG. 5, and associated text.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

Figure 10A:
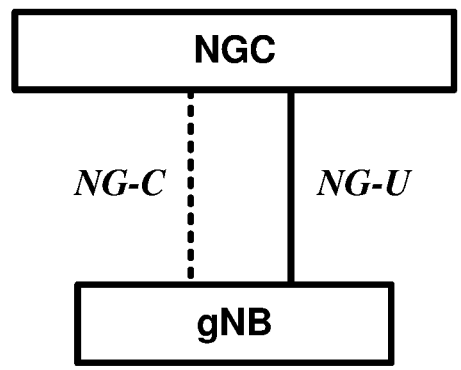
FIG. 10A and FIG. 10B are example diagrams for interfaces between a 5G core network (e.g. NGC) and base stations (e.g. gNB and eLTE eNB) as per an aspect of an embodiment of the present disclosure.
Figure 10B:
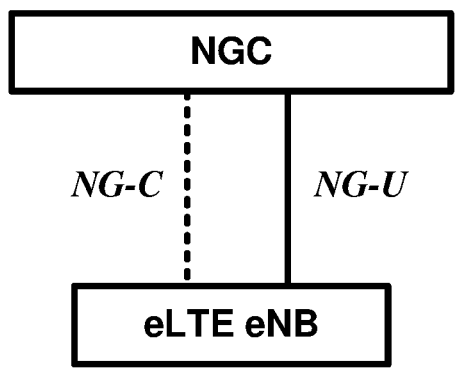

According to some of the various aspects of embodiments, a 5G network may include a multitude of base stations, providing a user plane NR PDCP/NR RLC/NR MAC/NR PHY and control plane (NR RRC) protocol terminations towards the wireless device. The base station(s) may be interconnected with other base station(s) (e.g. employing an Xn interface). The base stations may also be connected employing, for example, an NG interface to an NGC. FIG. 10A and FIG. 10B are example diagrams for interfaces between a 5G core network (e.g. NGC) and base stations (e.g. gNB and eLTE eNB) as per an aspect of an embodiment of the present invention. For example, the base stations may be interconnected to the NGC control plane (e.g. NG CP) employing the NG-C interface and to the NGC user plane (e.g. UPGW) employing the NG-U interface. The NG interface may support a many-to-many relation between 5G core networks and base stations.

A base station may include many sectors for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g. TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, it may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, when the specification refers to a first physical cell ID for a first downlink carrier, the specification may mean the first physical cell ID is for a cell comprising the first downlink carrier. The same concept may apply to, for example, carrier activation. When the specification indicates that a first carrier is activated, the specification may equally mean that the cell comprising the first carrier is activated.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices may support multiple technologies, and/or multiple releases of the same technology. Wireless devices may have some specific capability(ies) depending on its wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE or 5G technology.

Figure 6:
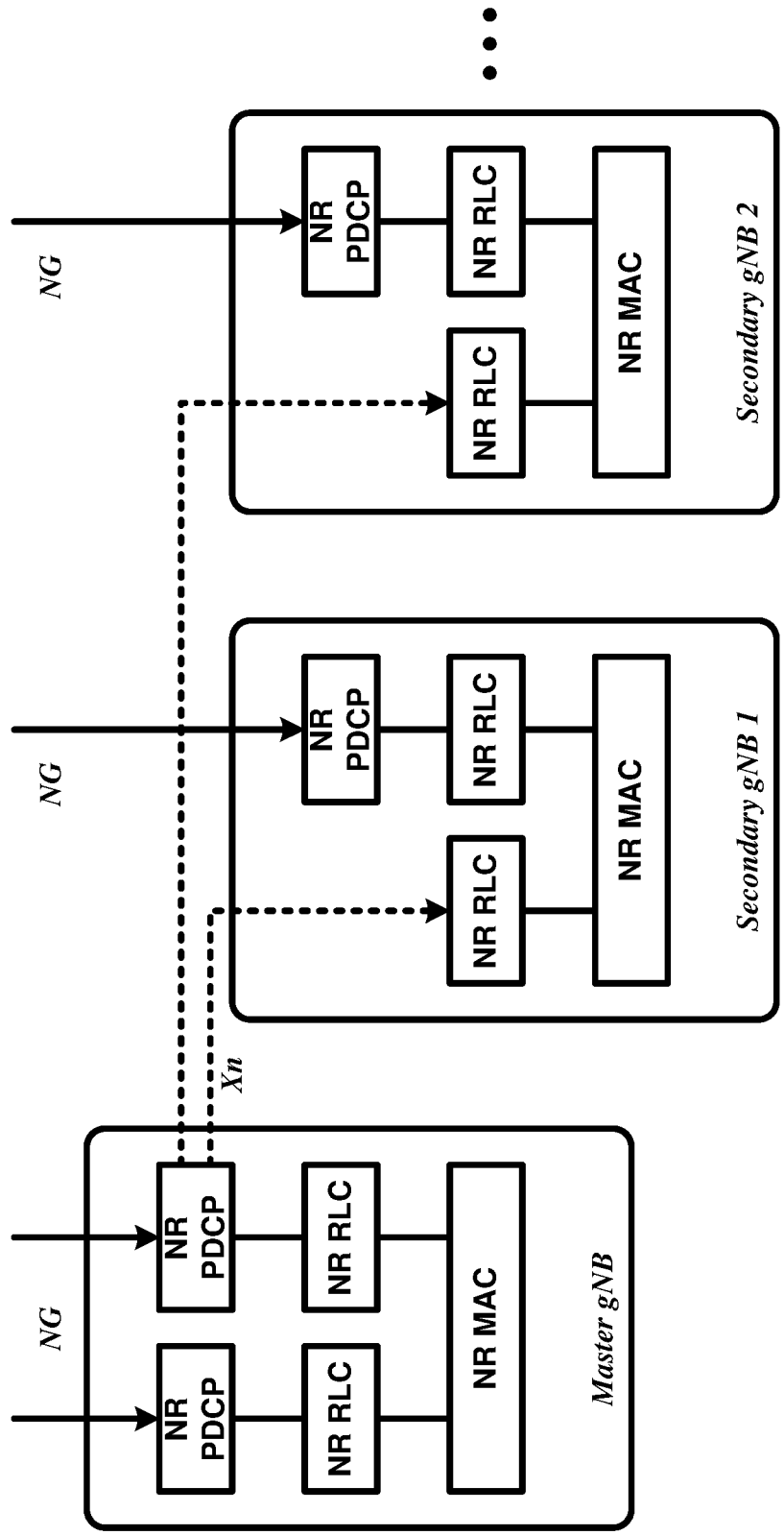
FIG. 6 is an example diagram for a protocol structure with multi-connectivity as per an aspect of an embodiment of the present disclosure.
Figure 7:
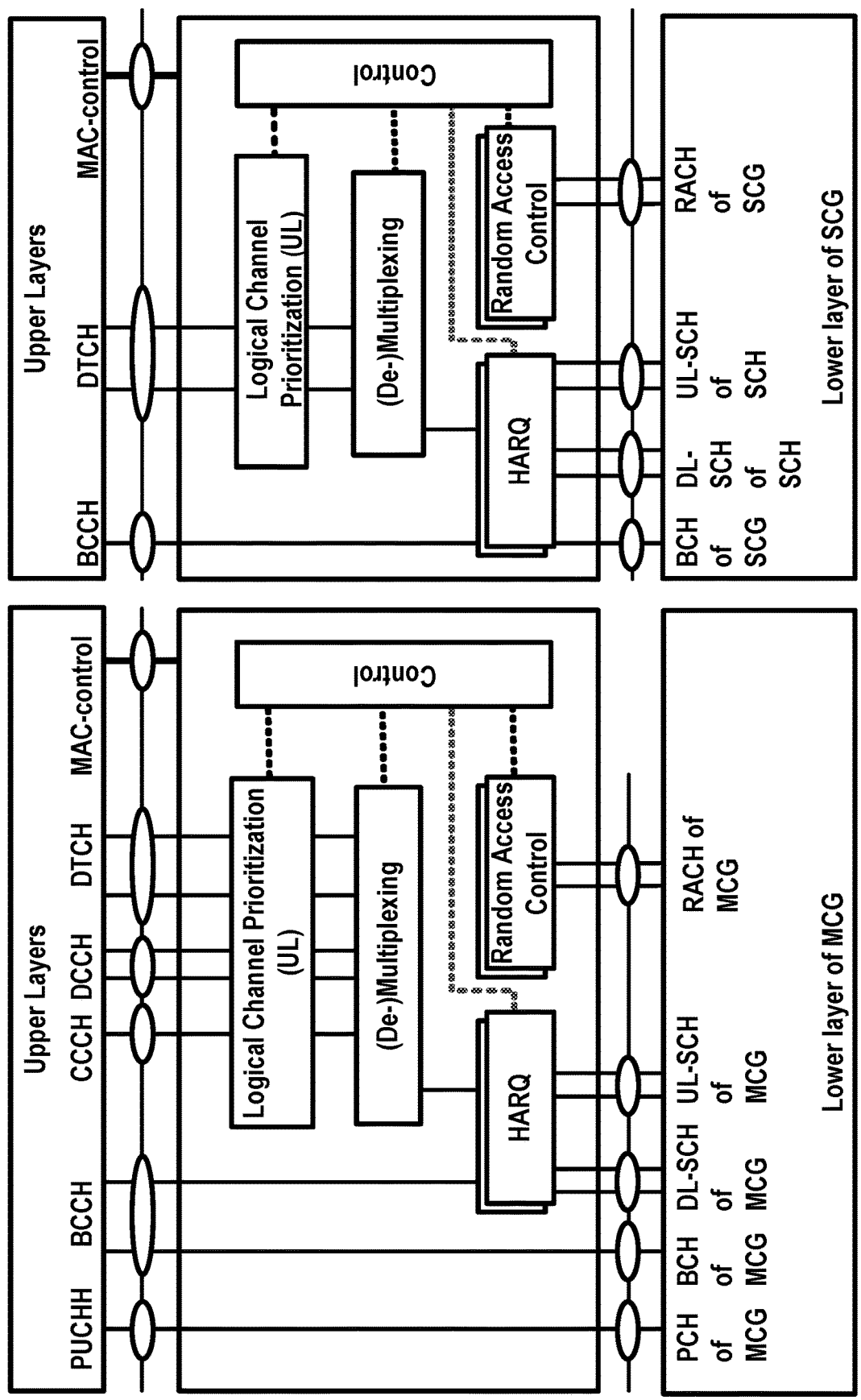
FIG. 7 is an example diagram for a protocol structure with CA and DC as per an aspect of an embodiment of the present disclosure.

FIG. 6 and FIG. 7 are example diagrams for protocol structure with CA and multi-connectivity as per an aspect of an embodiment of the present invention. NR may support multi-connectivity operation whereby a multiple RX/TX UE in RRC CONNECTED may be configured to utilize radio resources provided by multiple schedulers located in multiple gNBs connected via a non-ideal or ideal backhaul over the Xn interface. gNBs involved in multi-connectivity for a certain UE may assume two different roles: a gNB may either act as a master gNB or as a secondary gNB. In multi-connectivity, a UE may be connected to one master gNB and one or more secondary gNBs. FIG. 7 illustrates one example structure for the UE side MAC entities when a Master Cell Group (MCG) and a Secondary Cell Group (SCG) are configured, and it may not restrict implementation.

In multi-connectivity, the radio protocol architecture that a particular bearer uses may depend on how the bearer is setup. Three alternatives may exist, an MCG bearer, an SCG bearer and a split bearer as shown in FIG. 6. NR RRC may be located in master gNB and SRBs may be configured as a MCG bearer type and may use the radio resources of the master gNB. Multi-connectivity may also be described as having at least one bearer configured to use radio resources provided by the secondary gNB. Multi-connectivity may or may not be configured/implemented in example embodiments of the invention.

In the case of multi-connectivity, the UE may be configured with multiple NR MAC entities: one NR MAC entity for master gNB, and other NR MAC entities for secondary gNBs. In multi-connectivity, the configured set of serving cells for a UE may comprise of two subsets: the Master Cell Group (MCG) containing the serving cells of the master gNB, and the Secondary Cell Groups (SCGs) containing the serving cells of the secondary gNBs. For a SCG, one or more of the following may be applied: at least one cell in the SCG has a configured UL CC and one of them, named PSCell (or PCell of SCG, or sometimes called PCell), is configured with PUCCH resources; when the SCG is configured, there may be at least one SCG bearer or one Split bearer; upon detection of a physical layer problem or a random access problem on a PSCell, or the maximum number of NR RLC retransmissions has been reached associated with the SCG, or upon detection of an access problem on a PSCell during a SCG addition or a SCG change: a RRC connection re-establishment procedure may not be triggered, UL transmissions towards cells of the SCG are stopped, a master gNB may be informed by the UE of a SCG failure type, for split bearer, the DL data transfer over the master gNB is maintained; the NR RLC AM bearer may be configured for the split bearer; like PCell, PSCell may not be de-activated; PSCell may be changed with a SCG change (e.g. with security key change and a RACH procedure); and/or a direct bearer type change between a Split bearer and a SCG bearer or simultaneous configuration of a SCG and a Split bearer may or may not supported.

With respect to the interaction between a master gNB and secondary gNBs for multi-connectivity, one or more of the following principles may be applied: the master gNB may maintain the RRM measurement configuration of the UE and may, (e.g., based on received measurement reports or traffic conditions or bearer types), decide to ask a secondary gNB to provide additional resources (serving cells) for a UE; upon receiving a request from the master gNB, a secondary gNB may create a container that may result in the configuration of additional serving cells for the UE (or decide that it has no resource available to do so); for UE capability coordination, the master gNB may provide (part of) the AS configuration and the UE capabilities to the secondary gNB; the master gNB and the secondary gNB may exchange information about a UE configuration by employing of NR RRC containers (inter-node messages) carried in Xn messages; the secondary gNB may initiate a reconfiguration of its existing serving cells (e.g., PUCCH towards the secondary gNB); the secondary gNB may decide which cell is the PSCell within the SCG; the master gNB may or may not change the content of the NR RRC configuration provided by the secondary gNB; in the case of a SCG addition and a SCG SCell addition, the master gNB may provide the latest measurement results for the SCG cell(s); both a master gNB and secondary gNBs may know the SFN and subframe offset of each other by OAM, (e.g., for the purpose of DRX alignment and identification of a measurement gap). In an example, when adding a new SCG SCell, dedicated NR RRC signaling may be used for sending required system information of the cell as for CA, except for the SFN acquired from a MIB of the PSCell of a SCG.

In an example, serving cells may be grouped in a TA group (TAG). Serving cells in one TAG may use the same timing reference. For a given TAG, user equipment (UE) may use at least one downlink carrier as a timing reference. For a given TAG, a UE may synchronize uplink subframe and frame transmission timing of uplink carriers belonging to the same TAG. In an example, serving cells having an uplink to which the same TA applies may correspond to serving cells hosted by the same receiver. A UE supporting multiple TAs may support two or more TA groups. One TA group may contain the PCell and may be called a primary TAG (pTAG). In a multiple TAG configuration, at least one TA group may not contain the PCell and may be called a secondary TAG (sTAG). In an example, carriers within the same TA group may use the same TA value and/or the same timing reference. When DC is configured, cells belonging to a cell group (MCG or SCG) may be grouped into multiple TAGs including a pTAG and one or more sTAGs.

Figure 8:
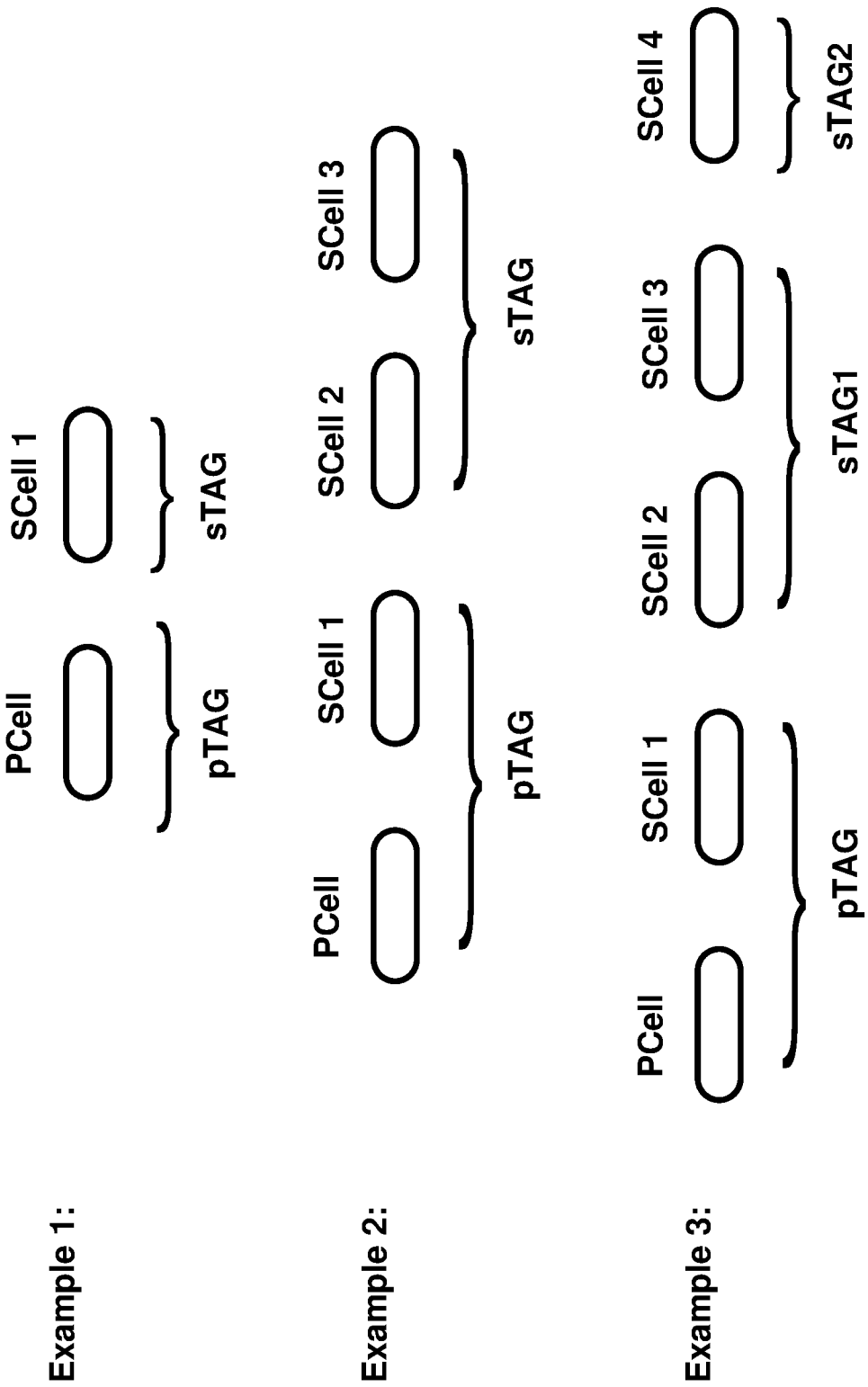
FIG. 8 shows example TAG configurations as per an aspect of an embodiment of the present disclosure.

FIG. 8 shows example TAG configurations as per an aspect of an embodiment of the present invention. In Example 1, pTAG comprises PCell, and an sTAG comprises SCeLL1. In Example 2, a pTAG comprises a PCell and SCeLL1, and an sTAG comprises SCeLL2 and SCeLL3. In Example 3, pTAG comprises PCell and SCeLL1, and an sTAG1 includes SCeLL2 and SCeLL3, and sTAG2 comprises SCeLL4. Up to four TAGs may be supported in a cell group (MCG or SCG) and other example TAG configurations may also be provided. In various examples in this disclosure, example mechanisms are described for a pTAG and an sTAG. Some of the example mechanisms may be applied to configurations with multiple sTAGs.

In an example, an eNB may initiate an RA procedure via a PDCCH order for an activated SCell. This PDCCH order may be sent on a scheduling cell of this SCell. When cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
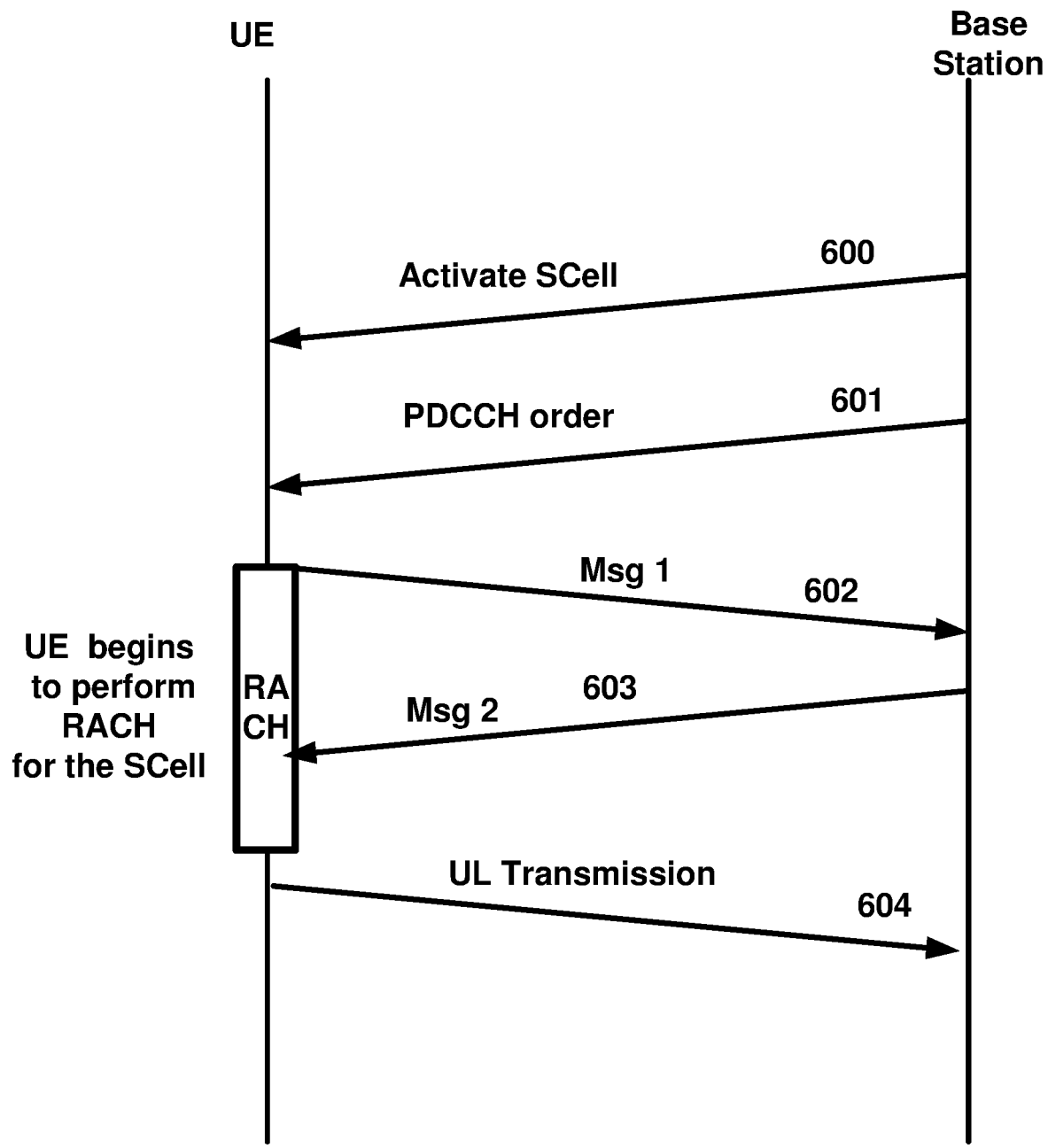
FIG. 9 is an example message flow in a random access process in a secondary TAG as per an aspect of an embodiment of the present disclosure.

FIG. 9 is an example message flow in a random access process in a secondary TAG as per an aspect of an embodiment of the present invention. An eNB transmits an activation command 600 to activate an SCell. A preamble 602 (Msg1) may be sent by a UE in response to a PDCCH order 601 on an SCell belonging to an sTAG. In an example embodiment, preamble transmission for SCells may be controlled by the network using PDCCH format 1A. Msg2 message 603 (RAR: random access response) in response to the preamble transmission on the SCell may be addressed to RA-RNTI in a PCell common search space (CSS). Uplink packets 604 may be transmitted on the SCell in which the preamble was transmitted.

According to some of the various aspects of embodiments, initial timing alignment may be achieved through a random access procedure. This may involve a UE transmitting a random access preamble and an eNB responding with an initial TA command NTA (amount of timing advance) within a random access response window. The start of the random access preamble may be aligned with the start of a corresponding uplink subframe at the UE assuming NTA=0. The eNB may estimate the uplink timing from the random access preamble transmitted by the UE. The TA command may be derived by the eNB based on the estimation of the difference between the desired UL timing and the actual UL timing. The UE may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. According to some of the various aspects of embodiments, when an eNB performs an SCell addition configuration, the related TAG configuration may be configured for the SCell. In an example embodiment, an eNB may modify the TAG configuration of an SCell by removing (releasing) the SCell and adding (configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In an example implementation, it may not be possible to change the TAG associated with an SCell, but rather, the SCell may need to be removed and a new SCell may need to be added with another TAG. For example, if there is a need to move an SCell from an sTAG to a pTAG, at least one RRC message, for example, at least one RRC reconfiguration message, may be send to the UE to reconfigure TAG configurations by releasing the SCell and then configuring the SCell as a part of the pTAG (when an SCell is added/configured without a TAG index, the SCell may be explicitly assigned to the pTAG). The PCell may not change its TA group and may be a member of the pTAG.

The purpose of an RRC connection reconfiguration procedure may be to modify an RRC connection, (e.g. to establish, modify and/or release RBs, to perform handover, to setup, modify, and/or release measurements, to add, modify, and/or release SCells). If the received RRC Connection Reconfiguration message includes the sCellToReleaseList, the UE may perform an SCell release. If the received RRC Connection Reconfiguration message includes the sCellToAddModList, the UE may perform SCell additions or modification.

In LTE Release-10 and Release-11 CA, a PUCCH is only transmitted on the PCell (PSCell) to an eNB. In LTE-Release 12 and earlier, a UE may transmit PUCCH information on one cell (PCell or PSCell) to a given eNB.

As the number of CA capable UEs and also the number of aggregated carriers increase, the number of PUCCHs and also the PUCCH payload size may increase. Accommodating the PUCCH transmissions on the PCell may lead to a high PUCCH load on the PCell. A PUCCH on an SCell may be introduced to offload the PUCCH resource from the PCell. More than one PUCCH may be configured for example, a PUCCH on a PCell and another PUCCH on an SCell. In the example embodiments, one, two or more cells may be configured with PUCCH resources for transmitting CSI/ACK/NACK to a base station. Cells may be grouped into multiple PUCCH groups, and one or more cell within a group may be configured with a PUCCH. In an example configuration, one SCell may belong to one PUCCH group. SCells with a configured PUCCH transmitted to a base station may be called a PUCCH SCell, and a cell group with a common PUCCH resource transmitted to the same base station may be called a PUCCH group.

In an example embodiment, a MAC entity may have a configurable timer timeAlignmentTimer per TAG. The timeAlignmentTimer may be used to control how long the MAC entity considers the Serving Cells belonging to the associated TAG to be uplink time aligned. The MAC entity may, when a Timing Advance Command MAC control element is received, apply the Timing Advance Command for the indicated TAG; start or restart the timeAlignmentTimer associated with the indicated TAG. The MAC entity may, when a Timing Advance Command is received in a Random Access Response message for a serving cell belonging to a TAG and/or if the Random Access Preamble was not selected by the MAC entity, apply the Timing Advance Command for this TAG and start or restart the timeAlignmentTimer associated with this TAG. Otherwise, if the timeAlignmentTimer associated with this TAG is not running, the Timing Advance Command for this TAG may be applied and the timeAlignmentTimer associated with this TAG started. When the contention resolution is considered not successful, a timeAlignmentTimer associated with this TAG may be stopped. Otherwise, the MAC entity may ignore the received Timing Advance Command.

In example embodiments, a timer is running once it is started, until it is stopped or until it expires; otherwise it may not be running. A timer can be started if it is not running or restarted if it is running. For example, a timer may be started or restarted from its initial value.

Example embodiments of the invention may enable operation of multi-carrier communications. Other example embodiments may comprise a non-transitory tangible computer readable media comprising instructions executable by one or more processors to cause operation of multi-carrier communications. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to enable operation of multi-carrier communications. The device may include processors, memory, interfaces, and/or the like. Other example embodiments may comprise communication networks comprising devices such as base stations, wireless devices (or user equipment: UE), servers, switches, antennas, and/or the like.

FIG. 11A, FIG. 11B, FIG. 11C, FIG. 11D, FIG. 11E, and FIG. 11F are example diagrams for architectures of tight interworking between 5G RAN and LTE RAN as per an aspect of an embodiment of the present invention. The tight interworking may enable a multiple RX/TX UE in RRC CONNECTED to be configured to utilize radio resources provided by two schedulers located in two base stations (e.g. (e)LTE eNB and gNB) connected via a non-ideal or ideal backhaul over the Xx interface between LTE eNB and gNB or the Xn interface between eLTE eNB and gNB. Base stations involved in tight interworking for a certain UE may assume two different roles: a base station may either act as a master base station or as a secondary base station. In tight interworking, a UE may be connected to one master base station and one secondary base station. Mechanisms implemented in tight interworking may be extended to cover more than two base stations.

In FIG. 11A and FIG. 11B, a master base station may be an LTE eNB, which may be connected to EPC nodes (e.g. to an MME via the S1-C interface and to an S-GW via the S1-U interface), and a secondary base station may be a gNB, which may be a non-standalone node having a control plane connection via an Xx-C interface to an LTE eNB. In the tight interworking architecture of FIG. 11A, a user plane for a gNB may be connected to an S-GW through an LTE eNB via an Xx-U interface between LTE eNB and gNB and an S1-U interface between LTE eNB and S-GW. In the architecture of FIG. 11B, a user plane for a gNB may be connected directly to an S-GW via an S1-U interface between gNB and S-GW.

In FIG. 11C and FIG. 11D, a master base station may be a gNB, which may be connected to NGC nodes (e.g. to a control plane core node via the NG-C interface and to a user plane core node via the NG-U interface), and a secondary base station may be an eLTE eNB, which may be a non-standalone node having a control plane connection via an Xn-C interface to a gNB. In the tight interworking architecture of FIG. 11C, a user plane for an eLTE eNB may be connected to a user plane core node through a gNB via an Xn-U interface between eLTE eNB and gNB and an NG-U interface between gNB and user plane core node. In the architecture of FIG. 11D, a user plane for an eLTE eNB may be connected directly to a user plane core node via an NG-U interface between eLTE eNB and user plane core node.

In FIG. 11E and FIG. 11F, a master base station may be an eLTE eNB, which may be connected to NGC nodes (e.g. to a control plane core node via the NG-C interface and to a user plane core node via the NG-U interface), and a secondary base station may be a gNB, which may be a non-standalone node having a control plane connection via an Xn-C interface to an eLTE eNB. In the tight interworking architecture of FIG. 11E, a user plane for a gNB may be connected to a user plane core node through an eLTE eNB via an Xn-U interface between eLTE eNB and gNB and an NG-U interface between eLTE eNB and user plane core node. In the architecture of FIG. 11F, a user plane for a gNB may be connected directly to a user plane core node via an NG-U interface between gNB and user plane core node.

Figure 12A:
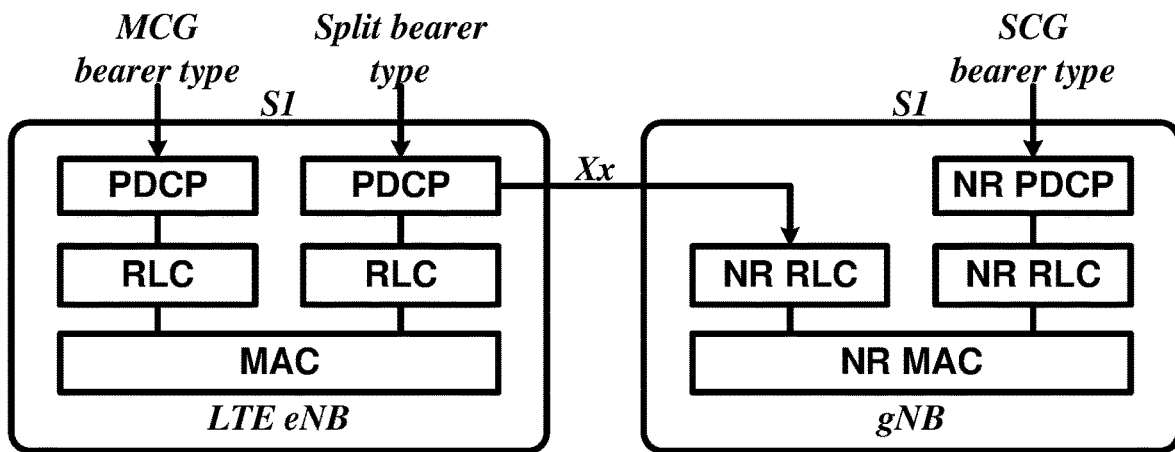
FIG. 12A, FIG. 12B, and FIG. 12C are example diagrams for radio protocol structures of tight interworking bearers as per an aspect of an embodiment of the present disclosure.
Figure 12B:
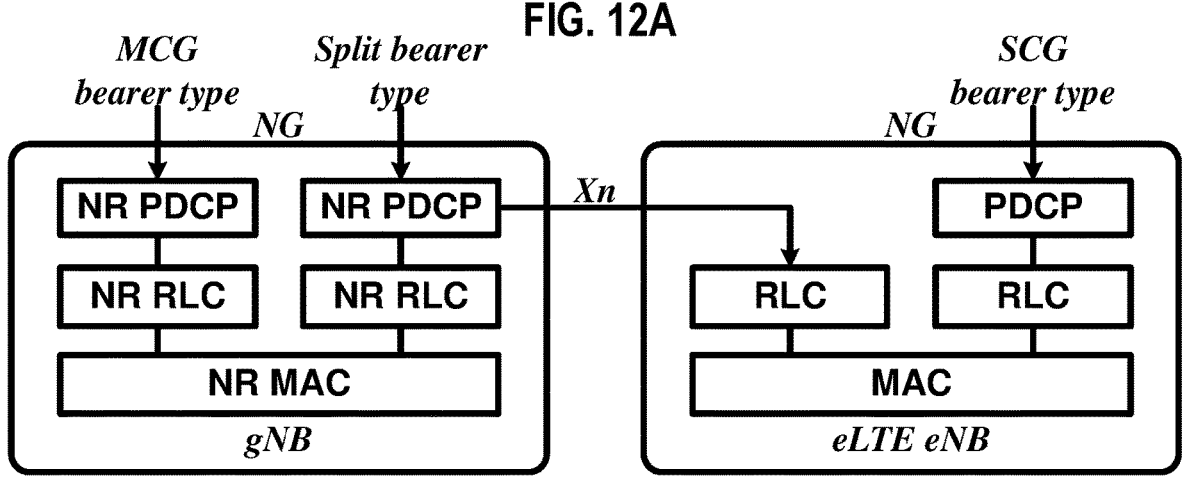
Figure 12C:
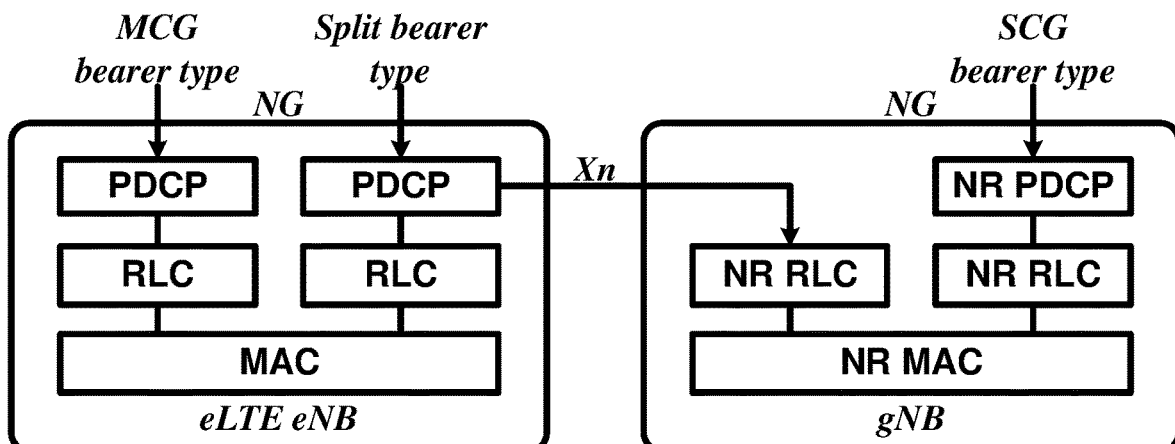

FIG. 12A, FIG. 12B, and FIG. 12C are example diagrams for radio protocol structures of tight interworking bearers as per an aspect of an embodiment of the present invention. In FIG. 12A, an LTE eNB may be a master base station, and a gNB may be a secondary base station. In FIG. 12B, a gNB may be a master base station, and an eLTE eNB may be a secondary base station. In FIG. 12C, an eLTE eNB may be a master base station, and a gNB may be a secondary base station. In 5G network, the radio protocol architecture that a particular bearer uses may depend on how the bearer is setup. Three alternatives may exist, an MCG bearer, an SCG bearer, and a split bearer as shown in FIG. 12A, FIG. 12B, and FIG. 12C. NR RRC may be located in master base station, and SRBs may be configured as an MCG bearer type and may use the radio resources of the master base station. Tight interworking may also be described as having at least one bearer configured to use radio resources provided by the secondary base station. Tight interworking may or may not be configured/implemented in example embodiments of the invention.

In the case of tight interworking, the UE may be configured with two MAC entities: one MAC entity for master base station, and one MAC entity for secondary base station. In tight interworking, the configured set of serving cells for a UE may comprise of two subsets: the Master Cell Group (MCG) containing the serving cells of the master base station, and the Secondary Cell Group (SCG) containing the serving cells of the secondary base station. For a SCG, one or more of the following may be applied: at least one cell in the SCG has a configured UL CC and one of them, named PSCell (or PCell of SCG, or sometimes called PCell), is configured with PUCCH resources; when the SCG is configured, there may be at least one SCG bearer or one split bearer; upon detection of a physical layer problem or a random access problem on a PSCell, or the maximum number of (NR) RLC retransmissions has been reached associated with the SCG, or upon detection of an access problem on a PSCell during a SCG addition or a SCG change: a RRC connection re-establishment procedure may not be triggered, UL transmissions towards cells of the SCG are stopped, a master base station may be informed by the UE of a SCG failure type, for split bearer, the DL data transfer over the master base station is maintained; the RLC AM bearer may be configured for the split bearer; like PCell, PSCell may not be de-activated; PSCell may be changed with a SCG change (e.g. with security key change and a RACH procedure); and/or neither a direct bearer type change between a Split bearer and a SCG bearer nor simultaneous configuration of a SCG and a Split bearer are supported.

With respect to the interaction between a master base station and a secondary base station, one or more of the following principles may be applied: the master base station may maintain the RRM measurement configuration of the UE and may, (e.g., based on received measurement reports, traffic conditions, or bearer types), decide to ask a secondary base station to provide additional resources (serving cells) for a UE; upon receiving a request from the master base station, a secondary base station may create a container that may result in the configuration of additional serving cells for the UE (or decide that it has no resource available to do so); for UE capability coordination, the master base station may provide (part of) the AS configuration and the UE capabilities to the secondary base station; the master base station and the secondary base station may exchange information about a UE configuration by employing of RRC containers (inter-node messages) carried in Xn or Xx messages; the secondary base station may initiate a reconfiguration of its existing serving cells (e.g., PUCCH towards the secondary base station); the secondary base station may decide which cell is the PSCell within the SCG; the master base station may not change the content of the RRC configuration provided by the secondary base station; in the case of a SCG addition and a SCG SCell addition, the master base station may provide the latest measurement results for the SCG cell(s); both a master base station and a secondary base station may know the SFN and subframe offset of each other by OAM, (e.g., for the purpose of DRX alignment and identification of a measurement gap). In an example, when adding a new SCG SCell, dedicated RRC signaling may be used for sending required system information of the cell as for CA, except for the SFN acquired from a MIB of the PSCell of a SCG.

Figure 13A:
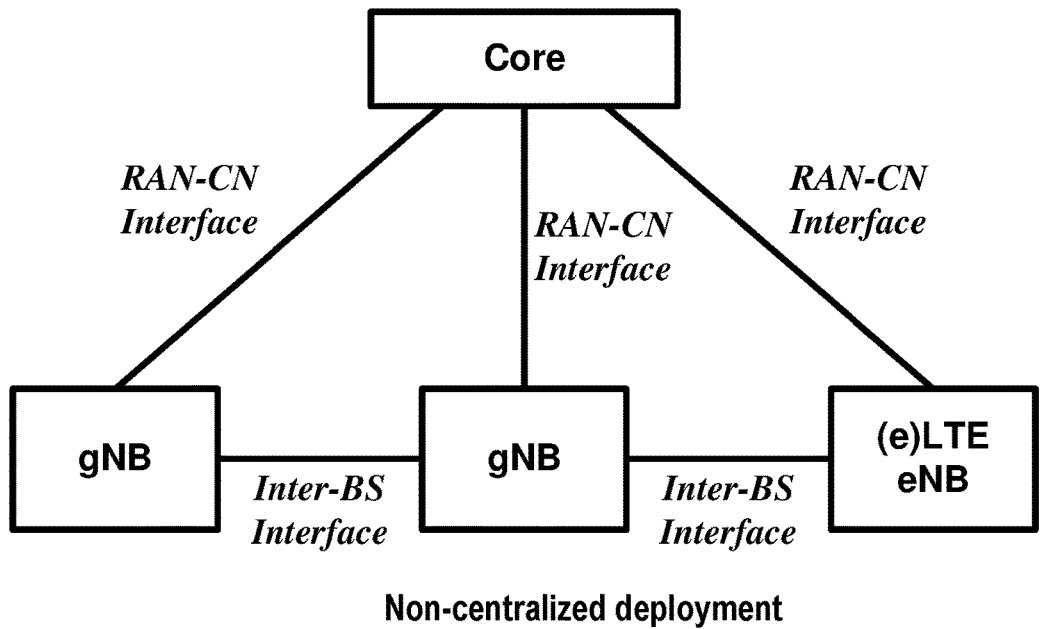
FIG. 13A and FIG. 13B are example diagrams for gNB deployment scenarios as per an aspect of an embodiment of the present disclosure.
Figure 13B:
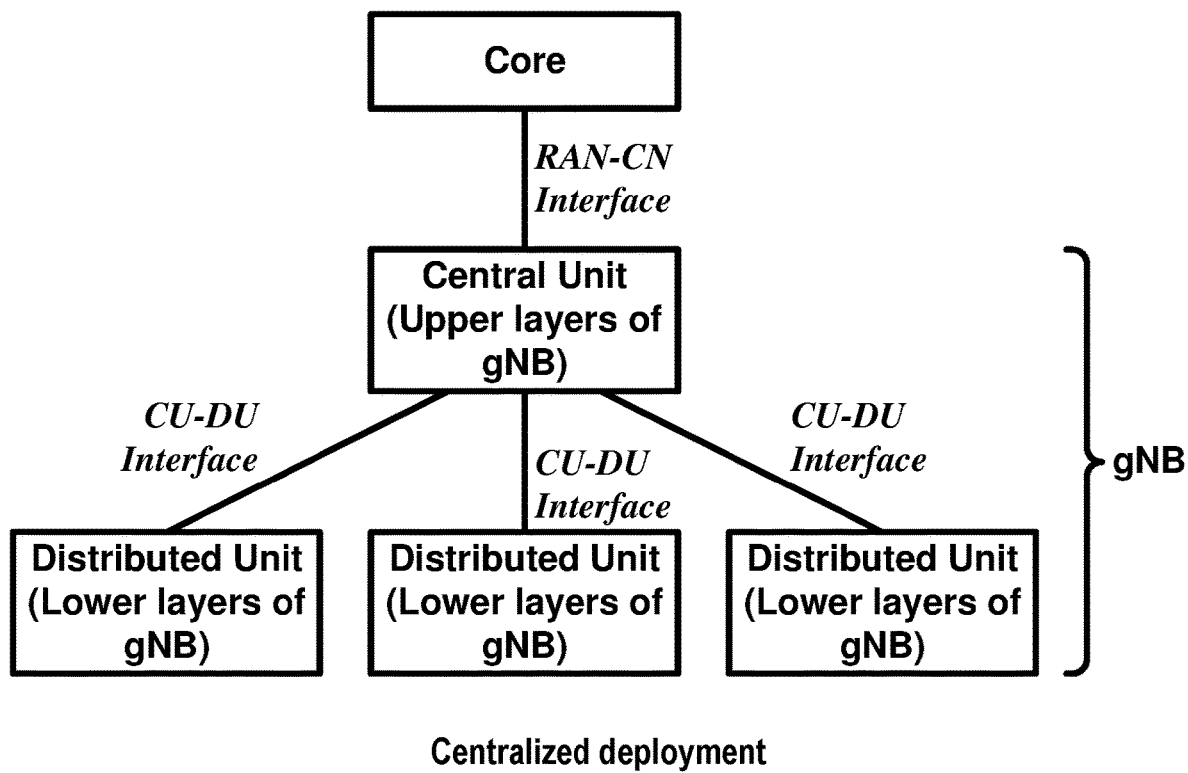

FIG. 13A and FIG. 13B are example diagrams for gNB deployment scenarios as per an aspect of an embodiment of the present invention. In the non-centralized deployment scenario in FIG. 13A, the full protocol stack (e.g. NR RRC, NR PDCP, NR RLC, NR MAC, and NR PHY) may be supported at one node. In the centralized deployment scenario in FIG. 13B, upper layers of gNB may be located in a Central Unit (CU), and lower layers of gNB may be located in Distributed Units (DU). The CU-DU interface (e.g. Fs interface) connecting CU and DU may be ideal or non-ideal. Fs-C may provide a control plane connection over Fs interface, and Fs-U may provide a user plane connection over Fs interface. In the centralized deployment, different functional split options between CU and DUs may be possible by locating different protocol layers (RAN functions) in CU and DU. The functional split may support flexibility to move RAN functions between CU and DU depending on service requirements and/or network environments. The functional split option may change during operation after Fs interface setup procedure, or may change only in Fs setup procedure (i.e. static during operation after Fs setup procedure).

Figure 14:
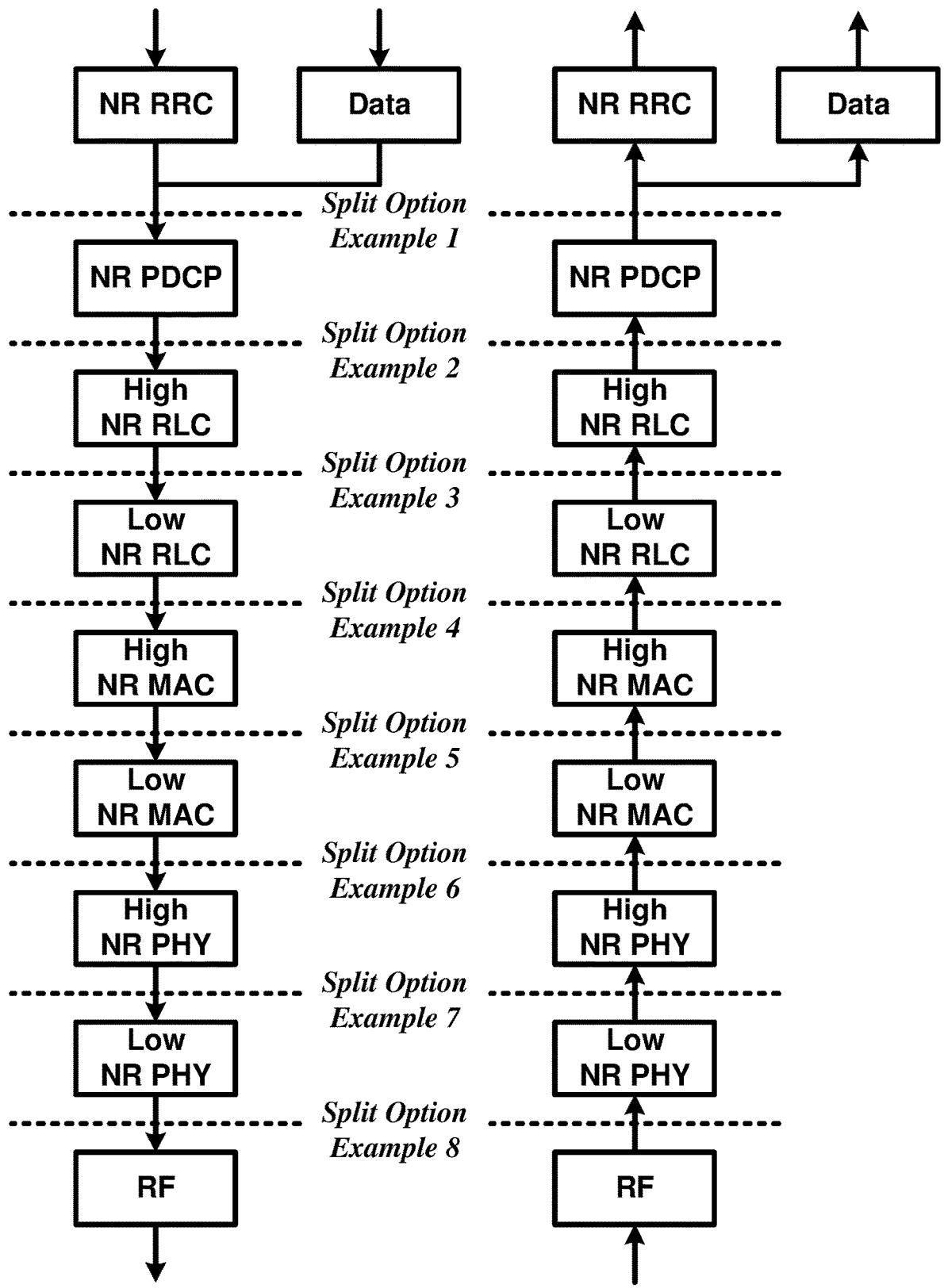
FIG. 14 is an example diagram for functional split option examples of the centralized gNB deployment scenario as per an aspect of an embodiment of the present disclosure.

FIG. 14 is an example diagram for different functional split option examples of the centralized gNB deployment scenario as per an aspect of an embodiment of the present invention. In the split option example 1, an NR RRC may be in CU, and NR PDCP, NR RLC, NR MAC, NR PHY, and RF may be in DU. In the split option example 2, an NR RRC and NR PDCP may be in CU, and NR RLC, NR MAC, NR PHY, and RF may be in DU. In the split option example 3, an NR RRC, NR PDCP, and partial function of NR RLC may be in CU, and the other partial function of NR RLC, NR MAC, NR PHY, and RF may be in DU. In the split option example 4, an NR RRC, NR PDCP, and NR RLC may be in CU, and NR MAC, NR PHY, and RF may be in DU. In the split option example 5, an NR RRC, NR PDCP, NR RLC, and partial function of NR MAC may be in CU, and the other partial function of NR MAC, NR PHY, and RF may be in DU. In the split option example 6, an NR RRC, NR PDCP, NR RLC, and NR MAC may be in CU, and NR PHY and RF may be in DU. In the split option example 7, an NR RRC, NR PDCP, NR RLC, NR MAC, and partial function of NR PHY may be in CU, and the other partial function of NR PHY and RF may be in DU. In the split option example 8, an NR RRC, NR PDCP, NR RLC, NR MAC, and NR PHY may be in CU, and RF may be in DU.

The functional split may be configured per CU, per DU, per UE, per bearer, per slice, or with other granularities. In per CU split, a CU may have a fixed split, and DUs may be configured to match the split option of CU. In per DU split, each DU may be configured with a different split, and a CU may provide different split options for different DUs. In per UE split, a gNB (CU and DU) may provide different split options for different UEs. In per bearer split, different split options may be utilized for different bearer types. In per slice splice, different split options may be applied for different slices.

In an example embodiment, the new radio access network (new RAN) may support different network slices, which may allow differentiated treatment customized to support different service requirements with end to end scope. The new RAN may provide a differentiated handling of traffic for different network slices that may be pre-configured, and may allow a single RAN node to support multiple slices. The new RAN may support selection of a RAN part for a given network slice, by one or more slice ID(s) or NSSAI(s) provided by a UE or a NGC (e.g. NG CP). The slice ID(s) or NSSAI(s) may identify one or more of pre-configured network slices in a PLMN. For initial attach, a UE may provide a slice ID and/or an NSSAI, and a RAN node (e.g. gNB) may use the slice ID or the NSSAI for routing an initial NAS signaling to an NGC control plane function (e.g. NG CP). If a UE does not provide any slice ID or NSSAI, a RAN node may send a NAS signaling to a default NGC control plane function. For subsequent accesses, the UE may provide a temporary ID for a slice identification, which may be assigned by the NGC control plane function, to enable a RAN node to route the NAS message to a relevant NGC control plane function. The new RAN may support resource isolation between slices. The RAN resource isolation may be achieved by avoiding that shortage of shared resources in one slice breaks a service level agreement for another slice.

The amount of data traffic carried over cellular networks is expected to increase for many years to come. The number of users/devices is increasing and each user/device accesses an increasing number and variety of services, e.g. video delivery, large files, images. This requires not only high capacity in the network, but also provisioning very high data rates to meet customers' expectations on interactivity and responsiveness. More spectrum is therefore needed for cellular operators to meet the increasing demand. Considering user expectations of high data rates along with seamless mobility, it is beneficial that more spectrum be made available for deploying macro cells as well as small cells for cellular systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, when present, can be an effective complement to licensed spectrum for cellular operators to help addressing the traffic explosion in some scenarios, such as hotspot areas. LAA offers an alternative for operators to make use of unlicensed spectrum while managing one radio network, thus offering new possibilities for optimizing the network's efficiency.

In an example embodiment, Listen-before-talk (clear channel assessment) may be implemented for transmission in an LAA cell. In a listen-before-talk (LBT) procedure, equipment may apply a clear channel assessment (CCA) check before using the channel. For example, the CCA utilizes at least energy detection to determine the presence or absence of other signals on a channel in order to determine if a channel is occupied or clear, respectively. For example, European and Japanese regulations mandate the usage of LBT in the unlicensed bands. Apart from regulatory requirements, carrier sensing via LBT may be one way for fair sharing of the unlicensed spectrum.

In an example embodiment, discontinuous transmission on an unlicensed carrier with limited maximum transmission duration may be enabled. Some of these functions may be supported by one or more signals to be transmitted from the beginning of a discontinuous LAA downlink transmission. Channel reservation may be enabled by the transmission of signals, by an LAA node, after gaining channel access via a successful LBT operation, so that other nodes that receive the transmitted signal with energy above a certain threshold sense the channel to be occupied. Functions that may need to be supported by one or more signals for LAA operation with discontinuous downlink transmission may include one or more of the following: detection of the LAA downlink transmission (including cell identification) by UEs; time & frequency synchronization of UEs.

In an example embodiment, DL LAA design may employ subframe boundary alignment according to LTE-A carrier aggregation timing relationships across serving cells aggregated by CA. This may not imply that the eNB transmissions can start only at the subframe boundary. LAA may support transmitting PDSCH when not all OFDM symbols are available for transmission in a subframe according to LBT. Delivery of necessary control information for the PDSCH may also be supported.

LBT procedure may be employed for fair and friendly coexistence of LAA with other operators and technologies operating in unlicensed spectrum. LBT procedures on a node attempting to transmit on a carrier in unlicensed spectrum require the node to perform a clear channel assessment to determine if the channel is free for use. An LBT procedure may involve at least energy detection to determine if the channel is being used. For example, regulatory requirements in some regions, e.g., in Europe, specify an energy detection threshold such that if a node receives energy greater than this threshold, the node assumes that the channel is not free. While nodes may follow such regulatory requirements, a node may optionally use a lower threshold for energy detection than that specified by regulatory requirements. In an example, LAA may employ a mechanism to adaptively change the energy detection threshold, e.g., LAA may employ a mechanism to adaptively lower the energy detection threshold from an upper bound. Adaptation mechanism may not preclude static or semi-static setting of the threshold. In an example Category 4 LBT mechanism or other type of LBT mechanisms may be implemented.

Various example LBT mechanisms may be implemented. In an example, for some signals, in some implementation scenarios, in some situations, and/or in some frequencies no LBT procedure may performed by the transmitting entity. In an example, Category 2 (e.g. LBT without random back-off) may be implemented. The duration of time that the channel is sensed to be idle before the transmitting entity transmits may be deterministic. In an example, Category 3 (e.g. LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle before the transmitting entity transmits on the channel. In an example, Category 4 (e.g. LBT with random back-off with a contention window of variable size) may be implemented. The transmitting entity may draw a random number N within a contention window. The size of contention window may be specified by the minimum and maximum value of N. The transmitting entity may vary the size of the contention window when drawing the random number N. The random number N is used in the LBT procedure to determine the duration of time that the channel is sensed to be idle before the transmitting entity transmits on the channel.

LAA may employ uplink LBT at the UE. The UL LBT scheme may be different from the DL LBT scheme (e.g. by using different LBT mechanisms or parameters) for example, since the LAA UL is based on scheduled access which affects a UE's channel contention opportunities. Other considerations motivating a different UL LBT scheme include, but are not limited to, multiplexing of multiple UEs in a single subframe.

In an example, a DL transmission burst may be a continuous transmission from a DL transmitting node with no transmission immediately before or after from the same node on the same CC. An UL transmission burst from a UE perspective may be a continuous transmission from a UE with no transmission immediately before or after from the same UE on the same CC. In an example, UL transmission burst is defined from a UE perspective. In an example, an UL transmission burst may be defined from an eNB perspective. In an example, in case of an eNB operating DL+UL LAA over the same unlicensed carrier, DL transmission burst(s) and UL transmission burst(s) on LAA may be scheduled in a TDM manner over the same unlicensed carrier. For example, an instant in time may be part of a DL transmission burst or an UL transmission burst.

For multiple DU connections, two types of uplink power control modes may be defined, mode 1 and mode 2. A UE capable of multiple DU connections may support at least power control mode 1 and the UE may additionally support power control mode 2. In both modes, the UE may be configured with a minimum guaranteed power for each CG (e.g. cell group), as a ratio of the configured maximum UE output power Pcmax. In power control mode 1, UE allocates up to the minimum guaranteed power to each CG and any remaining power is shared across MCG and SCG on a per transmission basis according to a priority order based on UCI type. In power control mode 2, the UE reserves the minimum guaranteed power to each CG and any remaining power is first made available to the CG where transmission starts the earliest in time.

The P-Max may be used to limit the UE's uplink transmission power on a carrier frequency and may be used to calculate the parameter Pcompensation. Corresponds to parameter PEMAX or PEMAX,c. The UE transmit power on one serving cell may not exceed the configured maximum UE output power of the serving cell determined by this value or, when transmitting sidelink discovery announcements within the coverage of the concerned cell.

Transmission power is the main area where there is an inter-cell-group dependency in the physical layer. Although the power setting is individual for each cell group, regulations specify the maximum transmission power per device and hence create a dependency between the cell groups when it comes to power sharing. Thus, when the device reaches its maximum transmission power there is a need to scale the power of the individual channels in the different cell groups. This may sound straightforward but the fact that the cell groups may be unsynchronized complicates the picture. For a given cell group, changes in the transmission power may occur at the subframe boundaries only as the receiver may assume that the transmission power is constant across a subframe.

The synchronous case has all the subframe boundaries aligned across the cell groups. When setting the transmission power for subframe m in the master cell group the activity in the overlapping subframe in the secondary cell group is known and scaling the transmission power for the different channels is straightforward. Furthermore, changes in the transmission power occur at the subframe boundaries only.

The asynchronous case is more complicated. As an example, consider the master cell group (the situation is similar for the secondary cell group). The available transmission power in subframe m of the master cell group may now depend on two subframes in the secondary cell group, the ongoing subframe n and the future subframe n+1.

Since the power setting for the master cell group may be done at the corresponding subframe boundaries only, some margin for what might happen in the secondary cell group is necessary.

With the situation described earlier in mind, two methods for sharing the transmission power across cell groups are defined. They mainly differ in whether the scaling in case of a power limitation is done across all cells in all cell groups or separately per cell group. The power-control mode to use is configured by RRC signaling.

Dual-connectivity power-control mode 1 scales the power across cell groups. In case of a power limitation, the transmission power is scaled across all cells, regardless of the group they belong to, in the same way as in carrier aggregation. The only exception is that uplink control information in the master cell group is prioritized over uplink control information in the secondary cell group in case the same UCI type is used in both cell groups. In essence, this power-control mode does not differentiate between the cell groups and treats all cells in the same way. Power-control mode 1 is possible in synchronous operation only as the transmission power may be changed at subframe boundaries only. In an asynchronous scenario, the power of the master cell group would need to change as a result of power allocation done at the beginning of the subframes in an secondary cell group and vice versa, something which is not possible.

Dual-connectivity power-control mode 2 scales the power across carriers within each cell group but not between cell groups. The minimum guaranteed power available per cell group, expressed as a fraction of the maximum power, is configured through RRC signaling. In case of power limitation, each cell group is given at least its minimum guaranteed power. The remaining power is then first given to the cell group associated with the earlier transmission. This means that, at the beginning of subframe m, the secondary cell group may use the amount of the remaining power required to maintain the power constant during subframe n. Any power left after this is given to the master cell group in subframe m. Similarly, at the beginning of subframe n+1 in the secondary cell group, the master cell group uses the amount of power from the remaining power required to maintain the transmission power during subframe m. Since asynchronous operation implies that the subframe boundaries are not time aligned, transmission power for one cell group may need change at the subframe boundary for that cell group while it may be kept unchanged for the other cell group, power-control mode two is the only mode supported for asynchronous operation.

In an example, a UE may be configured with multiple cell groups.

> If the UE supports synchronous dual connectivity but does not support asynchronous dual connectivity, or if the UE supports both synchronous dual connectivity and asynchronous dual connectivity and if the higher layer parameter powerControlMode (e.g. power control mode) indicates dual connectivity power control mode 1, >> If the maximum uplink timing difference between transmitted signals to different serving cells including serving cells belonging to different CGs is equal to or less than the minimum requirement for maximum transmission timing difference for synchronous dual connectivity, >>> The UE may use the procedures of power control mode 1.

>>> If a PRACH transmission of the UE on the Pcell starting in subframe i1 of MCG overlaps in time domain with another PRACH transmission of the UE starting in subframe i2 of SCG, and if subframe i1 and subframe i2 overlap in time with more than one symbol, and if the total power of both the PRACH transmissions would exceed $\hat{P}_{CMAX}(i1,i2)$, the UE may transmit the PRACH on the Pcell using the preamble transmission power $P_{PRACH}$. The UE may drop or adjust the power of the PRACH transmission in subframe i2 of SCG such that the total power does not exceed $\hat{P}_{CMAX}(i1, i2)$, where $\hat{P}_{CMAX}(i1,i2)$ may be the linear value configured transmitted power for Dual Connectivity for the subframe pair (i1,i2) If the UE drops the PRACH transmission, it may send power ramping suspension indicator to the higher layers. If the UE adjusts the power of PRACH transmission, it may send power ramping suspension indicator to the higher layers.

> If the UE supports both synchronous dual connectivity and asynchronous dual connectivity and if the higher layer parameter powerControlMode does not indicate dual connectivity power control mode 1, >> The UE may use the procedures of power control mode 2.

>> If a PRACH transmission on the Pcell in subframe i1 of MCG overlaps in time another PRACH transmission in subframe i2 of SCG, and if the time difference between the start of the two PRACH transmissions is less than $30720 \cdot T_s$ and if the transmission timing of the PRACH on the Pcell is such that the UE may be ready to transmit the PRACH on Pcell at least one subframe before subframe i1 of MCG, and if the total power of both the PRACH transmissions exceeds $\hat{P}_{CMAX}(i1\ i2)$, the UE may transmit the PRACH on the Pcell using the preamble transmission power PPRACH. The UE may drop or adjust the power of the PRACH transmission in subframe i2 of SCG such that the total power does not exceed $\hat{P}_{CMAX}(i1,i2)$, where $\hat{P}_{CMAX}(i1,i2)$ may be the linear value configured transmitted power for Dual Connectivity for the subframe pair (i1,i2) If the UE drops the PRACH transmissions, it may send power ramping suspension indicator to the higher layers. If the UE adjusts the power of PRACH transmission, it may send power ramping suspension indicator to the higher layers.

In an example, if the UE PUSCH/PUCCH transmission(s) in subframe i1 of removing CG1 overlap in time with PUSCH/PUCCH transmission(s) in more than one symbol of subframe i2 of CG2 or if at least the last symbol the UE PUSCH/PUCCH transmission(s) in subframe i1 of CG1 overlap in time with SRS transmission(s) of subframe i2, and > If the UE has a PUCCH/PUSCH transmission with UCI including HARQ-ACK/SR in subframe i1 of CG1: If the UE has a PUCCH transmission with UCI including HARQ-ACK/SR in subframe i1 of CG1 and if $\hat{P}_{PUCCH\_CG1}(i1)$ would exceed S1(i1) the UE scales $\hat{P}_{PUCCH\_CG1}(i1)$ such that the condition $\alpha 1(i1) \cdot \hat{P}_{PUCCH\_CG1}(i1) = \max\{0, S1(i1)\}$ may be satisfied where $0 \leq \alpha 1(i1) \leq 1$ and $\hat{P}'_{PUCCH\_CG1}(i1) = \alpha 1(i1) \cdot \hat{P}_{PUCCH\_CG1}(i1)$. If $\hat{P}_{PUCCH\_CG1}(i1)$ would not exceed S1(i1), $\hat{P}'_{PUCCH\_CG1}(i1) = \hat{P}_{PUCCH\_CG1}(i1)$. If the UE has a PUSCH transmission with UCI including HARQ-ACK in subframe i1 of serving cell $c_1 \in CG1$, and if $\hat{P}_{PUSCH,c_1}(i1)$ would exceed S1(i1), the UE scales $\hat{P}_{PUSCH,c_1}(i1)$ such that the condition $\alpha 1(i1) \cdot \hat{P}_{PUSCH,c_1}(i1) = \max\{0, S1(i1)\}$ may be satisfied where $0 \leq \alpha 1(i1) \leq 1$ and $\hat{P}_{PUSCH,c_1} = \alpha 1(i1) \cdot \hat{P}_{PUSCH,c_1}$. If $\hat{P}_{PUSCH,c_1}(i1)$ would not exceed S1(i1). $\hat{P}_{PUSCH,c_1}(i1) = \hat{P}_{PUSCH,c_1}(i1)$. S1(i1) may be determined as follows.

$$S1(i1) = \hat{P}_{CMAX}(i1, i2) - \hat{P}_{u1}(i1) - \hat{P}_{q1}(i2) - \min\left\{\max\left\{\begin{array}{l}0, \\ \hat{P}_{CMAX}(i1, i2) \cdot \frac{\gamma_{CG2}}{100} - \hat{P}_{q1}(i2)\end{array}\right\}, \hat{P}'_{q1}(i2)\right\};$$

where,
$\hat{P}_{u1}(i1) = \hat{P}_{PRACH\_CG1}(i1)$;
if CG1 is MCG and CG2 is SCG,
$\hat{P}_{q1}(i2) = \hat{P}_{PRACH\_CG2}(i2)$;

$$\hat{P}'_{q1}(i2) = \hat{P}_{PUCCH\_CG2}(i2) + \sum_{c_2 \in CG2}\left(\hat{P}_{PUSCH,c_2}(i2) + \hat{P}_{SRS,c_2}(i2)\right);$$

>> if CG1 is SCG and CG2 is MCG
>>> if the UE has a PUCCH transmission with UCI including HARQ-ACK/SR subframe i2 of CG2,
>>>> $\hat{P}_{q1}(i2) = \hat{P}_{PRACH\_CG2}(i2) + \hat{P}'_{PUCCH\_CG2}(i2)$;

$$\hat{P}'_{q1}(i2) = \sum_{c_2 \in CG2}\left(\hat{P}_{PUSCH,c_2}(i2) + \hat{P}_{SRS,c_2}(i2)\right)$$

>>> else if the UE has a PUSCH transmission with UCI including HARQ-ACK in subframe i2 of serving cell $j_2 \in CG2$, $$\hat{P}_{q1}(i2) = \hat{P}_{PRACH\_CG2}(i2) + \hat{P}'_{PUSCH,j_2}(i2);$$

$$\hat{P}'_{q1}(i2) = \sum_{c_2 \in CG2, c_2 \neq j_2} \hat{P}_{PUSCH,c_2}(i2) + \sum_{c_2 \in CG2} \hat{P}_{SRS,c_2}(i2);$$

otherwise, $$\hat{P}_{q1}(i2) = \hat{P}_{PRACH\_CG2}(i2);$$

$$\hat{P}'_{q1}(i2) = \hat{P}_{PUCCH\_CG2}(i2) + \sum_{c_2 \in CG2}\left(\hat{P}_{PUSCH,c_2}(i2) + \hat{P}_{SRS,c_2}(i2)\right)$$

> if the UE has a PUCCH/PUSCH transmission with UCI not including HARQ-ACK/SR in subframe i1 of CG1: If the UE has a PUCCH transmission with UCI not including HARQ-ACK/SR in subframe i1 of CG1 and if $\hat{P}_{PUCCH\_CG1}(i1)$ would exceed S2(i1), the UE scales $\hat{P}_{PUCCH\_CG1}(i1)$ such that the condition $\alpha 2(i1) \cdot \hat{P}_{PUCCH\_CG1}(i1) = \max\{0, S2(i1)\}$ is satisfied where $0 \leq \alpha 2(i1) \leq 1$ and $\hat{P}'_{PUCCH\_CG1}(i1) = \alpha 2(i1) \cdot \hat{P}_{PUCCH\_CG1}(i1)$. If $\hat{P}_{PUCCH\_CG1}(i1)$ would not exceed S2(i1), $\hat{P}'_{PUCCH\_CG1}(i1) = \hat{P}_{PUCCH\_CG1}(i1)$. If the UE has a PUSCH transmission with UCI not including HARQ-ACK in subframe i1 of serving cell $c_1 \in CG1$, and if $\hat{P}_{PUSCH,c_1}(i1)$ would exceed S2(i1), the UE scales $\hat{P}_{PUSCH,c_1}(i1)$ such that the condition $\alpha2(i1) \cdot \hat{P}_{PUSCH,c_1} = \max\{0, S2(i1)\}$ is satisfied where $0 \leq \alpha2(i1) \leq 1$ and $P'_{PUSCH,c_1}(i1) = \alpha2(i1) \cdot \hat{P}_{PUSCH,c_1}(i1)$. If $\hat{P}_{PUSCH,c_1}(i1)$ would not exceed S2(i1), $P'_{PUSCH,c_1}(i1) = \hat{P}_{PUSCH,c_1}(i1)$, S2(i1) may be determined as follows.

$$S2(i1) = \hat{P}_{CMAX}(i1, i2) - \hat{P}_{u2}(i1) - \left\{ \hat{P}_{q2}(i2) - \min\left\{ \begin{array}{l} \max\left\{ 0, \hat{P}_{CMAX}(i1, i2) \cdot \frac{\gamma_{CG2}}{100} - \hat{P}_{q2}(i2) \right\} \\ \hat{P}'_{q2}(i2) \end{array} \right\} \right\}$$

where,
>> $\hat{P}_{u2}(i1) = \hat{P}_{PRACH\_CG1}(i1) + \hat{P}'_{PUCCH\_CG1}(i1)$ if the UE has a PUCCH transmission with HARQ-ACK/SR and a PUSCH transmission with UCI not including HARQ-ACK in subframe i1 of CG1, otherwise, $\hat{P}_{u2}(i1) = \hat{P}_{PRACH\_CG1}(i1)$.
>> if CG1 is MCG and CG2 is SCG
>>> if the UE has a PUCCH transmission with UCI including HARQ-ACK/SR in subframe i2 of CG2, $$\hat{P}_{q2}(i2) = \hat{P}_{PRACH\_CG2}(i2) + \hat{P}'_{PUCCH\_CG2}(i2)$$
$$\hat{P}'_{q2}(i2) = \sum_{c_2 \in CG2} \left( \hat{P}_{PUSCH,c_2}(i2) + \hat{\hat{P}}_{SRS,c_2}(i2) \right);$$

>>> else if the UE has a PUSCH transmission with UCI including HARQ-ACK in subframe i2 of serving cell $j_2 \in CG2$, $$\hat{P}_{q2}(i2) = \hat{P}_{PRACH\_CG2}(i2) + \hat{P}'_{PUSCH,j_2}(i2)$$
$$\hat{P}'_{q2}(i2) = \sum_{c_2 \in CG2, c_2 \neq j_2} \hat{P}_{PUSCH,c_2}(i2) + \sum_{c_2 \in CG2} \hat{\hat{P}}_{SRS,c_2}(i2);$$

>>> otherwise, $$\hat{P}_{q2}(i2) = \hat{P}_{PRACH\_CG2}(i2)$$
$$\hat{P}'_{q2}(i2) = \hat{P}_{PUCCH\_CG2}(i2) + \sum_{c_2 \in CG2} \left( \hat{P}_{PUSCH,c_2}(i2) + \hat{\hat{P}}_{SRS,c_2}(i2) \right)$$

>> if CG1 is SCG and CG2 is MCG
>>> if the UE has a PUCCH transmission in subframe i2 of CG2 and/or a PUSCH transmission with UCI in in subframe i2 of serving cell $j_2 \in CG2$ $$\hat{P}_{q2}(i2) = \hat{P}_{PRACH\_CG2}(i2) + \hat{P}'_{PUCCH\_CG2}(i2) + \hat{P}'_{PUSCH,j_2}(i2)$$
$$\hat{P}'_{q2}(i2) = \sum_{c_2 \in CG2, c_2 \neq j_2} \hat{P}_{PUSCH,c_2}(i2) + \sum_{c_2 \in CG2} \hat{\hat{P}}_{SRS,c_2}(i2)$$

where, $\hat{P}_{PUCCH\_CG2}(i2) = 0$ if the UE does not have a PUCCH transmission in subframe i2 of CG2; $\hat{P}_{PUSCH,j_2}(i2) = 0$ if the UE does not have a PUSCH transmission with UCI in subframe i2 of CG2;

>>> otherwise $$\hat{P}_{q2}(i2) = \hat{P}_{PRACH\_CG2}(i2)$$
$$\hat{P}'_{q2}(i2) = \sum_{c_2 \in CG2} \left( \hat{P}_{PUSCH,c_2}(i2) + \hat{\hat{P}}_{SRS,c_2}(i2) \right)$$

> If the UE has PUSCH transmission(s) without UCI in subframe i1 of CG1, the UE may determine $$S3(i1) = \hat{P}_{CMAX}(i1, i2) - \hat{P}_{u3}(i1) - \left\{ \hat{P}_{q3}(i2) - \min\left\{ \begin{array}{l} \max\left\{ 0, \hat{P}_{CMAX}(i1, i2) \cdot \frac{\gamma_{CG2}}{100} - \hat{P}_{q3}(i2) \right\} \\ \hat{P}'_{q3}(i2) \end{array} \right\} \right\}$$

where
If the UE has a PUCCH transmission in subframe i1 of CG1 and/or a PUSCH transmission with UCI in in subframe i1 of serving cell $j_1 \in CG1$ $\hat{P}_{u3}(i1) = \hat{P}_{PRACH\_CG1}(i1) + \hat{P}_{PUCCH\_CG1}(i1) + \hat{P}'_{PUSCH,j_1}(i1)$,
where $\hat{P}_{PUCCH\_CG1}(i1) = 0$ if the UE does not have a PUCCH transmission in subframe i1 of CG1, $\hat{P}_{PUSCH,j_1}(i1) = 0$ if the UE does not have a PUSCH transmission with UCI in subframe i1 of CG1; otherwise $\hat{P}_{u3}(i1) = \hat{P}_{PRACH\_CG1}(i1)$.
>> if CG1 is MCG and CG2 is SCG
>>> if the UE has a PUCCH transmission in subframe i2 of CG2 and/or a PUSCH transmission with UCI in in subframe i2 of serving cell $j_2 \in CG2$ $$\hat{P}_{q3}(i2) = \hat{P}_{PRACH\_CG2}(i2) + \hat{P}'_{PUCCH\_CG2}(i2) + \hat{P}'_{PUSCH,j_2}(i2)$$
$$\hat{P}'_{q3}(i2) = \sum_{c_2 \in CG2, c_2 \neq j_2} \hat{P}_{PUSCH,c_2}(i2) + \sum_{c_2 \in CG2} \hat{\hat{P}}_{SRS,c_2}(i2)$$

where, $\hat{P}_{PUCCH\_CG2}(i2) = 0$ if the UE does not have a PUCCH transmission in subframe i2 of CG2; $\hat{P}_{PUSCH,j_2}(i2) = 0$ if the UE does not have a PUSCH transmission with UCI in subframe i2 of CG2;
>>> otherwise $$\hat{P}_{q3}(i2) = \hat{P}_{PRACH\_CG2}(i2)$$
$$\hat{P}'_{q3}(i2) = \sum_{c_2 \in CG2} \left( \hat{P}_{PUSCH,c_2}(i2) + \hat{\hat{P}}_{SRS,c_2}(i2) \right);$$

>> if CG1 is SCG and CG2 is MCG $$\hat{P}_{q3}(i2) = \hat{P}_{PRACH\_CG2}(i2) + \hat{P}'_{PUCCH\_CG2}(i2) + \sum_{c_2 \in CG2} \hat{P}'_{PUSCH,c_2}(i2)$$
$$\hat{P}'_{q3}(i2) = \sum_{c_2 \in CG2} \hat{\hat{P}}_{SRS,c_2}(i2);$$

> If the total transmit power of all the PUSCH transmission(s) without UCI in subframe i1 of CG1 would exceed S3(i1), the UE may scale $\hat{P}_{PUSCH,c_1}(i1)$ for each serving cell $c_1 \in CG1$ with a PUSCH transmission without UCI in subframe i1 such that the condition $$\sum_{c_1 \in CG1} w(i1) \cdot \hat{P}_{PUSCH,c_1}(i1) \leq \max\{0, S3(i1)\}$$

may be satisfied, where $\hat{P}'_{PUSCH,c_1}(i1) = w(i1) \cdot \hat{P}_{PUSCH,c_1}(i1)$, and where $w(i1)$ may be a scaling factor of $\hat{P}_{PUSCH,c_1}(i1)$ for serving cell $c_1$ where $0 \leq w(i1) \leq 1$. Note that $w(i1)$ values may be the same across serving cells within a cell group when $w(i1)>0$ but for certain serving cells within the cell group $w(i1)$ may be zero. If the total transmit power of all the PUSCH transmission(s) without UCI in subframe i1 of CG1 would not exceed $S3(i1)$, $\hat{P}'_{PUSCH,c_1}(i1) = \hat{P}_{PUSCH,c_1}(i1)$.

where
> $\hat{P}_{CMAX}(i1,i2)$ may be the linear value of configured transmitted power for Dual Connectivity for the subframe pair (i1,i2);
> if CG1 is MCG and CG2 is SCG
>> $\hat{P}_{PUCCH\_CG1}(i1)$ may be the linear value of $P_{PUCCH}(i1)$ corresponding to PUCCH transmission on the primary cell; $\hat{P}_{PUCCH\_CG2}(i2)$ may be the linear value of $P_{PUCCH}(i2)$ corresponding to PUCCH transmission on the PSCell.
>> $\gamma_{CG1} = \gamma_{MCG}$;
> if CG1 is SCG and CG2 is MCG;
>> $\hat{P}_{PUCCH\_CG1}(i1)$ may be the linear value of $P_{PUCCH}(i1)$ corresponding to PUCCH transmission on the PSCell; $\hat{P}_{PUCCH\_CG2}(i2)$ may be the linear value of $P_{PUCCH}(i2)$ corresponding to PUCCH transmission on the primary cell.
>> $\gamma_{CG1} = \gamma_{SCG}$;
> $\hat{P}_{PUSCH,c_1}(i1)$ may be the linear value of $P_{PUSCH,c_1}(i1)$ for subframe i1 of serving cell of serving cell $c_1 \in CG1$, and $\hat{P}_{PUSCH,c_2}(i2)$ may be the linear value of $\hat{P}_{PUSCH,c_2}(i2)$ for subframe i2 of serving cell of serving cell $c_2 \in CG2$.
> $\gamma_{MCG}$ and $\gamma_{SCG}$ may be according to higher layer parameters p-MeNB and p-SeNB respectively;
> If the UE has a PRACH transmission for CG1 overlapping with subframe i1 of CG1, $\hat{P}_{PRACH\_CG1}(i1)$ may be the linear value of the transmission power of that PRACH transmission; otherwise, $\hat{P}_{PRACH\_CG1}(i1)=0$;
> If the UE has a PRACH transmission for CG2 overlapping with subframe i2 of CG2, $\hat{P}_{PRACH\_CG2}(i2)$ may be the linear value of the transmission power of that PRACH transmission; otherwise, $\hat{P}_{PRACH\_CG2}(i2)=0$.
> $\hat{\tilde{P}}_{SRS,c_2}(i2)$ may be determined as follows
>> if the PUSCH/PUCCH is not transmitted in the last symbol of subframe i1 of CG1, or if the UE does not have an SRS transmission in subframe i2 of serving cell $c_2 \in CG2$ or if the UE drops SRS transmission in subframe i2 of serving cell $c_2 \in CG2$ due to collision with PUCCH in subframe i2 of serving cell $c_2$ ÅCG2
>>> $\hat{\tilde{P}}_{SRS,c_2}(i2)=0$;
>> if the UE has an SRS transmission and does not have a PUCCH/PUSCH transmission in subframe i2 of serving cell $c_2$ E CG2
>>> $\hat{\tilde{P}}_{SRS,c_2}(i2) = \hat{P}_{SRS,c_2}(i2)$;
>> if the UE has an SRS transmission and a has PUCCH transmission, and does not have a PUSCH transmission in subframe i2 of serving cell $c_2 \in CG2$ $$\hat{\tilde{P}}_{SRS,c_2}(i2) = \max\left\{ 0, \hat{P}_{SRS,c_2}(i2) - \hat{P}_{PUCCH\_CG2}(i2) \right\}$$

>> if the UE has an SRS transmission and a has PUSCH transmission, and does not have a PUCCH transmission in subframe i2 of serving cell $c_2 \in CG2$ $$\hat{\tilde{P}}_{SRS,c_2}(i2) = \max\left\{ 0, \hat{P}_{SRS,c_2}(i2) - \hat{P}_{PUSCH,c_2}(i2) \right\}$$

>> if the UE has an SRS transmission and has a PUSCH transmission and a PUCCH transmission in in subframe i2 of serving cell $c_2 \in CG2$ $$\hat{\tilde{P}}_{SRS,c_2}(i2) = \max\left\{ 0, \hat{P}_{SRS,c_2}(i2) - \hat{P}_{PUSCH,c_2}(i2) - \hat{P}_{PUSCH\_CG2}(i2) \right\}$$

In an example, if the total transmit power for the Sounding Reference Symbol in an SC-FDMA symbol across the serving cells within a TAG of a cell group CG1 would exceed $S4(i1)$, the UE may scale $\hat{P}_{SRS,c_1}(i1)$ for the serving cell $c_1 \in CG1$ and the SC-FDMA symbol in subframe i1 such that the condition $$\sum_{c_1 \in CG1} v(i1) \cdot \hat{P}_{SRS,c_1}(i1) \leq S4(i1)$$

is satisfied, where $\hat{P}'_{SRS,c_1}(i1) = v(i1) \cdot \hat{P}_{SRS,c_1}(i1)$ may be the transmission power of SRS after scaling and where $\hat{P}_{SRS,c_i}(i1)$ may be the linear value of $\hat{P}_{SRS,c_i}(i1)$, and $v(i)$ may be a scaling factor of serving cell $c_1 \in CG1$ where $0 < v(i) \leq 1$. Note that $v(i)$ values may be the same across serving cells within the same CG.

In an example, if the UE is configured with multiple TAGs within CG1 and the SRS transmission of the UE in an SC-FDMA symbol for a serving cell in subframe i1 in a TAG belonging to CG1 overlaps with the SRS transmission in another SC-FDMA symbol in subframe i1 for a serving cell in another TAG belonging to CG1, and if the total transmit power of the UE for the Sounding Reference Symbol in the overlapped portion would exceed $S4(i1)$ the UE may scale $\hat{P}_{SRS,c_1}(i1)$ for the serving cell $c_1 \in CG1$ and each of the overlapped SRS SC-FDMA symbols in subframe i1 such that the condition $$\sum_{c_1 \in CG1} v(i1) \cdot \hat{P}_{SRS,c_1}(i1) \leq S4(i1)$$

may be satisfied, where $\hat{P}'_{SRS,c_1}(i1) = v(i1) \cdot \hat{P}_{SRS,c_1}(i1)$ may be the transmission power of SRS after scaling, and where $v(i1)$ may be a scaling factor of $\hat{P}_{SRS,c_1}(i1)$ for serving cell $c_1$ where $0 \leq v(i1) \leq 1$. Note that $v(i1)$ values may be the same across serving cells within a cell group.

$S4(i1)$ may be determined as follows.

$$S4(i1) = \hat{P}_{CMAX}(i1, i2) - \hat{P}_{q4}(i2) - \min\left\{ \max\left\{ 0, \hat{P}_{CMAX}(i1, i2) \cdot \frac{\gamma_{CG2}}{100} - \hat{P}_{q4}(i2) \right\}, \hat{P}'_{q4}(i2) \right\}$$

where
> if CG1 is MCG and CG2 is SCG $$\hat{P}_{q4}(i2) = \hat{P}_{PRACH\_CG2}(i2) + \hat{P}'_{PUCCH\_CG2}(i2) + \sum_{c_2 \in CG2} \hat{P}'_{PUSCH,c_2}(i2)$$

$$\hat{P}'_{q4}(i2) = \sum_{c_2 \in CG2} \hat{P}_{SRS,c_2}(i2)$$

> if CG1 is SCG and CG2 is MCG $$\hat{P}_{q4}(i2) =$$
$$\hat{P}_{PRACH\_CG2}(i2) + \hat{P}'_{PUCCH\_CG2}(i2) + \sum_{c_2 \in CG2} \hat{P}'_{PUSCH,c_2}(i2) + \sum_{c_2 \in CG2} \hat{P}'_{SRS,c_2}(i2)$$

$$\hat{P}'_{q4}(i2) = 0$$

> if the UE has no PUCCH transmission or has a shortened PUCCH transmission in subframe i2 of CG2, $\hat{P}'_{PUCCH\_CG2}(i2)=0$; otherwise $\hat{P}'_{PUCCH\_CG2}(i2)=\hat{P}'_{PUCCH\_CG2}(i2)$ > if the UE has no PUSCH transmission in the last symbol of subframe i2 of serving cell $c_2 \in CG2$, $\hat{P}'_{PUSCH,c_2}(i2)=0$; otherwise $\hat{P}'_{PUSCH,c_2}(i2)=\hat{P}'_{PUSCH,c_2}(i2)$ > if the UE has PRACH transmission in CG2 that overlaps with the last symbol of subframe i2 of CG2, $\hat{P}_{PRACH\_CG2}(i2)=\hat{P}_{PRACH\_CG2}(i2)$; otherwise $\hat{P}_{PRACH\_CG2}(i2)=0$ In an example, for both cell groups,
> if the PUCCH/PUSCH transmission of the UE on subframe i1 for a given serving cell in a TAG of CG1 overlaps some portion of the first symbol of the PUSCH transmission on subframe i1+1 for a different serving cell in another TAG of CG1 and/or overlaps with the PUCCH/PUSCH transmission on subframe i2+1 for a serving cell in another TAG of CG2, the UE may adjust its total transmission power of all CGs such that the total transmission power of the UE across all CGs does not exceed $P_{CMAX}$ on any overlapped portion.

> if the PUSCH transmission of the UE on subframe i1 for a given serving cell in a TAG of CG1 overlaps some portion of the first symbol of the PUCCH transmission on subframe i1+1 for a different serving cell in another TAG of CG1 and/or overlaps with the PUCCH/PUSCH transmission on subframe i2+1 for a serving cell in another TAG of CG2, the UE may adjust its total transmission power of all CGs such that the total transmission power of the UE across all CGs does not exceed $P_{CMAX}$ on any overlapped portion.

> if the SRS transmission of the UE in a symbol on subframe i1 for a given serving cell in a TAG of CG1 overlaps with the PUCCH/PUSCH transmission on subframe or subframe i1+1 for a different serving cell in the same or another TAG of CG1 and/or overlaps with the PUCCH/PUSCH transmission on subframe i2+[1] for a serving cell of CG2, the UE may drop the SRS in CG1 if its total transmission power across all CGs exceeds $P_{CMAX}$ on any overlapped portion of the symbol.

> if the SRS transmission of the UE in a symbol on subframe i1 for a given serving cell in CG1 overlaps with the SRS transmission on subframe i1 for a different serving cell(s) in CG1 or overlaps with SRS transmission on subframe i2 for a serving cell(s) in CG2, and if the SRS transmissions overlap with PUSCH/PUCCH transmission on subframe i1 or subframe i1+1 for another serving cell(s) in CG1, and/or if the SRS transmissions overlap with PUSCH/PUCCH transmission on subframe i2+1 for a serving cell of CG2, the UE may drop the SRS transmissions in CG1 if its total transmission power across all CGs exceeds $P_{CMAX}$ on any overlapped portion of the symbol.

> UE may, when requested by higher layers, to transmit PRACH on subframe i1 or subframe i1+1 in a secondary serving cell in CG1 and/or to transmit PRACH on subframe i2+1 in a serving cell in CG2 in parallel with SRS transmission in a symbol on subframe i1 of a different serving cell belonging to a different TAG of CG1, drop SRS in CG1 if its total transmission power across all CGs exceeds $P_{CMAX}$ on any overlapped portion of the symbol.

> UE may, when requested by higher layers, to transmit PRACH on subframe i1+1 in a secondary serving cell in CG1 and/or to transmit PRACH on subframe i2+[1] in a serving cell in CG2 in parallel with PUSCH/PUCCH on subframe i1 in a different serving cell belonging to a different TAG of CG1, adjust the transmission power of PUSCH/PUCCH in CG1 so that the total transmission power of the UE across all CGs does not exceed $P_{CMAX}$ on the overlapped portion.

In an example, if subframe i1 of CG1 overlaps in time with subframe i2−1 and subframe i2 of CG2, and if the UE has transmission(s) in subframe i1 of CG1,
> if the UE determines based on higher layer signaling that transmission(s) in subframe i1 of CG1 cannot overlap in time with transmission(s) in subframe i2 of CG2, the UE may determine $$\hat{P}^1_{CG1}(i1) = \min \begin{cases} \hat{P}_{q1}(i1), \\ \hat{P}_{CMAX}(i1, i2-1) - \hat{P}_{PRACH\_CG1}(i1) - \\ \hat{P}^1_{CG2}(i2-1) - \hat{P}_{PRACH\_CG2}(i2-1) \end{cases}$$

Otherwise, the UE may determine $$\hat{P}^1_{CG1}(i1) = \min \begin{cases} \hat{P}_{q1}(i1), \\ \hat{P}_{CMAX}(i1, i2-1) - \hat{P}_{PRACH\_CG1}(i1) - \\ \max \begin{cases} \hat{P}_{CMAX}(i1, i2-1) \cdot \frac{\gamma_{CG2}}{100}, \\ \hat{P}^1_{CG2}(i2-1) + \hat{P}_{PRACH\_CG2}(i2-1), \\ \hat{P}_{PRACH\_CG2}(i2) \end{cases} \end{cases}.$$

where, $$\hat{P}_{q1}(i1) = \hat{P}_{PUCCH\_CG1}(i1) + \sum_{c \in CG1} \left( \hat{P}_{PUSCH,c}(i1) + \hat{P}_{SRS,c}(i1) \right).$$

$\hat{P}_{CMAX}(i1,i2-1)$ may be the linear value of configured transmitted power for Dual Connectivity for the subframe pair (i1,i2−1);
> $\hat{P}_{PUSCH,c}(i1)=0$, if the UE does not have a PUSCH transmission in serving cell $c \in CG1$;
> $\hat{P}_{PUCCH\_CG1}(i1)=0$ if the UE does not have a PUCCH transmission in CG1;
> $\hat{P}^1_{CG2}(i2-1)=0$ if the UE has no transmission of PUCCH, PUSCH, or SRS in subframe i2−1 of CG2;
> $\gamma_{CG1}=\gamma_{MCG}$, and $\gamma_{CG2}=\gamma_{SCG}$ if CG1 is MCG and CG2 is SCG;
> $\gamma_{CG1}=\gamma_{SCG}$, and $\gamma_{CG2}=\gamma_{MCG}$ if CG1 is SCG and CG2 is MCG;

> $\gamma_{MCG}$ and $\gamma_{SCG}$ are given according to higher layer parameters p-MeNB and p-SeNB respectively;

> If the UE has a PRACH transmission for CG1 overlapping with subframe i1 of CG1, $\hat{P}_{PRACH\_CG1}(i1)$ may be the linear value of the transmission power of that PRACH transmission; otherwise, $\hat{P}_{PRACH\_CG1}(i1)=0$.

> If the UE has a PRACH transmission for CG2 overlapping with subframe i2 of CG2, and if the transmission timing of the PRACH transmission is such that the UE is ready to transmit the PRACH at least one subframe before subframe i2 of CG2, $\hat{P}_{PRACH\_CG2}(i2)$ may be the linear value of the transmission power of that PRACH transmission; otherwise, $\hat{P}_{PRACH\_CG2}(i2)=0$.

> If the UE has a PRACH transmission for CG2 overlapping with subframe i2−1 of CG2, $\hat{P}_{PRACH\_CG2}(i2-1)$ may be the linear value of the transmission power of that PRACH transmission; otherwise, $\hat{P}_{PRACH\_CG2}(i2-1)=0$.

> $\hat{\tilde{P}}_{SRS,c}(i1)$ may be determined as follows.

>> if the UE does not have an SRS transmission in subframe i1 of serving cell c∈CG1 or if the UE drops the SRS transmission in subframe i1 of serving cell c∈CG1 due to collision with a PUCCH transmission in subframe i1 of serving cell c∈CG1

>>> $\hat{\tilde{P}}_{SRS,c}(i1)=0$;

>> if the UE has an SRS transmission and does not have a PUCCH/PUSCH transmission in subframe i1 of serving cell c∈CG1

>>> $\hat{\tilde{P}}_{SRS,c}(i1)=\hat{P}_{SRS,c}(i1)$;

>> if the UE has an SRS transmission and a has PUCCH transmission, and does not have a PUSCH transmission in subframe i1 of serving cell c∈CG1

$$\hat{\tilde{P}}_{SRS,c}(i1) = \max\left\{0, \hat{P}_{SRS,c}(i1) - \hat{P}_{PUCCH\_CG1}(i1)\right\}$$

>> if the UE has an SRS transmission and a has PUSCH transmission, and does not have a PUCCH transmission in subframe i1 of serving cell c∈CG1

$$\hat{\tilde{P}}_{SRS,c}(i1) = \max\left\{0, \hat{P}_{SRS,c}(i1) - \hat{P}_{PUSCH,c}(i1)\right\}$$

>> if the UE has an SRS transmission and has a PUSCH transmission and a PUCCH transmission in subframe i1 of serving cell c∈CG1

$$\hat{\tilde{P}}_{SRS,c}(i1) = \max\left\{0, \hat{P}_{SRS,c}(i1) - \hat{P}_{PUSCH,c}(i1) - \hat{P}_{PUCCH\_CG1}(i1)\right\}$$

where $\hat{P}_{SRS,c}(i1)$ may be the linear value of $P_{SRS,c}(i1)$.

In an example, if $\hat{P}_{PUCCH\_CG1}(i)$ would exceed $\hat{P}_{CG1}^1(i)$, the UE scales $\hat{P}_{PUCCH\_CG1}(i)$ such that the condition $\alpha1(i)\cdot\hat{P}_{PUCCH\_CG1}(i)\leq\hat{P}_{CG1}^1(i)$ may be satisfied where > if CG1 is MCG, $\hat{P}_{PUCCH\_CG1}(i)$ may be the linear value of $\hat{P}_{PUCCH}(i)$ corresponding to PUCCH transmission on the primary cell, in case there is no PUCCH transmission in subframe i on the primary cell $\hat{P}_{PUCCH\_CG1}(i)=0$.

> if CG1 is SCG, $\hat{P}_{PUCCH\_CG1}(i)$ may be the linear value of $P_{PUCCH}(i)$ corresponding to PUCCH transmission on PSCell, in case there is no PUCCH transmission in subframe i on the PSCell $\hat{P}_{PUCCH\_CG1}(i)=0$. $\hat{P}_{PUSCH,c}(i)$ may be the linear value of $P_{PUSCH,c}(i)$ > $\alpha1(i)\leq1$ may be a scaling factor of $\hat{P}_{PUCCH\_CG1}(i)$.

If the UE has PUSCH transmission with UCI on serving cell j∈CG1, and $\hat{P}_{PUSCH,j}(i)$ would exceed $\hat{P}_{CG1}^1(i)$ the UE scales $\hat{P}_{PUSCH,j}(i)$ such that the condition $\beta2(i)\cdot\hat{P}_{PUSCH,j}(i)\leq\hat{P}_{CG1}^1(i)$ is satisfied where $\hat{P}_{PUSCH,j}(i)$ may be the linear value of the PUSCH transmit power for the cell with UCI, and $0\leq\alpha2(i)\leq1$ may be a scaling factor of $\hat{P}_{PUSCH,j}(i)$ for serving cell j∈CG1.

If the total transmit power across all the serving cells of a cell group CG1 would exceed $P_{CG1}^1(i)$, the UE may scale $\hat{P}_{PUSCH,c}(i)$ for the serving cell c∈CG1 in subframe i such that the condition $$\sum_{c\in CG1} w(i)\cdot\hat{P}_{PUSCH,c}(i) \leq \left(\hat{P}_{CG1}^1(i) - \hat{P}_{PUCCH\_CG1}(i)\right)$$

may be satisfied; and w(i) may be a scaling factor of $\hat{P}_{PUSCH,c}(i)$ for serving cell c where $0\leq w(i)\leq1$.

If the UE has PUSCH transmission with UCI on serving cell j∈CG1 and PUSCH without UCI in any of the remaining serving cells belonging to CG1, and the total transmit power across all the serving cells of CG1 would exceed $\hat{P}_{CG1}^1(i)$, the UE may scale $\hat{P}_{PUSCH,c}(i)$ for the serving cells belonging to CG1 without UCI in subframe i such that the condition $$\sum_{c\in CG1,c\neq j} w(i)\cdot\hat{P}_{PUSCH,c}(i) \leq \left(\hat{P}_{CG1}^1(i) - \hat{P}_{PUSCH,j}(i)\right)$$

may be satisfied;

where $\hat{P}_{PUSCH,j}(i)$ may be the PUSCH transmit power for the cell with UCI and w(i) may be a scaling factor of $\hat{P}_{PUSCH,c}(i)$ for serving cell c without UCI. In this case, no power scaling may be applied to $$\hat{P}_{PUSCH,j}(i) \text{ unless } \sum_{c\in CG1,c\neq j} w(i)\cdot\hat{P}_{PUSCH,c}(i) = 0$$

and the total transmit power across all of the serving cells of the CG1 would exceed $\hat{P}_{CG1}^1(i)$.

If the UE has simultaneous PUCCH and PUSCH transmission with UCI on serving cell j∈CG1 and PUSCH transmission without UCI in any of the remaining serving cells belonging to CG1, and the total transmit power across all the serving cells of the CG1 would exceed $\hat{P}_{CG1}^1(i)$, the UE may obtain $\hat{P}_{PUSCH,c}(i)$ according to $\hat{P}_{PUSCH,j}(i)=\min(\hat{P}_{PUSCH,j}(i), (\hat{P}_{CG1}^1(i)-\hat{P}_{PUCCH\_CG1}(i)))$ and $$\sum_{c\in CG1,c\neq j} w(i)\cdot\hat{P}_{PUSCH,c}(i) \leq \left(\hat{P}_{CG1}^1(i) - \hat{P}_{PUCCH\_CG1}(i) - \hat{P}_{PUSCH,j}(i)\right)$$

where

> if CG1 is MCG, $\hat{P}_{PUCCH\_CG1}(i)$ may be the linear value of $P_{PUCCH}(i)$ corresponding to PUCCH transmission on the primary cell.

> if CG1 is SCG, $\hat{P}_{PUCCH\_CG1}(i)$ may be the linear value of $P_{PUCCH}(i)$ corresponding to PUCCH transmission on PSCell.

Note that w(i) values may be the same across serving cells within a cell group when w(i)>0 but for certain serving cells within the cell group w(i) may be zero.

If the total transmit power for the Sounding Reference Symbol in an SC-FDMA symbol across the serving cells within a TAG of a cell group CG1 would exceed $\hat{P}_{CG1}^{1}(i)$, the UE scales $\hat{P}_{SRS,c}(i)$ for the serving cell c∈CG1 and the SC-FDMA symbol in subframe i such that the condition $$\sum_{c\in CG1} v(i) \cdot \hat{P}_{SRS,c}(i) \leq \hat{P}_{CG1}^{1}(i)$$

may be satisfied where $\hat{P}_{SRS,c}(i)$ may be the linear value of $P_{SRS,c}(i)$ and v(i) may be a scaling factor of $\hat{P}_{SRS,c}(i)$ for serving cell c∈CG1 where 0<v(i)≤1 Note that v(i) values may be the same across serving cells within the same CG.

If the UE is configured with multiple TAGs within CG1 and the SRS transmission of the UE in an SC-FDMA symbol for a serving cell in subframe i in a TAG belonging to CG1 overlaps with the SRS transmission in another SC-FDMA symbol in subframe i for a serving cell in another TAG belonging to CG1, and if the total transmit power of the UE for the Sounding Reference Symbol in the overlapped portion would exceed $\hat{P}_{CG1}^{1}(i)$, the UE may scale $\hat{P}_{SRS,c}(i)$ for the serving cell c∈CG1 and each of the overlapped SRS SC-FDMA symbols in subframe i such that the condition $$\sum_{c\in CG1} v(i) \cdot \hat{P}_{SRS,c}(i) \leq \hat{P}_{CG1}^{1}(i)$$

may be satisfied where $\hat{P}_{SRS,c}(i)$ may be the linear value of $P_{SRS,c}(i)$, and v(i) may be a scaling factor of $P_{SRS,c}(i)$ for serving cell c∈CG1 where 0<v(i)≤1. Note that v(i) values may be the same across serving cells within the same CG.

In an example, for a cell group CG1
> if the UE is configured with multiple TAGs within CG1, and if the PUCCH/PUSCH transmission of the UE on subframe i for a given serving cell in a TAG of CG1 overlaps some portion of the first symbol of the PUSCH transmission on subframe i+1 for a different serving cell in another TAG of CG1, the UE may adjust its total transmission power of CG1 to not exceed $\hat{P}_{CG1}^{1}$ on any overlapped portion.
> if the UE is configured with multiple TAGs within CG1, and if the PUSCH transmission of the UE on subframe i for a given serving cell in a TAG of CG1 overlaps some portion of the first symbol of the PUCCH transmission on subframe i+1 for a different serving cell in another TAG of CG1 the UE may adjust its total transmission power of CG1 to not exceed $\hat{P}_{CG1}^{1}$ on any overlapped portion.
> if the UE is configured with multiple TAGs within CG1, and if the SRS transmission of the UE in a symbol on subframe i for a given serving cell in a TAG of CG1 overlaps with the PUCCH/PUSCH transmission on subframe i or subframe i+1 for a different serving cell in the same or another TAG of CG1 the UE may drop SRS if its total transmission power of CG exceeds $\hat{P}_{CG1}^{1}$ on any overlapped portion of the symbol.
> if the UE is configured with multiple TAGs within CG1 and more than 2 serving cells within CG1, and if the SRS transmission of the UE in a symbol on subframe i for a given serving cell in the CG1 overlaps with the SRS transmission on subframe i for a different serving cell(s) in CG1 and with PUSCH/PUCCH transmission on subframe i or subframe i+1 for another serving cell(s) in CG1, the UE may drop the SRS transmissions in CG1 if the total transmission power of CG1 exceeds $\hat{P}_{CG1}^{1}$ on any overlapped portion of the symbol.
> if the UE is configured with multiple TAGs within CG1, the UE may, when requested by higher layers, to transmit PRACH in a secondary serving cell in CG1 in parallel with SRS transmission in a symbol on a subframe of a different serving cell belonging to a different TAG of CG1, drop SRS in CG1 if the total transmission power of CG1 exceeds $\hat{P}_{CG1}^{1}$ on any overlapped portion in the symbol.
> if the UE is configured with multiple TAGs within CG1, the UE may, when requested by higher layers, to transmit PRACH in a secondary serving cell in CG1 in parallel with PUSCH/PUCCH in a different serving cell belonging to a different TAG in CG1, adjust the transmission power of PUSCH/PUCCH in CG1 so that its total transmission power of CG1 does not exceed $\hat{P}_{CG1}^{1}$ on the overlapped portion.

In an example, the $\gamma_{MCG}$ and/or $\gamma_{SCG}$ may be values for determining power allocation for dual connectivity.

The Power Headroom reporting procedure is used to provide the serving eNB with information about the difference between the nominal UE maximum transmit power and the estimated power for UL-SCH transmission or SRS transmission per activated Serving Cell and also with information about the difference between the nominal UE maximum power and the estimated power for UL-SCH and PUCCH transmission on SpCell and PUCCH SCell.

RRC controls Power Headroom reporting by configuring the two timers periodicPHR-Timer and prohibitPHR-Timer, and by signaling dl-PathlossChange which sets the change in measured downlink pathloss and the required power backoff due to power management to trigger a PHR.

A Power Headroom Report (PHR) may be triggered if any of the following events occur:
prohibitPHR-Timer expires or has expired and the path loss has changed more than dl-PathlossChange dB for at least one activated Serving Cell of any MAC entity which is used as a pathloss reference since the last transmission of a PHR in this MAC entity when the MAC entity has UL resources for new transmission;
periodicPHR-Timer expires;
upon configuration or reconfiguration of the power headroom reporting functionality by upper layers, which is not used to disable the function;
activation of an SCell of any MAC entity with configured uplink;
addition of the PSCell;
prohibitPHR-Timer expires or has expired, when the MAC entity has UL resources for new transmission, and the following is true in this TTI for any of the activated Serving Cells of any MAC entity with configured uplink:
there are UL resources allocated for transmission or there is a PUCCH transmission on this cell, and the required power backoff due to power management for this cell has changed more than dl-PathlossChange dB since the last transmission of a PHR when the MAC entity had UL resources allocated for transmission or PUCCH transmission on this cell.

The MAC entity may avoid triggering a PHR when the required power backoff due to power management decreases only temporarily (e.g. for up to a few tens of milliseconds) and it may avoid reflecting such temporary decrease in the values of PCMAX,c/PH when a PHR is triggered by other triggering conditions.

If the MAC entity has UL resources allocated for new transmission for this TTI the MAC entity may:

if it is the first UL resource allocated for a new transmission since the last MAC reset, start periodicPHR-Timer;
if the Power Headroom reporting procedure determines that at least one PHR has been triggered and not cancelled, and;
if the allocated UL resources may accommodate the MAC control element for PHR which the MAC entity is configured to transmit, plus its subheader, as a result of logical channel prioritization:
if extendedPHR is configured:
for each activated Serving Cell with configured uplink:
obtain the value of the Type 1 or Type 3 power headroom;
if the MAC entity has UL resources allocated for transmission on this Serving Cell for this TTI:
obtain the value for the corresponding PCMAX,c field from the physical layer;
if simultaneousPUCCH-PUSCH is configured or a serving cell operating according to Frame Structure Type 3 with uplink is configured and activated:
obtain the value of the Type 2 power headroom for the PCell;
obtain the value for the corresponding PCMAX,c field from the physical layer;
instruct the Multiplexing and Assembly procedure to generate and transmit an Extended PHR MAC control element for extendedPHR as defined in subclause 6.1.3.6a based on the values reported by the physical layer;
else if extendedPHR2 is configured:
for each activated Serving Cell with configured uplink:
obtain the value of the Type 1 or Type 3 power headroom;
if the MAC entity has UL resources allocated for transmission on this Serving Cell for this TTI:
obtain the value for the corresponding PCMAX,c field from the physical layer;
if a PUCCH SCell is configured and activated:
obtain the value of the Type 2 power headroom for the PCell and PUCCH SCell;
obtain the values for the corresponding PCMAX,c fields from the physical layer;
else:
if simultaneousPUCCH-PUSCH is configured for the PCell or a serving cell operating according to Frame Structure Type 3 with uplink is configured and activated:
obtain the value of the Type 2 power headroom for the PCell;
obtain the value for the corresponding PCMAX,c field from the physical layer;
instruct the Multiplexing and Assembly procedure to generate and transmit an Extended PHR MAC control element for extendedPHR2 according to configured ServCellIndex and the PUCCH(s) for the MAC entity as defined in subclause 6.1.3.6a based on the values reported by the physical layer;
else if dualConnectivityPHR is configured:
for each activated Serving Cell with configured uplink associated with any MAC entity:
obtain the value of the Type 1 or Type 3 power headroom;
if this MAC entity has UL resources allocated for transmission on this Serving Cell for this TTI or if the other MAC entity has UL resources allocated for transmission on this Serving Cell for this TTI and phr-ModeOtherCG is set to real by upper layers:
obtain the value for the corresponding PCMAX,c field from the physical layer;
if simultaneousPUCCH-PUSCH is configured or a serving cell operating according to Frame Structure Type 3 with uplink is configured and activated:
obtain the value of the Type 2 power headroom for the SpCell;
obtain the value for the corresponding PCMAX,c field for the SpCell from the physical layer;
obtain the value of the Type 2 power headroom for the SpCell of the other MAC entity;
if phr-ModeOtherCG is set to real by upper layers:
obtain the value for the corresponding PCMAX,c field for the SpCell of the other MAC entity from the physical layer;
instruct the Multiplexing and Assembly procedure to generate and transmit a Dual Connectivity PHR MAC control element as defined in subclause 6.1.3.6b based on the values reported by the physical layer;
else:
obtain the value of the Type 1 or Type 3 power headroom from the physical layer;
instruct the Multiplexing and Assembly procedure to generate and transmit a PHR MAC control element as defined in subclause 6.1.3.6 based on the value reported by the physical layer;
start or restart periodicPHR-Timer;
start or restart prohibitPHR-Timer;
cancel all triggered PHR(s).

In an implementation of existing technologies, a gNB (e.g. base station) may comprise a gNB-CU (e.g. base station central unit) and one or more gNB-DUs (e.g. base station distributed units). When multiple gNB-DUs are employed to serve a UE (e.g. a wireless device), separate MAC/PHY entities in different gNB-DUs control UE's uplink transmission power. UE's total uplink transmission power is limited. Uplink transmission performance decreases if each gNB-DU controls an uplink power of UE without considering other gNB-DU's power control. An implementation of existing technologies may decrease transmission efficiency of a UE by unfairly employing UE's power in a gNB-DU compared to another gNB-DU simultaneously serving the UE and/or by not utilizing whole available power of a UE. The inefficient power control of multiple gNB-DUs may increase transmission throughput and/or packet loss rate of a UE.

Example embodiments provide mechanisms to coordinate an uplink transmission power of UE to multiple serving gNB-DUs. Example embodiments provide signaling between a gNB-CU and gNB-DUs to share information of an uplink power information for multiple serving gNB-DUs.

In an example, a base station central unit (CU), e.g. gNB-CU, serves a wireless device via a first base station distributed unit (DU), e.g. gNB-DU, and adds (or modifies) a second base station DU to establish multiple DU connections to serve the wireless device. An example embodiment describes procedures to coordinate uplink transmission power control configuration parameters among the base station CU, the first base station DU, and the second base station DU for the multiple DU connections of the wireless device.

In an example, a base station comprises a base station central unit (CU) and one or more base station distributed units (DUs) (e.g. a first base station DU, a second base station DU, and/or the like). In an example, the base station CU may provide functionalities of a PDCP layer and/or an SDAP layer for wireless devices. The one or more base station DUs may provide functionalities of an RLC layer, a MAC layer, and/or a PHY layer for wireless devices. In an example, the base station CU may provide one or more upper layers among a PDCP layer, an SDAP layer, an RLC layer, a MAC layer, and/or PHY layer. In an example, the one or more base station DUs may provide one or more lower layers among a PDCP layer, an SDAP layer, an RLC layer, a MAC layer, and/or PHY layer. The base station CU may be connected to the one or more base station DUs through an F1 interface. The base station CU may communicate with the first base station DU via a first F1 interface. The base station CU may communicate with the second base station DU via a second F1 interface.

Figure 20:
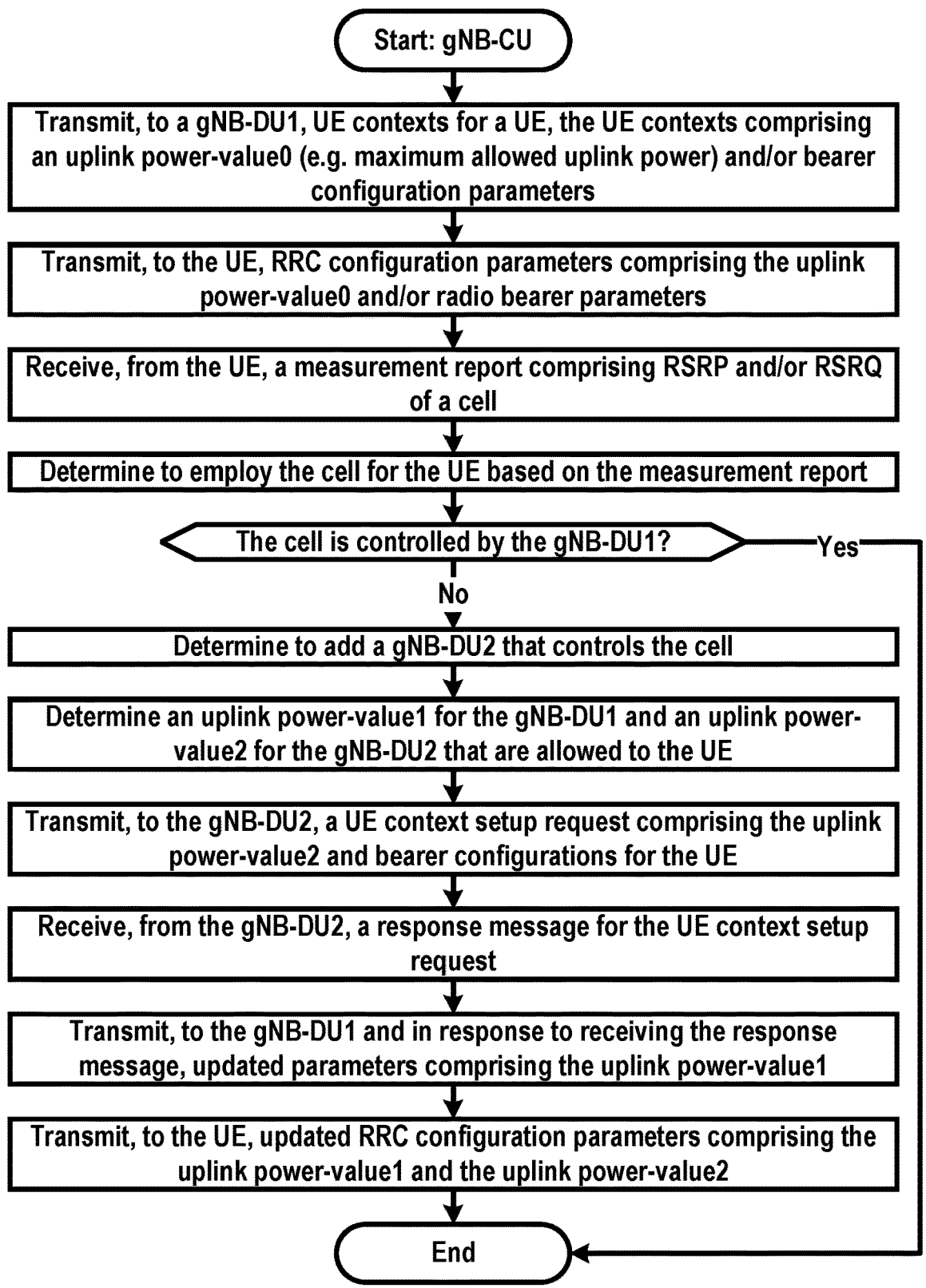
FIG. 20 is an example diagram of an aspect of an embodiment of the present disclosure.
Figure 21:
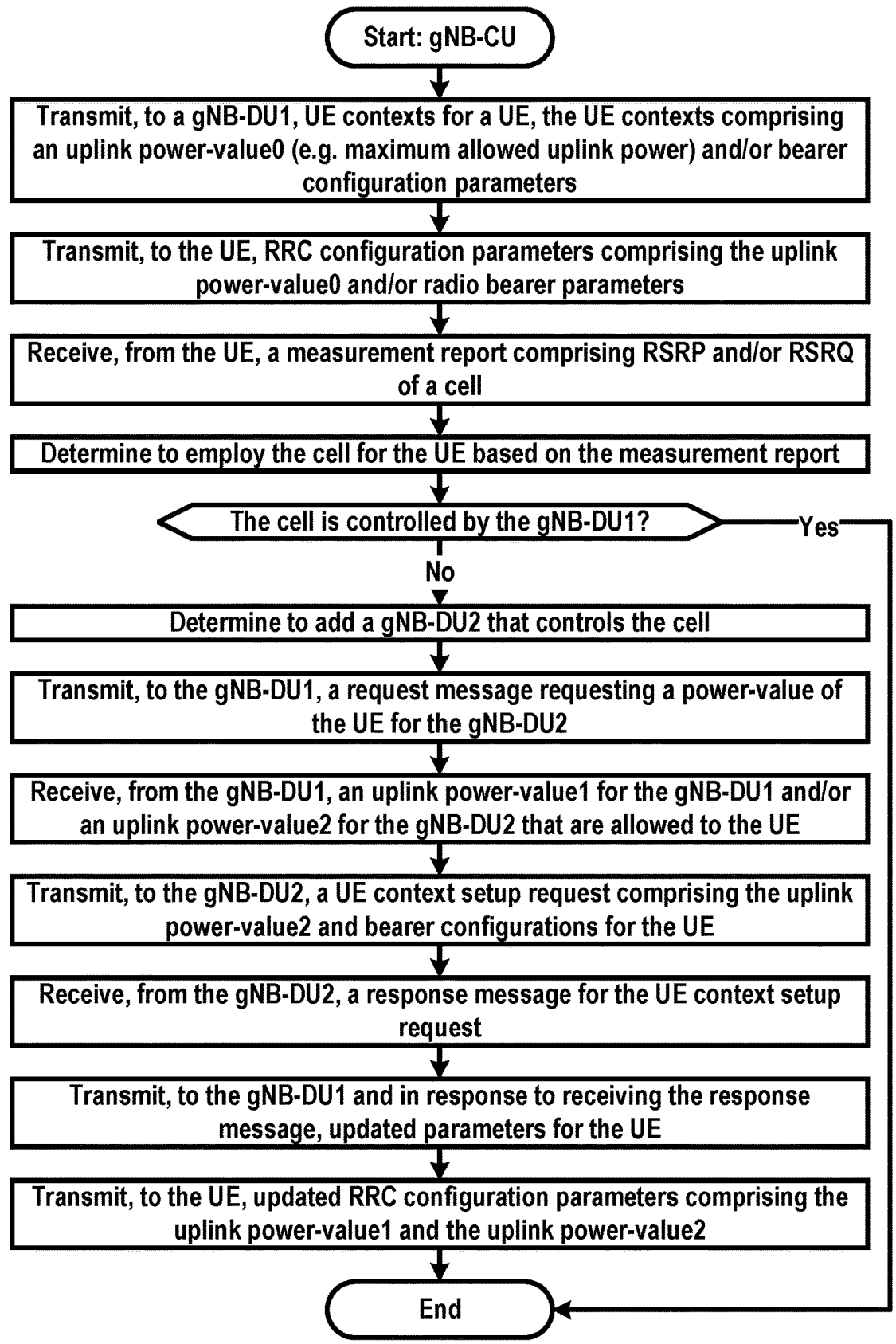
FIG. 21 is an example diagram of an aspect of an embodiment of the present disclosure.
Figure 22:
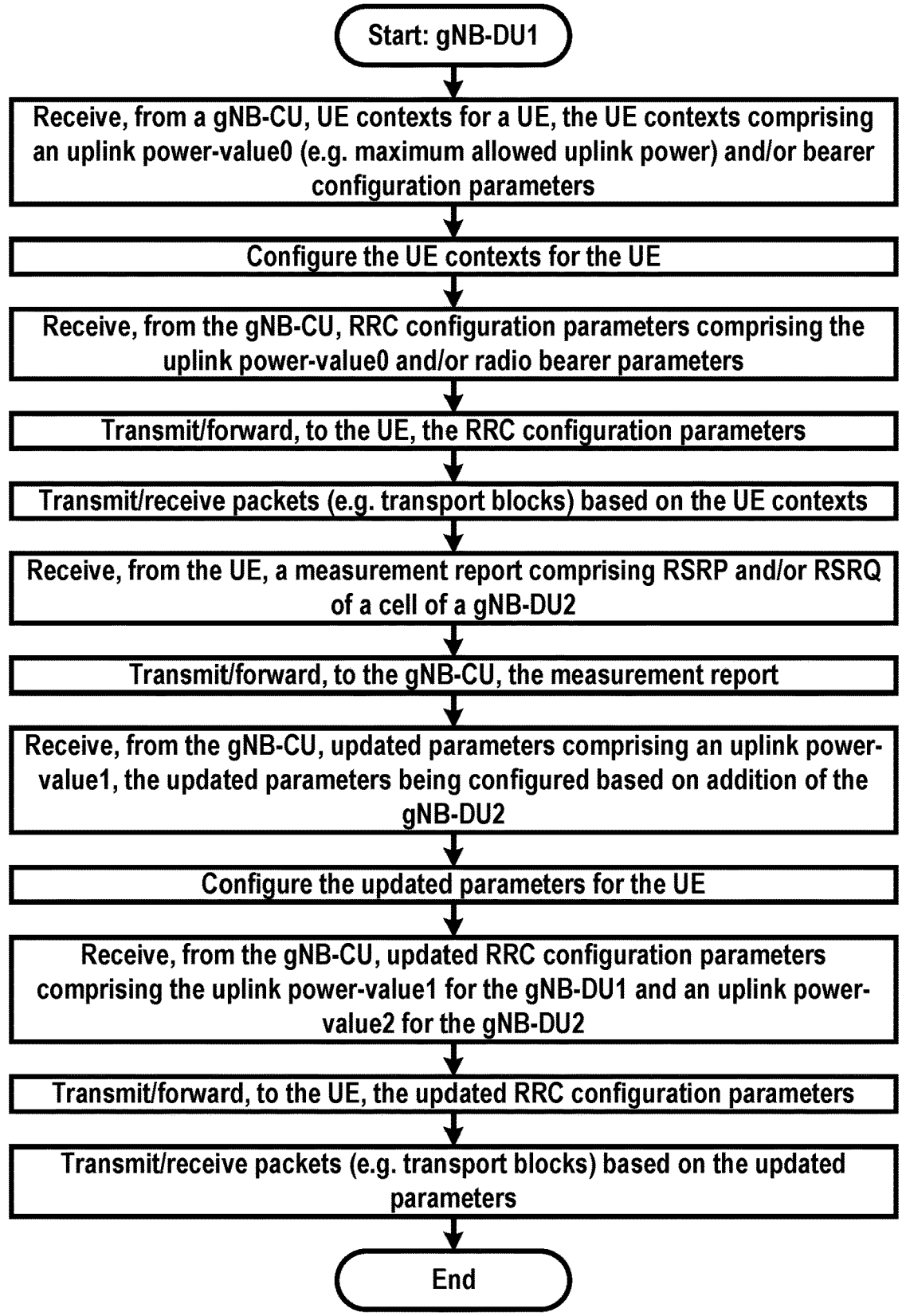
FIG. 22 is an example diagram of an aspect of an embodiment of the present disclosure.
Figure 24:
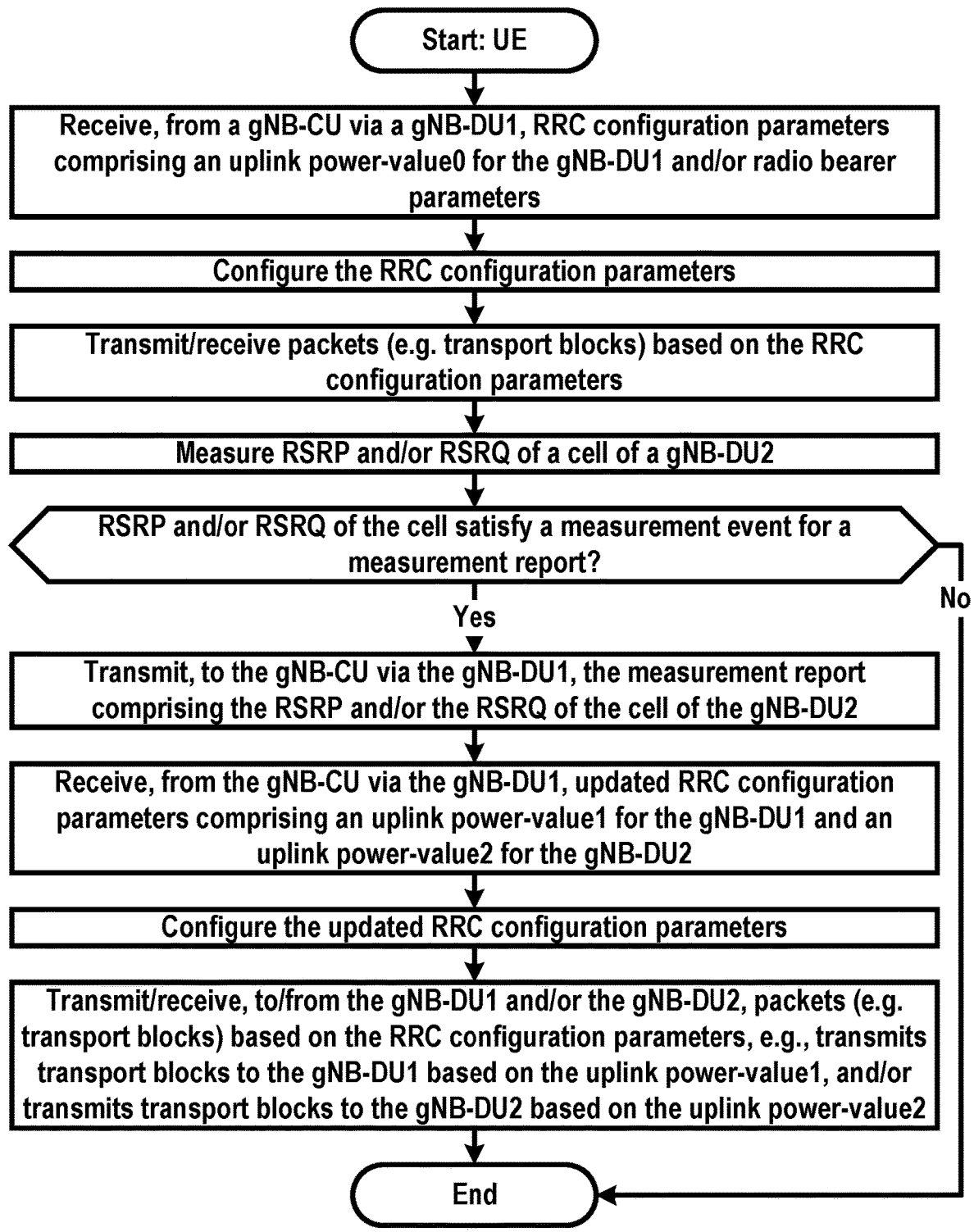
FIG. 24 is an example diagram of an aspect of an embodiment of the present disclosure.

In an example, as shown in FIG. 20, FIG. 21, and/or FIG. 22, the base station CU may serve a wireless device via the first base station DU. The base station CU may transmit, to the wireless device, a radio resource control (RRC) message comprising measurement configuration parameters. The measurement configuration parameters may comprise a period parameter indicating a periodic term to report measurement results to the base station (e.g. the base station CU). The measurement configuration parameters may comprise one or more event threshold parameters indicating one or more conditions. The one or more condition may comprise one or more threshold timer values and/or one or more threshold power values. If at least one of the one or more conditions is satisfied, as shown in FIG. 24, the wireless device may report measurement results for one or more cells or beams. The measurement results may comprise one or more reference signal received power (RSRP) values and/or one or more reference signal received quality (RSRQ) values for one or more cells or beams.

In an example, the base station CU may receive, from the wireless device via the first base station DU, a measurement report comprising one or more measurement results of at least one cell of the second base station DU. The measurement report may be an RRC message. The one or more measurement results may comprise: at least one cell identifier of the at least one cell; RSRP/RSRQ values of the at least one cell, average RSRP/RSRQ values of the at least one cell, average cell quality values of the at least one cell, RSRP/RSRQ values of one or more beams of the at least one cell, and/or the like.

Figure 15:
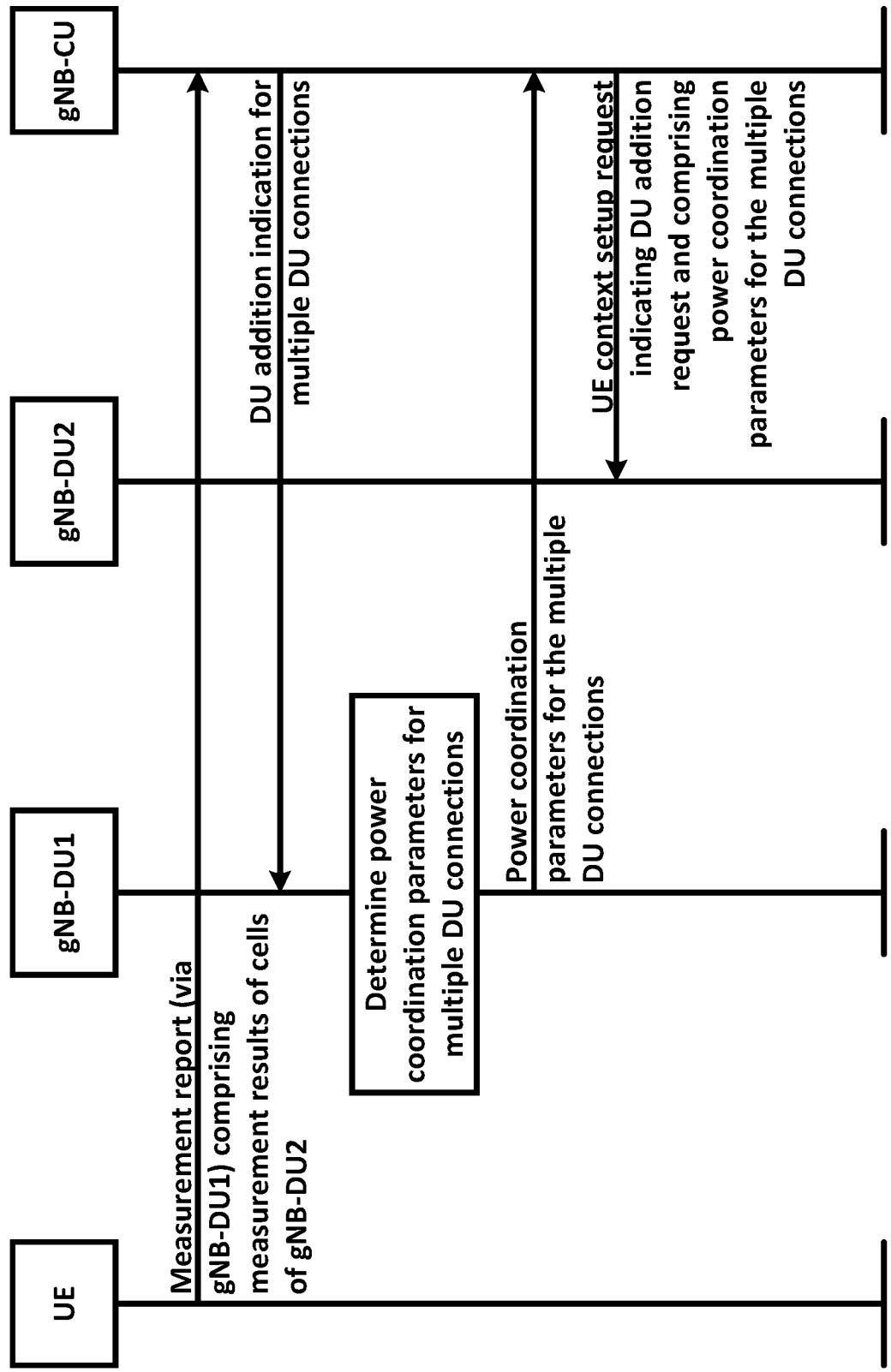
FIG. 15 is an example diagram of an aspect of an embodiment of the present disclosure.

In an example, as shown in FIG. 15, the base station CU may determine a base station DU addition to establish multiple DU connections with the second base station DU for the wireless device based on the measurement report. In response to the determination of the base station DU addition, the base station CU may transmit, to the first base station DU, a first message indicating the base station DU addition. The first message may comprise one or more elements of the one or more measurement results. The first message may further comprise the at least one cell identifier of the at least one cell of the second base station DU, a DU identifier of the second base station DU, a number of base station DUs involved in the multiple DU connections, a UE identifier of the wireless device, and/or the like.

In an example, in response to receiving the first message, the first base station DU may determine first power coordination parameters for the multiple DU connections of the wireless device based on the first message. The first power coordination parameters may comprise at least one parameter indicating at least one of: a first power control mode comprising a mode 1 or a mode 2; a first guaranteed power 1 for the first base station DU; a first guaranteed power 2 for the second base station DU, and/or the like. In an example, the base station CU may receive, from the first base station DU, a second message comprising the first power coordination parameters.

In an example, the first power control mode may indicate whether the wireless device employs the power control mode 1 (e.g. the mode 1) or the power control mode 2 (e.g. the mode 2) when transmitting uplink transport blocks to the first base station DU and the second base station DU simultaneously. In an example, the first guaranteed power 1 for the first base station DU may indicate a guaranteed transmission power for the wireless device to transmit uplink transport blocks to the first base station DU. In an example, the first guaranteed power 2 for the second base station DU may indicate a guaranteed transmission power for the wireless device to transmit uplink transport blocks to the second base station DU.

In an example, the base station CU may send one or more elements of the measurement report to the first base station DU, and the first base station DU may determine a base station DU addition to establish multiple DU connections with the second base station DU for the wireless device based on the one or more elements of the measurement report. In response to the determination of the base station DU addition by the first base station DU, the first base station DU may determine the first power coordination parameters and transmit to the base station CU with an indication of the base station DU addition for the multiple DU connections with the second base station DU.

In an example, in response to receiving the second message, the base station CU may send, to the second base station DU, a third message indicating a request of the base station DU addition for the wireless device. The third message may be a UE context setup request message. In an example, the third message may comprise second power coordination parameters for the multiple DU connections for the wireless device. In an example, the base station CU may configure the second power coordination parameters to be same to the first power coordination parameters received from the first base station DU. In an example, the base station CU may determine the second power coordination parameters based on the first power coordination parameters received from the first base station DU via the second message. The second power coordination parameters may comprise a second power control mode comprising the mode 1 or the mode 2; a second guaranteed power 1 for the first base station DU; a second guaranteed power 2 for the second base station DU; and/or the like. In an example, the second power control mode may equal the first power control mode. The second guaranteed power 1 may equal the first guaranteed power 1. The second guaranteed power 2 may equal the first guaranteed power 2.

In an example, the third message may further comprise one or more bearer configuration parameters of at least one bearer (e.g. data radio bearer, tunnel, QoS flow, PDU session, and/or the like) that the base station CU requests for the second base station DU to establish for the wireless device. The one or more bearer configuration parameters may comprise a bearer identifier of the at least one bearer, one or more QoS requirement parameters for the at least one bearer, a bearer type information element, and/or the like. The third message may further comprise at least one cell identifier of at least one cell of the second base station DU for the multiple DU connections of the wireless device. The at least one cell identifier may be a global cell identifier, a physical cell identifier, and/or the like. The at least one cell may be one of the at least one cell listed in the measurement report from the wireless device. The third message may comprise measurement results of the at least one cell received from the wireless device. The third message may comprise radio resource configuration parameters of the at least one cell of the second base station DU to serve the wireless device. The third message may comprise a UE identifier of the wireless device.

In an example, in response to the third message, the second base station DU may determine to allow the request of the base station DU addition for the wireless device based on one or more elements of the third message and/or a radio resource status (or policy) of the second base station DU. In response to determining to allow the request, the second base station DU may send, to the base station CU, a response message to the request of the base station DU addition for the multiple DU connections of the wireless device. The response message may indicate that the second base station DU allows the request of the base station DU addition for the wireless device. In an example, the response message may comprise at least one bearer identifier of at least one bearer allowed to be established in the second base station DU for the wireless device. The response message may comprise one or more radio resource configuration parameters (e.g. TAG information, power headroom report configuration parameters, random access configuration parameters such as PRACH resource and RA preamble index, frequency information, subframe configuration parameters, and/or the like). In an example, the response message may further comprise a cell identifier of a primary secondary cell for the wireless device at the secondary base station DU.

In an example, the response message may comprise third power coordination parameters for the multiple DU connections. The third power coordination parameters may comprise one or more parameters indicating at least one of: a third power control mode comprising the mode 1 or the mode 2; a third guaranteed power 1 for the first base station DU; a third guaranteed power 2 for the second base station DU; and/or the like. In an example, the second base station DU may determine the third power coordination parameters based on the second power coordination parameters of the third message. In an example, the base station CU may forward the third power coordination parameters to the first base station DU.

In an example, in response to receiving the response message, the base station CU may send a fourth message indicating that the base station DU addition for the multiple DU connections of the wireless device is completed. In an example, in response to receiving the response message, the base station CU may transmit, to the wireless device, a RRC connection reconfiguration message (e.g. RRC reconfiguration message) comprising at least one of the first power coordination parameters; the second power coordination parameters; and/or the third power coordination parameters.

Figure 16:
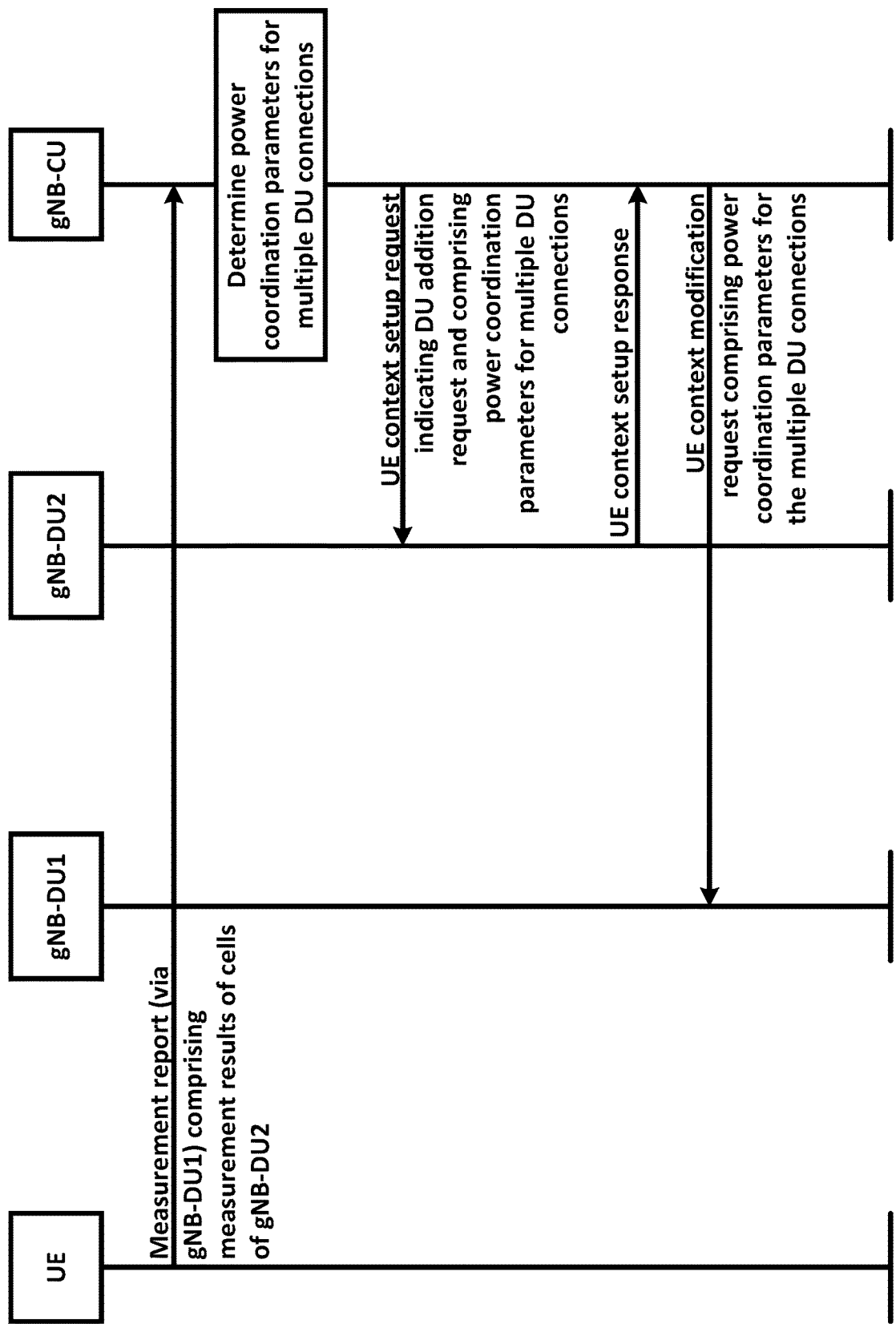
FIG. 16 is an example diagram of an aspect of an embodiment of the present disclosure.

In an example, as shown in FIG. 16, the base station CU may determine a base station DU addition to establish multiple DU connections with the second base station DU for the wireless device based on the measurement report. In response to the determination of the base station DU addition, the base station CU may transmit, to the second base station DU, a first message indicating a request of a base station DU addition to establish the multiple DU connections with the second base station DU for the wireless device. In an example, the first message may be a UE context setup request message. The first message may comprise first power coordination parameters for the multiple DU connections of the wireless device. The first power coordination parameters may be determined based on the measurement report. The first power coordination parameters may comprise at least one parameter indicating at least one of: a first power control mode comprising a mode 1 or a mode 2; a first guaranteed power 1 for the first base station DU; a first guaranteed power 2 for the second base station DU; and/or the like.

In an example, the first power control mode may indicate whether the wireless device employs the power control mode 1 (e.g. the mode 1) or the power control mode 2 (e.g. the mode 2) when transmitting uplink transport blocks to the first base station DU and the second base station DU simultaneously. In an example, the first guaranteed power 1 for the first base station DU may indicate a guaranteed transmission power for the wireless device to transmit uplink transport blocks to the first base station DU. In an example, the first guaranteed power 2 for the second base station DU may indicate a guaranteed transmission power for the wireless device to transmit uplink transport blocks to the second base station DU.

In an example, the first message may further comprise one or more bearer configuration parameters of at least one bearer (e.g. data radio bearer, tunnel, QoS flow, PDU session, and/or the like) that the base station CU requests for the second base station DU to establish for the wireless device. The one or more bearer configuration parameters may comprise a bearer identifier of the at least one bearer, one or more QoS requirement parameters for the at least one bearer, a bearer type information element, and/or the like. The first message may further comprise at least one cell identifier of at least one cell of the second base station DU for the multiple DU connections of the wireless device. The at least one cell identifier may be a global cell identifier, a physical cell identifier, and/or the like. The at least one cell may be one of the at least one cell listed in the measurement report from the wireless device. The first message may comprise measurement results of the at least one cell received from the wireless device. The first message may comprise radio resource configuration parameters of the at least one cell of the second base station DU to serve the wireless device. The first message may comprise a UE identifier of the wireless device.

Figure 23:
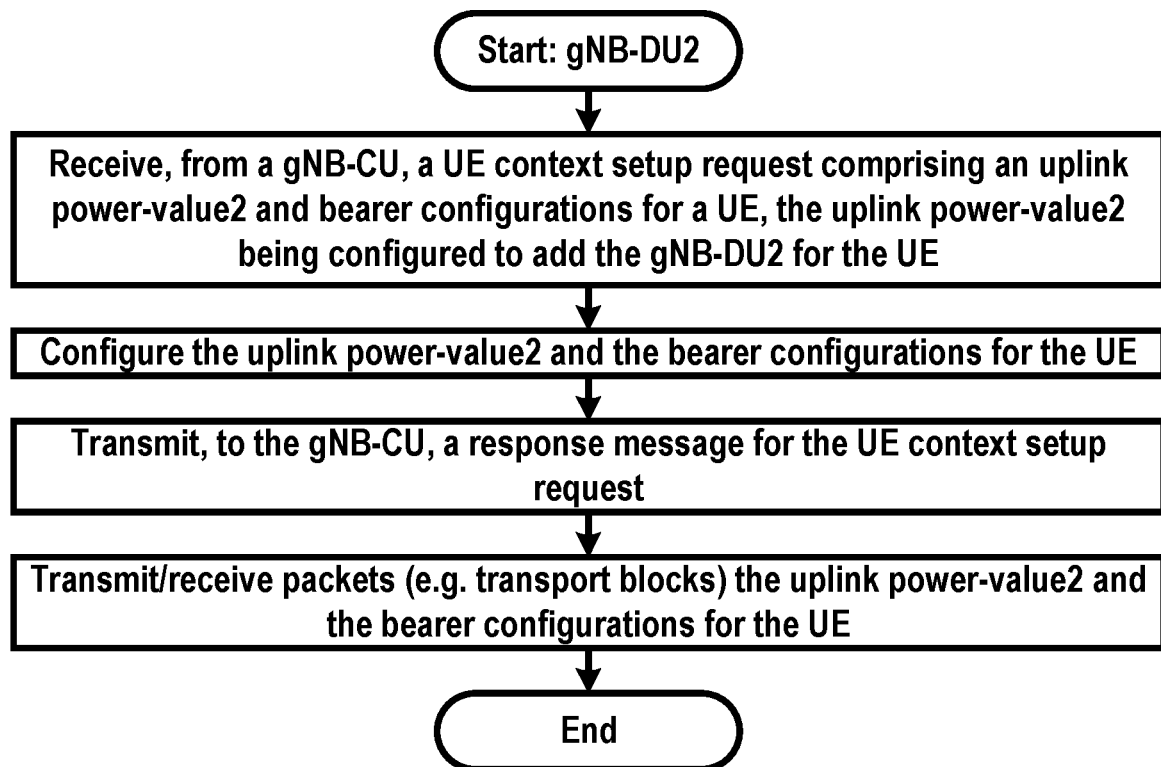
FIG. 23 is an example diagram of an aspect of an embodiment of the present disclosure.

In an example, in response to receiving the first message, as shown in FIG. 23, the second base station DU may determine to allow the request of the base station DU addition for the wireless device based on one or more elements of the first message and/or a radio resource status (or policy) of the second base station DU. In response to determining to allow the request, the second base station DU may send, to the base station CU, a second message indicating that the second base station DU allows the request of the base station DU addition for the wireless device. In an example, the second message may comprise at least one bearer identifier of at least one bearer allowed to be established in the second base station DU for the wireless device. The response message may comprise one or more radio resource configuration parameters (e.g. TAG information, power headroom report configuration parameters, random access configuration parameters such as PRACH resource and RA preamble index, frequency information, subframe configuration parameters, and/or the like). In an example, the second message may further comprise a cell identifier of a primary secondary cell for the wireless device at the secondary base station DU.

In an example, the second message may further comprise third power coordination parameters that the second base station DU determines at least based on the first power coordination parameters. The third power coordination parameters may comprise one or more parameters indicating at least one of: a third power control mode comprising the mode 1 or the mode 2; a third guaranteed power 1 for the first base station DU; a third guaranteed power 2 for the second base station DU; and/or the like.

In an example, in response to receiving the second message indicating the allowance, the base station CU may send a third message to the first base station DU. The third message may indicate that the multiple DU connections with the second base station DU are established for the wireless device. The third message may be a UE context modification request message. In an example, the third message may comprise one or more bearer identifiers of one or more bearers to be released (e.g. to be established in the second base station DU) at the first base station DU. In an example, the third message may further comprise second power coordination parameters for the multiple DU connections for the wireless device. In an example, the base station CU may configure the second power coordination parameters to be same to the first power coordination parameters received from the first base station DU.

In an example, in response to receiving the third message, the base station CU may transmit, to the wireless device, a RRC connection reconfiguration message (e.g. RRC reconfiguration message) comprising at least one of the first power coordination parameters; the second power coordination parameters; and/or the third power coordination parameters.

Figure 19:
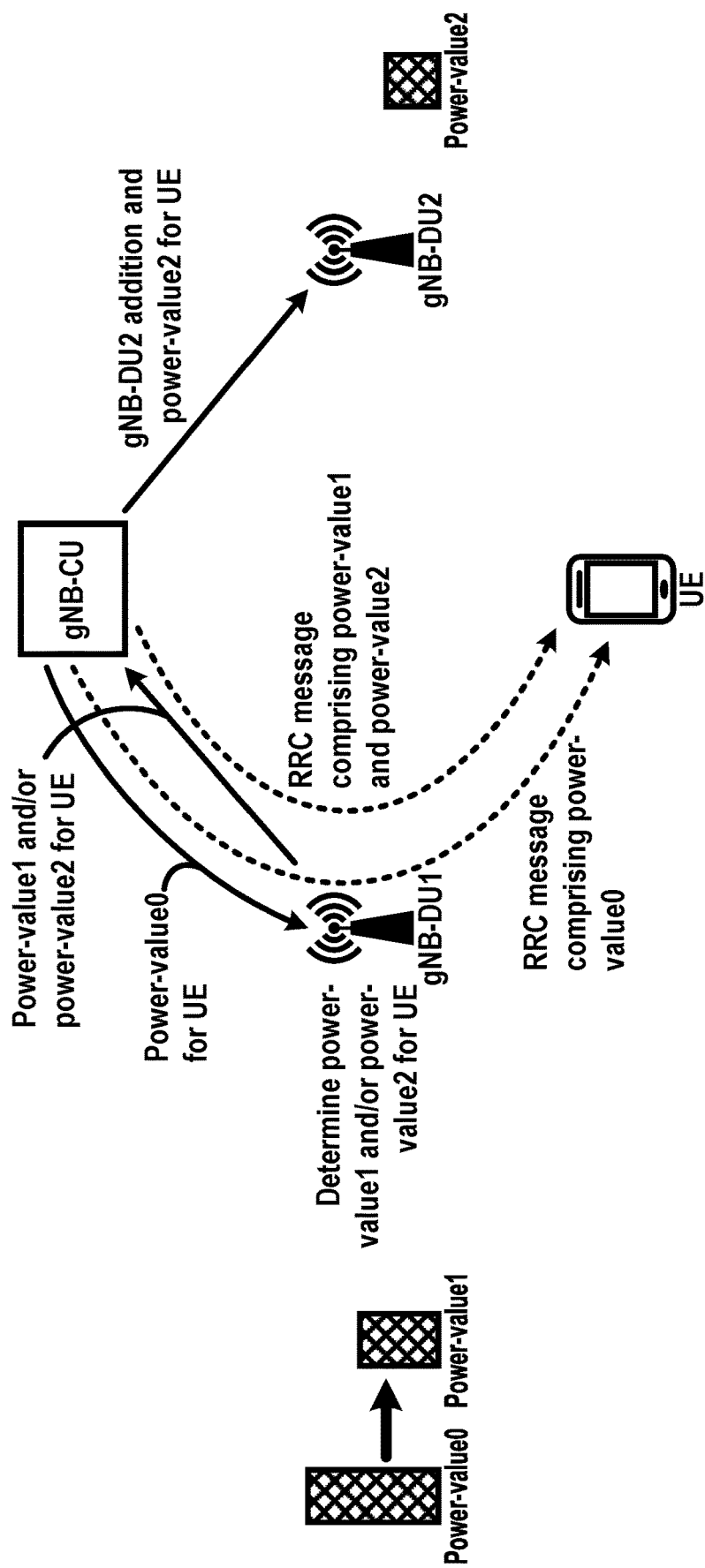
FIG. 19 is an example diagram of an aspect of an embodiment of the present disclosure.

In an example, as shown in FIG. 15 and/or FIG. 19, a base station CU may receive, from a wireless device via a first base station distributed unit (DU), a measurement report comprising one or more measurement results of at least one cell of a second base station DU. The base station CU may send, to the first base station DU based on the measurement report, a first message indicating a base station DU addition to establish multiple DU connections for the wireless device. The base station CU may receive, from the first base station DU, a second message comprising first power coordination parameters for the multiple DU connections. The first power coordination parameters may indicate at least one of: a first power control mode comprising a mode 1 or a mode 2; a first guaranteed power 1 for the first base station DU; and/or a first guaranteed power 2 for the second base station DU. The base station CU may send, to the second base station DU, a third message indicating a request of the base station DU addition for the wireless device. The third message may comprise second power coordination parameters for the multiple DU connections. The second power coordination parameters may indicate at least one of: a second power control mode comprising the mode 1 or the mode 2; a second guaranteed power 1 for the first base station DU; and/or a second guaranteed power 2 for the second base station DU.

In an example, one or more elements of the first power coordination parameters may equal one or more elements of the second power coordination parameters. The base station CU may determine the second power coordination parameters based on the first power coordination parameters. The first base station DU may employ the first power coordination parameters to control a first uplink transmission power (e.g. TPC, physical/mac layer power control) of the wireless device. The second base station DU may employ the second power coordination parameters to control a second uplink transmission power (e.g. TPC, physical/mac layer power control) of the wireless device.

In an example, the first base station DU may provide, for the wireless device, at least one of: a master cell group; and/or a primary cell. The second base station DU may provide, for the wireless device, at least one of: a secondary cell group; and/or a primary secondary cell. In an example, the third message may further comprise at least one of: one or more bearer configuration parameters for at least one bearer requested to be setup in the second base station DU for the wireless device; and/or at least one cell identifier of at least one cell of the second base station DU for the multiple DU connections.

In an example, the base station CU may further receive, from the second base station DU, a response message to the request of the base station DU addition. The response message may comprise at least one of: at least one bearer identifier of at least one bearer allowed to be setup in the second base station DU for the wireless device; and/or third power coordination parameters for the multiple DU connections. The third power coordination parameters may indicate at least one of: a third power control mode comprising the mode 1 or the mode 2; a third guaranteed power 1 for the first base station DU; and/or a third guaranteed power 2 for the second base station DU.

In an example, the base station CU may further send, to the first base station DU, a fourth message indicating a completion of the base station DU addition for the multiple DU connections. The fourth message may be determined based on a response message to the request of the base station DU addition. The base station CU may receive the response message from the second base station DU. The base station CU may further transmit, to the wireless device, a radio resource control (RRC) connection reconfiguration message comprising at least one of: the first power coordination parameters; the second power coordination parameters; and/or the third power coordination parameters.

In an example, the second message and/or the third message may further comprise at least one of: a first power headroom report (PHR) mode parameter comprising a real mode or a virtual mode; a p-Max; and/or buffer status report configuration parameters. In an example, the first message may further indicate a request of serving the wireless device as a master base station DU. The third message may further indicate a request of serving the wireless device as a secondary base station DU. In an example, the third message may comprise a user equipment (UE) context setup request message.

Figure 17:
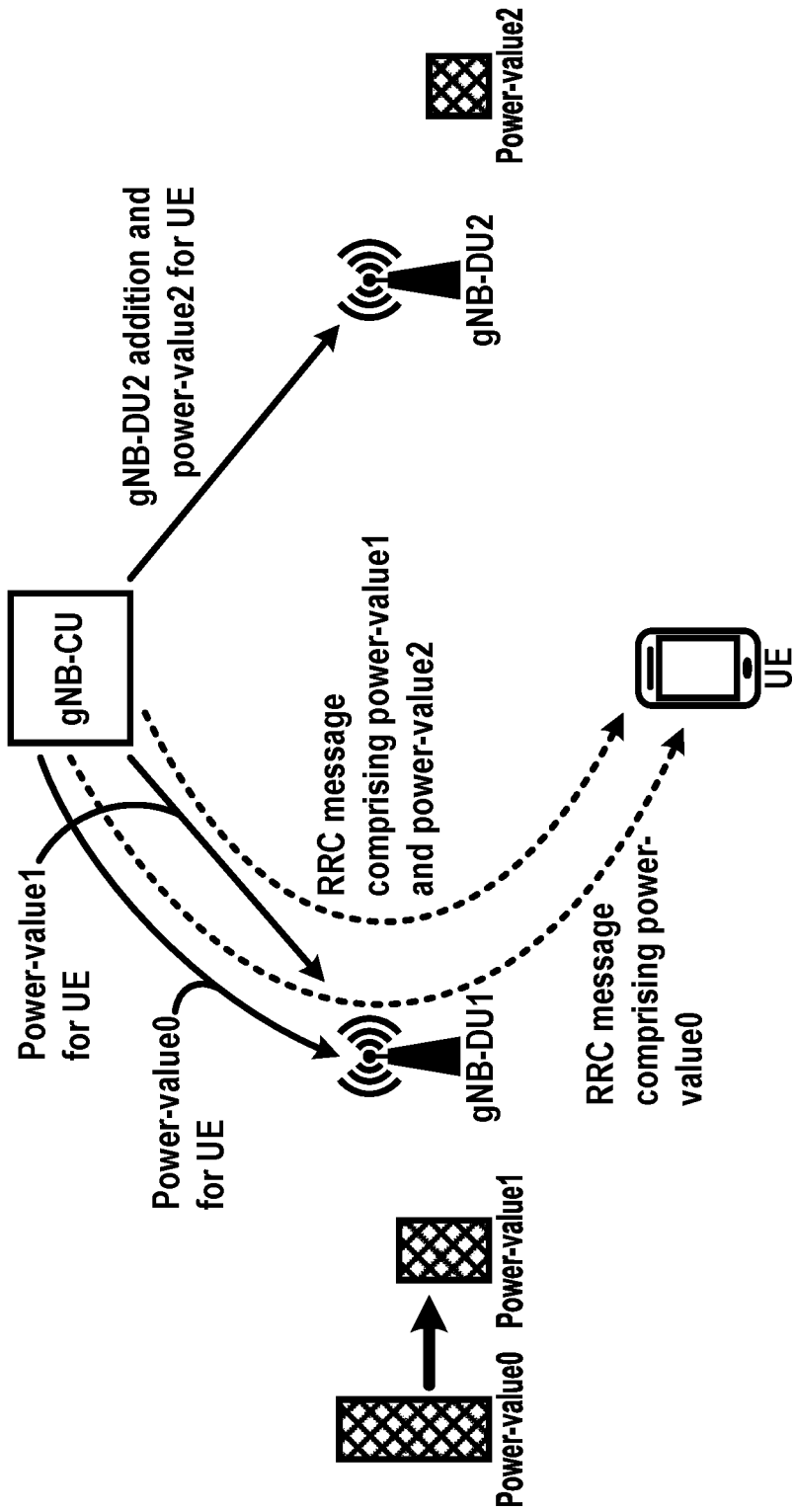
FIG. 17 is an example diagram of an aspect of an embodiment of the present disclosure.
Figure 18:
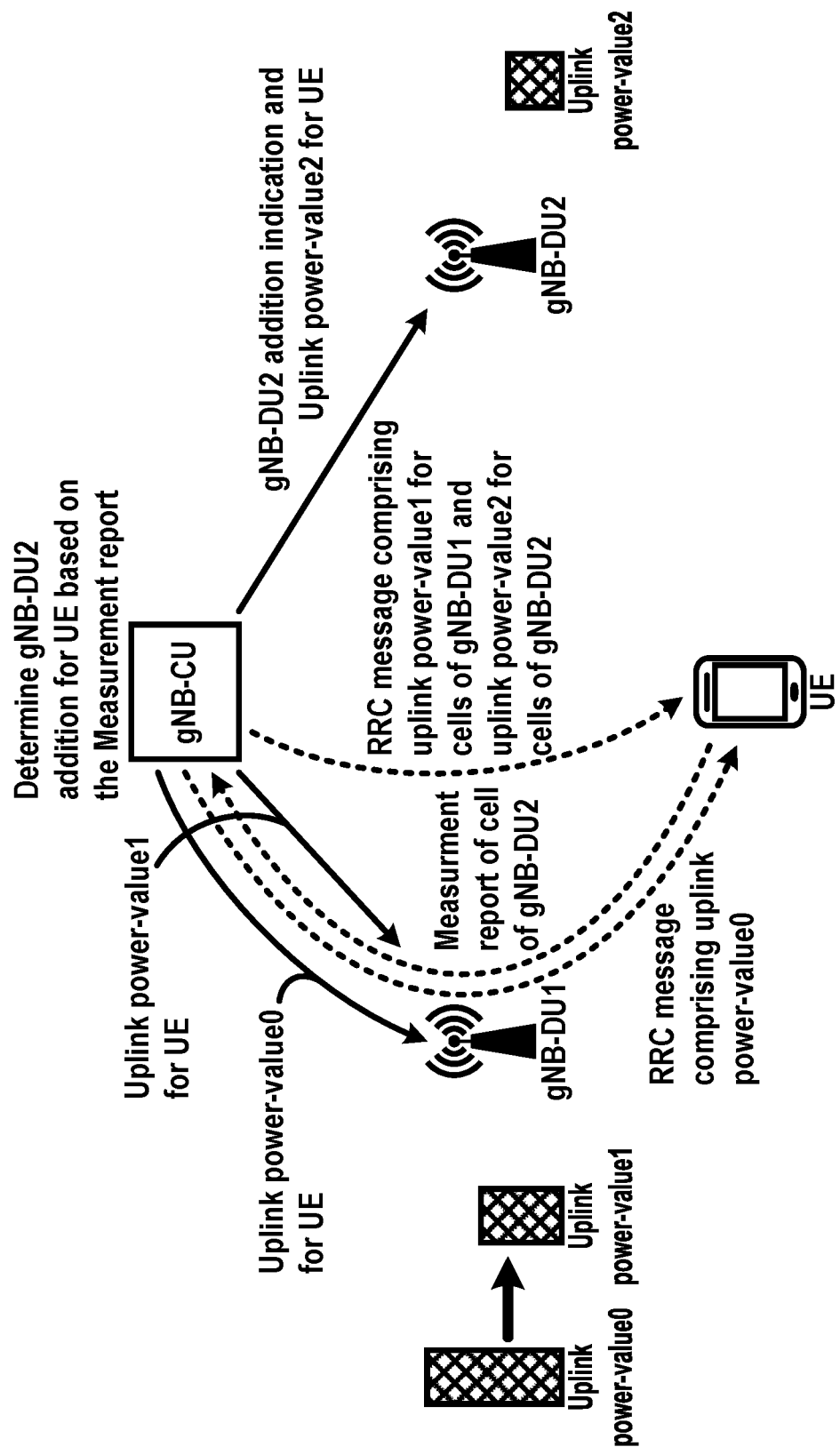
FIG. 18 is an example diagram of an aspect of an embodiment of the present disclosure.

In an example, as shown in FIG. 16, FIG. 17, and/or FIG. 18, a base station CU may receive, from a wireless device via a first base station distributed unit (DU), a measurement report comprising one or more measurement results of at least one cell of a second base station DU. The base station CU may send, to the second base station DU based on the measurement report, a first message indicating a request of a base station DU addition to establish multiple DU connections for the wireless device. The first message may comprise first power coordination parameters for the multiple DU connections. The first power coordination parameters may indicate at least one of: a first power control mode comprising a mode 1 or a mode 2; a first guaranteed power 1 for the first base station DU; and/or a first guaranteed power 2 for the second base station DU. In an example, the base station CU may receive, from the first base station DU in response to the first message, a second message indicating an allowance of the request of the base station DU addition. The base station CU may send, to the first base station DU in response to the allowance, a third message comprising second power coordination parameters for the multiple DU connections. The second power coordination parameters may indicate at least one of: a second power control mode comprising the mode 1 or the mode 2; a second guaranteed power 1 for the first base station DU; and/or a second guaranteed power 2 for the second base station DU.

In an example, one or more elements of the first power coordination parameters may equal one or more elements of the second power coordination parameters. The first base station DU may employ the second power coordination parameters to control a first uplink transmission power of the wireless device. the second base station DU may employ the first power coordination parameters to control a second uplink transmission power of the wireless device. In an example, the first base station DU may provide, for the wireless device, at least one of: a master cell group; and/or a primary cell. The second base station DU may provide, for the wireless device at least one of: a secondary cell group; and/or a primary secondary cell. In an example, the first message may comprise at least one of: one or more bearer configuration parameters for at least one bearer requested to be setup in the second base station DU for the wireless device; and/or at least one cell identifier of at least one cell of the second base station DU for the multiple DU connections.

In an example, the second message may further comprise at least one of: at least one bearer identifier of at least one bearer allowed to be setup in the second base station DU for the wireless device; and/or third power coordination parameters determined by the second base station DU for the multiple DU connections. The third power coordination parameters may indicate at least one of: a third power control mode comprising the mode 1 or the mode 2; a third guaranteed power 1 for the first base station DU; and/or a third guaranteed power 2 for the second base station DU. In an example, the base station CU may transmit, to the wireless device, a radio resource control (RRC) connection reconfiguration message comprising at least one of: the first power coordination parameters; the second power coordination parameters; and/or the third power coordination parameters.

In an example, the first message, the second message, and/or the third message may further comprise at least one of: a first power headroom report (PHR) mode comprising a real mode or a virtual mode; a p-Max; and/or buffer status report configuration parameters. In an example, the third message may further indicate a request of serving the wireless device as a master base station DU. The first message may further indicate a request of serving the wireless device as a secondary base station DU. In an example, the first message may comprise a user equipment (UE) context setup request message.

According to various embodiments, a device such as, for example, a wireless device, a base station, base station central unit, a base station distributed unit, a core network entity, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

FIG. 25 is an example flow diagram as per an aspect of an embodiment of the present disclosure. At 2510, a base station central unit may transmit to a first base station distributed unit, a first message requesting a first context setup for a wireless device. At 2520, the base station central unit may transmit to a second base station distributed unit, a second message requesting second context setup to add the second base station distributed unit for the wireless device. The second message may comprise a second power value for uplink transmission of the wireless device to the second base station distributed unit. At 2530, the base station central unit may receive from the second base station distributed unit, a response message indicating the second context setup for the wireless device. At 2540, the base station central unit may transmit to the first base station distributed unit, a third message requesting context modification for the wireless device. The third message may comprise a first power value for uplink transmission of the wireless device to the first base station distributed unit. The first power value may be determined based on the second power value.

According to an example embodiment, the first message may comprise a third power value for uplink transmission of the wireless device to the first base station distributed unit. According to an example embodiment, the third power value may be a maximum allowed power for uplink transmission of the wireless device. According to an example embodiment, the third power value may be equal to or larger than a sum of the first power value and the second power value.

According to an example embodiment, the base station central unit may receive from the wireless device, a measurement report comprising one or more measurement results of at least one cell of the second base station distributed unit. The transmission of the second message may be based on the measurement report. According to an example embodiment, the second message may comprise an information element indicating a power control mode comprising a mode 1 or a mode 2. According to an example embodiment, the second context setup may be to establish multiple base station distributed unit connections for the wireless device. According to an example embodiment, the first power value may be a maximum allowed power for uplink transmission of the wireless device to the first base station distributed unit. According to an example embodiment, the second power value may be a maximum allowed power for uplink transmission of the wireless device to the second base station distributed unit.

According to an example embodiment, the first base station distributed unit may employ the first power value to control an uplink transmission power of the wireless device. According to an example embodiment, the second base station distributed unit may employ the second power value to control an uplink transmission power of the wireless device. According to an example embodiment, the first base station distribute unit may provide a master cell group to the wireless device. The master cell group may comprise a primary cell. The master cell group may comprise one or more secondary cells. According to an example embodiment, the second base station distributed unit may provide a secondary cell group to the wireless device. The secondary cell group may comprise a primary secondary cell. The secondary cell group may comprise one or more secondary cells. According to an example embodiment, the first message may comprise one or more bearer configuration parameters of at least one bearer requested to be setup at the first base station distributed unit for the wireless device. According to an example embodiment, the first message may comprise at least one cell identifier of at least one cell of the first base station distributed unit for the wireless device. According to an example embodiment, the second message may comprise one or more bearer configuration parameters of at least one bearer requested to be setup at the second base station distributed unit for the wireless device. According to an example embodiment, the second message may comprise at least one cell identifier of at least one cell of the second base station distributed unit for the wireless device.

According to an example embodiment, the base station central unit may transmit a radio resource control reconfiguration message to the wireless device. The radio resource control reconfiguration message may comprise the first power value. The radio resource control reconfiguration message may comprise the second power value. According to an example embodiment, the second message may indicate a request to serve the wireless device as a secondary base station distributed unit. According to an example embodiment, the second message may comprise a user equipment context setup request message. According to an example embodiment, the first message may comprise a first power headroom report mode comprising a real mode or a virtual mode. According to an example embodiment, the first message may comprise buffer status report configuration parameters. According to an example embodiment, the second message may comprise a second power headroom report mode comprising a real mode or a virtual mode. According to an example embodiment, the second message may comprise buffer status report configuration parameters. According to an example embodiment, the base station central unit may comprise a radio resource control layer function. According to an example embodiment, the base station central unit may comprise a packet data convergence protocol layer function. According to an example embodiment, the base station central unit may comprise a service data adaptation protocol layer function. According to an example embodiment, the first base station distributed unit and the second base station distributed unit may comprise a physical layer function. According to an example embodiment, the first base station distributed unit and the second base station distributed unit may comprise a medium access control layer function. According to an example embodiment, the first base station distributed unit and the second base station distributed unit may comprise a radio link control layer function.

FIG. 26 is an example flow diagram as per an aspect of an embodiment of the present disclosure. At 2610, a base station central unit may receive from a wireless device via a first base station distributed unit, a measurement report comprising one or more measurement results of at least one cell of a second base station distributed unit. At 2620, the base station central unit may send a first message to the first base station distributed unit and based on the measurement report. The first message may indicate a base station distributed unit addition to establish multiple distributed unit connections for the wireless device. At 2630, the base station central unit may receive from the first base station distributed unit, a second message comprising first power coordination parameters for the multiple distributed unit connections. The first power coordination parameters may comprise a first power control mode comprising a mode 1 or a mode 2. The first power coordination parameters may comprise a first guaranteed power 1 for the first base station distributed unit. The first power coordination parameters may comprise a first guaranteed power 2 for the second base station distributed unit. At 2640, the base station central unit may send to the second base station distributed unit, a third message indicating a request of the base station distributed unit addition for the wireless device. The third message may comprise second power coordination parameters for the multiple distributed unit connections. The second power coordination parameters may indicate a second power control mode comprising the mode 1 or the mode 2. The second power coordination parameters may indicate a second guaranteed power 1 for the first base station distributed unit. The second power coordination parameters may indicate a second guaranteed power 2 for the second base station distributed unit.

FIG. 27 is an example flow diagram as per an aspect of an embodiment of the present disclosure. At 2710, a base station central unit may receive from a wireless device via a first base station distributed unit, a measurement report comprising one or more measurement results of at least one cell of a second base station distributed unit. At 2720, the base station central unit may transmit to the second base station distributed unit and based on the measurement report, a first message requesting context setup to add the second base station distributed unit for the wireless device. The first message may comprise a first power value for uplink transmission of the wireless device to the second base station distributed unit. At 2730, the base station central unit may receive from the second base station distributed unit, a response message indicating the context setup for the wireless device. At 2740, the base station central unit may transmit to the first base station distributed unit, a second message requesting context modification for the wireless device. The second message may comprise a second power value for uplink transmission of the wireless device to the first base station distributed unit. The second power value may be determined based on the first power value. According to an example embodiment, the transmitting of the second message may be in response to receiving the response message.

FIG. 28 is an example flow diagram as per an aspect of an embodiment of the present disclosure. At 2810, a base station central unit may transmit to a wireless device, packets via a first base station distributed unit. At 2820, the base station central unit may transmit to the second base station distributed unit, a first message requesting context setup to add the second base station distributed unit for the wireless device. The first message may comprise a first power value for uplink transmission of the wireless device to the second base station distributed unit. At 2830, the base station central unit may receive from the second base station distributed unit, a response message indicating the context setup for the wireless device. At 2840, the base station central unit may transmit to the first base station distributed unit, a second message requesting context modification for the wireless device. The second message may comprise a second power value for uplink transmission of the wireless device to the first base station distributed unit. The second power value may be determined based on the first power value.

In this disclosure, "a" and "an" and similar phrases are to be interpreted as "at least one" or "one or more." Similarly, any term that ends with the suffix "(s)" is to be interpreted as "at least one" or "one or more." In this disclosure, the term "may" is to be interpreted as "may, for example." In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}. The phrase "based on" is indicative that the phrase following the term "based on" is an example of one of a multitude of suitable possibilities that may, or may not, be employed to one or more of the various embodiments. The phrase "in response to" is indicative that the phrase following the phrase "in response to" is an example of one of a multitude of suitable possibilities that may, or may not, be employed to one or more of the various embodiments. The terms "including" and "comprising" should be interpreted as meaning "including, but not limited to."

In this disclosure and the claims, differentiating terms like "first," "second," "third," identify separate elements without implying an ordering of the elements or functionality of the elements. Differentiating terms may be replaced with other differentiating terms when describing an embodiment.

In this disclosure, various embodiments are disclosed. Limitations, features, and/or elements from the disclosed example embodiments may be combined to create further embodiments within the scope of the disclosure.

In this disclosure, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e. hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the scope. In fact, after reading the above description, it will be apparent to one skilled in the relevant art(s) how to implement alternative embodiments. Thus, the present embodiments should not be limited by any of the above described exemplary embodiments.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method comprising:
   transmitting, by a base station central unit to a first base station distributed unit (BS-DU), a first power value for uplink transmission of a wireless device to the first BS-DU;
   transmitting, to a second BS-DU, a second request to add the second BS-DU for the wireless device, wherein the second request comprises a second power value for uplink transmission of the wireless device to the second BS-DU; and
   transmitting, to the first BS-DU, a third power value for uplink transmission of the wireless device to the first BS-DU, wherein the third power value is determined based on the second power value for uplink transmission of the wireless device to the second BS-DU.

2. The method of claim 1, further comprising receiving, from the second BS-DU, a response confirming the addition of the second BS-DU.

3. The method of claim 1, wherein the first power value is a maximum allowed power for uplink transmission of the wireless device.

4. The method of claim 1, further comprising receiving, by the base station central unit from the wireless device, a measurement report comprising one or more measurement results of at least one cell of the second BS-DU, wherein the transmitting the second request is based on the measurement report.

5. The method of claim 1, wherein the second request further comprises an information element indicating a power control mode comprising a mode 1 or a mode 2.

6. The method of claim 1, wherein:
the third power value is a maximum allowed power for uplink transmission of the wireless device to the first BS-DU; and
the second power value is a maximum allowed power for uplink transmission of the wireless device to the second BS-DU.

7. The method of claim 1, wherein:
the first BS-DU employs the third power value to control an uplink transmission power of the wireless device; and
the second BS-DU employs the second power value to control an uplink transmission power of the wireless device.

8. The method of claim 1, wherein the first BS-DU provides, to the wireless device, a master cell group comprising at least one of:
a primary cell; or
one or more secondary cells.

9. The method of claim 1, wherein the second BS-DU provides, to the wireless device, a secondary cell group comprising at least one of:
a primary secondary cell; or
one or more secondary cells.

10. The method of claim 1, further comprising transmitting, by the base station central unit to the wireless device, a radio resource control reconfiguration message comprising at least one of:
the third power value; or
the second power value.

11. A base station central unit comprising:
one or more processors; and
memory storing instructions that, when executed by the one or more processors, cause the base station central unit to:
transmit, to a first base station distributed unit (BS-DU), a first power value for uplink transmission of a wireless device to the first BS-DU;
transmit, to a second BS-DU, a second request to add the second BS-DU for the wireless device, wherein the second request comprises a second power value for uplink transmission of the wireless device to the second BS-DU; and
transmit, to the first BS-DU, a third power value for uplink transmission of the wireless device to the first BS-DU, wherein the third power value is determined based on the second power value for uplink transmission of the wireless device to the second BS-DU.

12. The base station central unit of claim 11, wherein the instructions, when executed by the one or more processors, further cause the base station central unit to receive, from the second BS-DU, a response confirming the addition of the second BS-DU.

13. The base station central unit of claim 11, wherein the first power value is a maximum allowed power for uplink transmission of the wireless device.

14. The base station central unit of claim 11, wherein the instructions, when executed by the one or more processors, further cause the base station central unit to receive, from the wireless device, a measurement report comprising one or more measurement results of at least one cell of the second BS-DU, wherein the transmitting the second request is based on the measurement report.

15. The base station central unit of claim 11, wherein the second request further comprises an information element indicating a power control mode comprising a mode 1 or a mode 2.

16. The base station central unit of claim 11, wherein:
the third power value is a maximum allowed power for uplink transmission of the wireless device to the first BS-DU; and
the second power value is a maximum allowed power for uplink transmission of the wireless device to the second BS-DU.

17. The base station central unit of claim 11, wherein:
the first BS-DU employs the third power value to control an uplink transmission power of the wireless device; and
the second BS-DU employs the second power value to control an uplink transmission power of the wireless device.

18. The base station central unit of claim 11, wherein the first BS-DU provides, to the wireless device, a master cell group comprising at least one of:
a primary cell; or
one or more secondary cells.

19. The base station central unit of claim 11, wherein the second BS-DU provides, to the wireless device, a secondary cell group comprising at least one of:
a primary secondary cell; or
one or more secondary cells.

20. A system comprising:
a first base station distributed unit (BS-DU);
a second BS-DU; and
a base station central unit comprising:
one or more processors; and
memory storing instructions that, when executed by the one or more processors, cause the base station central unit to:
transmit, to the first BS-DU, a first power value for uplink transmission of a wireless device to the first BS-DU;
transmit, to the second BS-DU, a second request to add the second BS-DU for the wireless device, wherein the second request comprises a second power value for uplink transmission of the wireless device to the second BS-DU; and
transmit, to the first BS-DU, a third power value for uplink transmission of the wireless device to the first BS-DU, wherein the third power value is determined based on the second power value for uplink transmission of the wireless device to the second BS-DU.

* * * * *